United States Patent
Watarai

[19]

[11] Patent Number: 6,151,965
[45] Date of Patent: Nov. 28, 2000

[54] STRUCTURE OF ANGULAR RATE SENSOR FOR MINIMIZING OUTPUT NOISE

[75] Inventor: Takehiro Watarai, Mie-ken, Japan

[73] Assignee: Denso Corporation, Aichi-ken, Japan

[21] Appl. No.: 09/234,506

[22] Filed: Jan. 21, 1999

[30] Foreign Application Priority Data

| | | | |
|---|---|---|---|
| Jan. 21, 1998 | [JP] | Japan | 10-009774 |
| Jan. 21, 1998 | [JP] | Japan | 10-009775 |
| Dec. 7, 1998 | [JP] | Japan | 10-347287 |
| Dec. 21, 1998 | [JP] | Japan | 10-363025 |

[51] Int. Cl.$^7$ ............................................. G01P 9/00
[52] U.S. Cl. ............................................ 73/504.16
[58] Field of Search .................................. 73/504.16

[56] References Cited

U.S. PATENT DOCUMENTS

| 4,654,663 | 3/1987 | Alsenz et al. ................. 340/870.3 |
| 4,899,587 | 2/1990 | Staudte .................................. 73/505 |
| 5,824,900 | 10/1998 | Konno et al. .................... 73/504.16 |

FOREIGN PATENT DOCUMENTS

| 764 828 | 3/1997 | European Pat. Off. . |
| 4-64409 | 10/1992 | Japan . |
| 8-278141 | 10/1996 | Japan . |
| 8-278142 | 10/1996 | Japan . |

*Primary Examiner*—Richard A. Moller
*Attorney, Agent, or Firm*—Pillsbury Madison & Sutro LLP

[57] ABSTRACT

An angular rate sensor is provided which measures the angular rate of motion applied to a moving object and which features the structure minimizing electrical noise of an output. The angular rate sensor includes generally a first tuning fork, a second tuning fork, and a torsion beam. The first tuning fork includes two tines and serves as a drive oscillator and a measuring oscillator. The second tuning fork includes two tines which extend in the same direction as the first and second tines partially surrounding the first tuning fork and which connect at ends thereof with ends of the tines of the first tuning fork through a stem extending substantially perpendicular to the tines of the first and second tuning forks. The torsion beam extends substantially along the center line of the sensor and supports the stem on a base. The width of the torsion beam is smaller than an overall width of the first tuning fork, thereby minimizing leakage of energy of self-excited oscillation from the drive oscillator to the measuring oscillator and achieving effective transmission of vibratory energy to the measuring oscillator which is produced by the Coriolis force resulting from application of angular motion to the sensor.

48 Claims, 36 Drawing Sheets

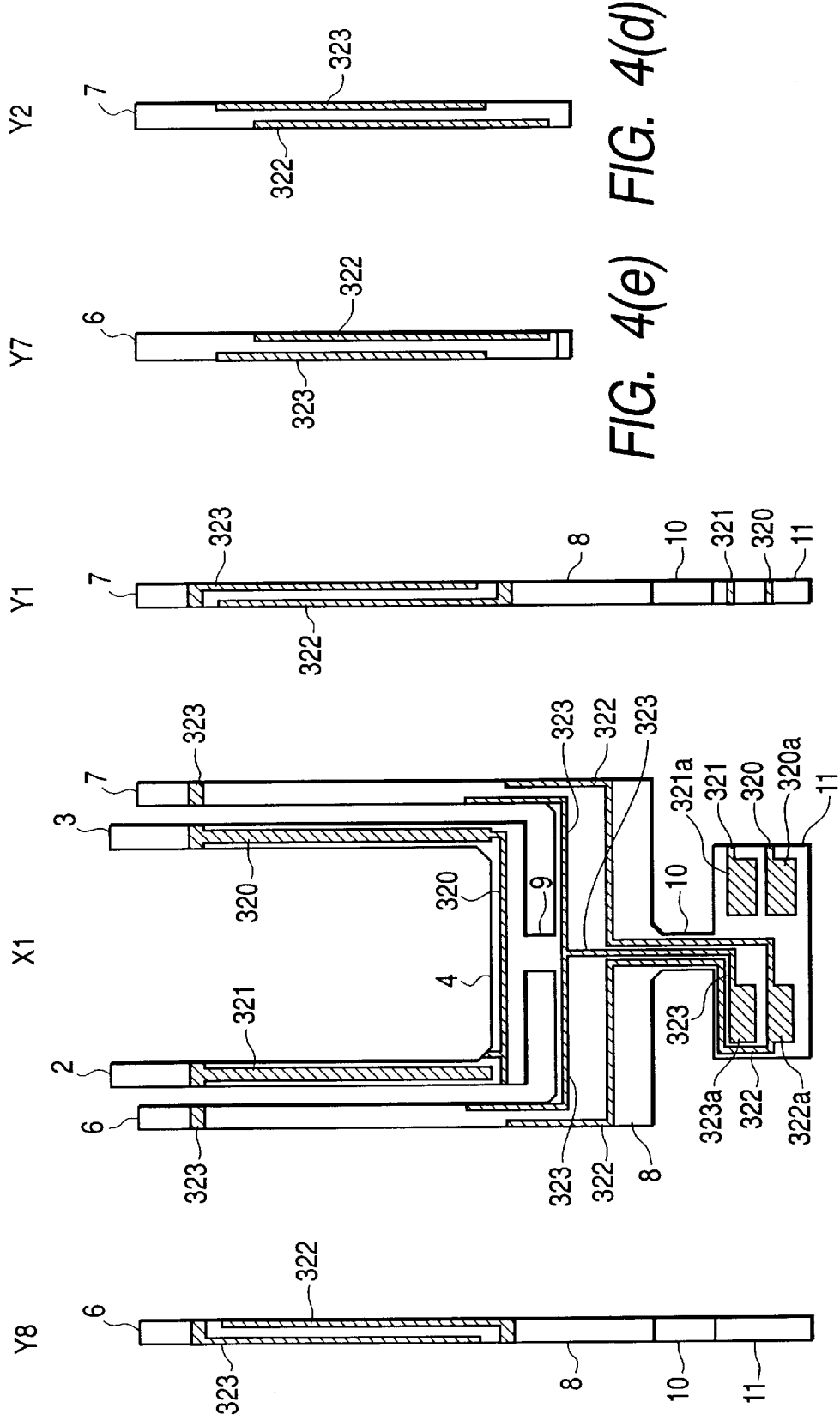

FIG. 7
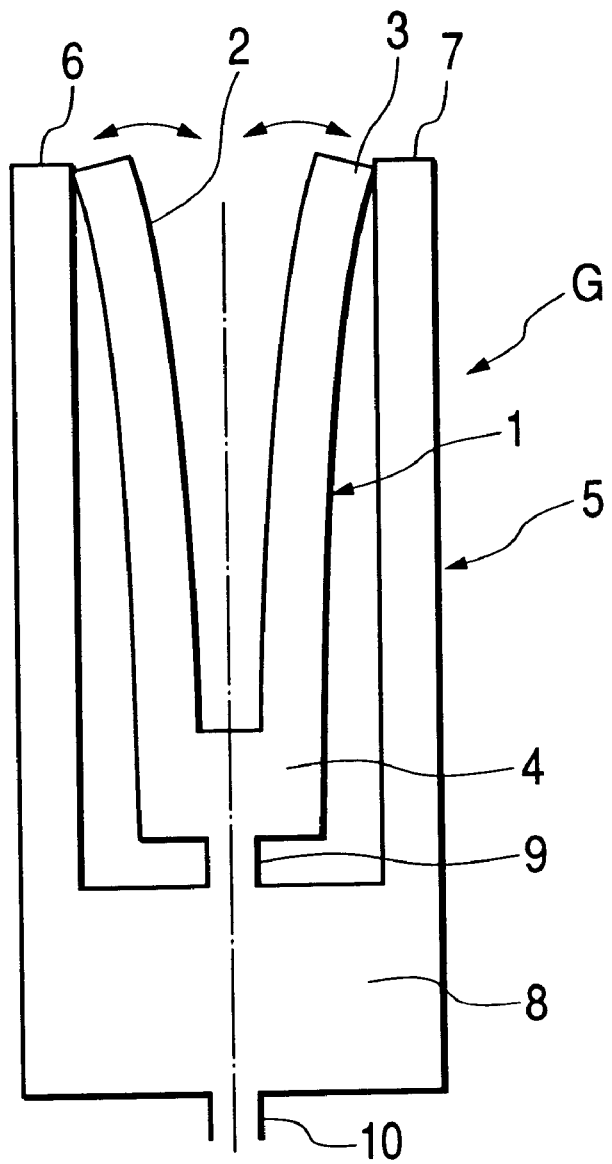
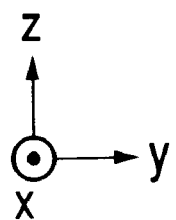

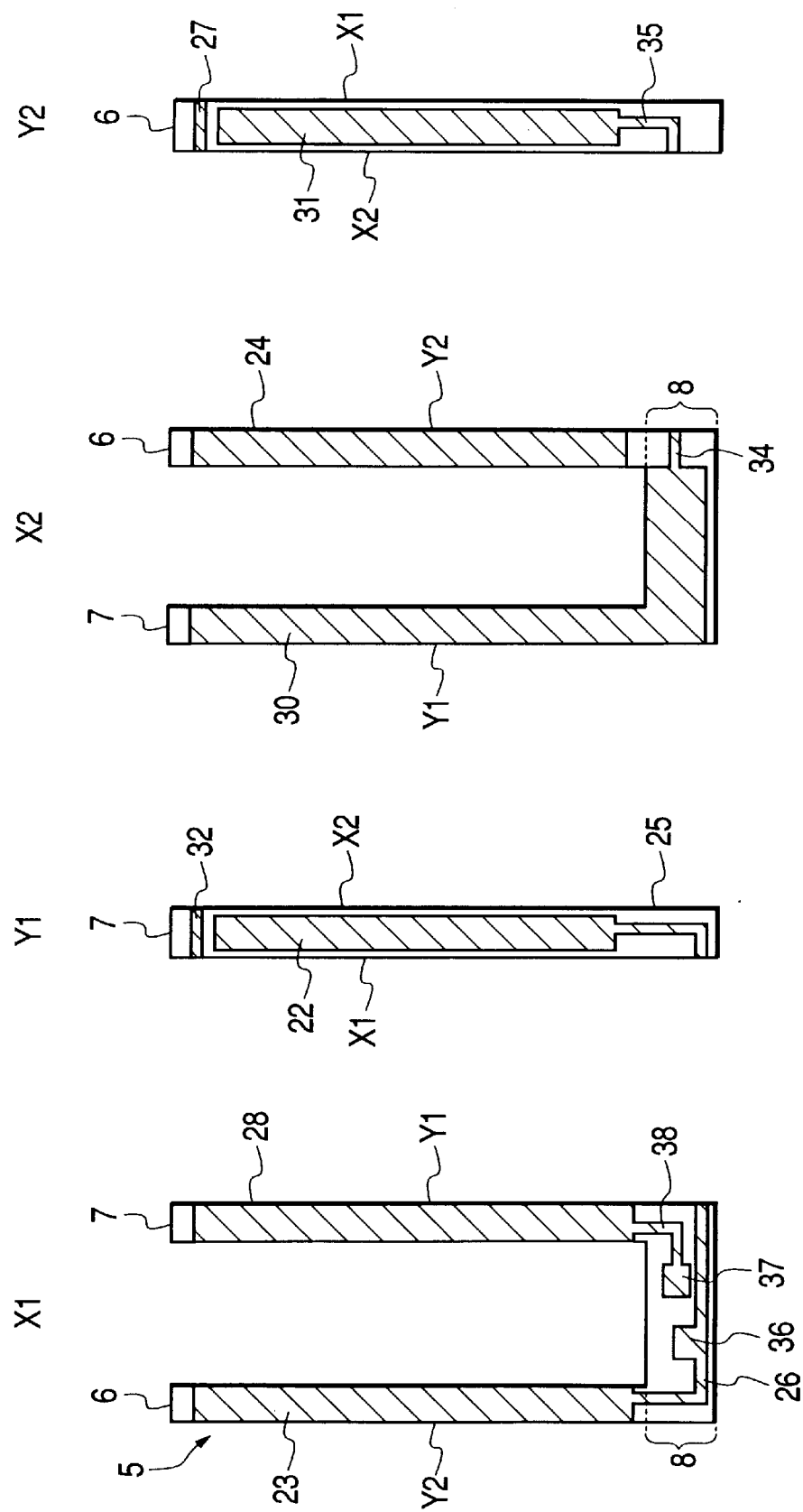

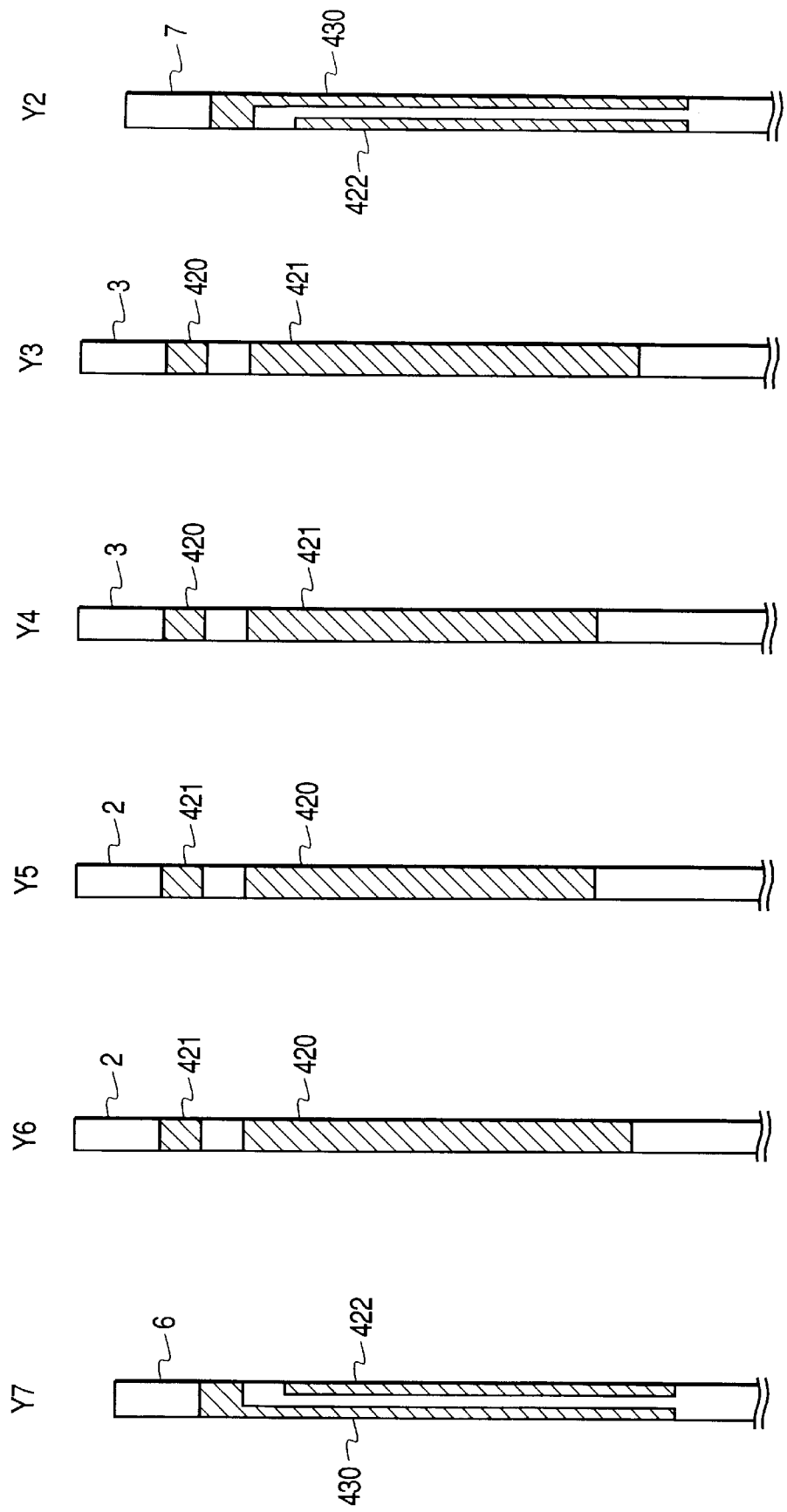

STRUCTURE OF ANGULAR RATE SENSOR FOR MINIMIZING OUTPUT NOISE

BACKGROUND OF THE INVENTION

1. Technical Field of the Invention

The present invention relates generally to an angular rate sensor which may be employed in an attitude control system for automotive vehicles, a hand-sake compensating system for video cameras, or a gyroscope of a navigation system for moving objects. Particularly, the invention relates to an improved structure of an angular rate sensor for minimizing output noise which includes a drive tuning fork functioning as a self-excited oscillator and a measuring tuning fork serving to measure the angular rate of motion applied to a moving object.

2. Background Art

Japanese Patent First Publication No. 8-2278141, which corresponds to European Patent Application No. EP764828, teaches an angular rate sensor which has four tines of which two outer tines serve as a drive tuning fork and the other inner tines serve as a measuring tuning fork. The four tines are connected at ends thereof through a support member and extend in parallel to each other to have a comb-like configuration.

In operation, the tines of the drive tuning fork are electrically excited to vibrate in opposite directions. When the angular motion is applied to the sensor during the electrically energized vibrations of the drive tuning fork, the energy to vibrate the drive tuning fork in a direction perpendicular to the electrically excited vibrations is transmitted to the measuring tuning fork through the support member to vibrate the tines of the measuring tuning fork, which vibration is outputted as a signal indicative of the angular rate of the motion of the sensor. The tines of the sensor are, as described above, grouped into the drive tuning fork and the measuring tuning fork, which will result in an S/N (signal-to-noise) ratio higher than that of a two-tine sensor, but the inventors of this application studied the above prior art and found the disadvantage that a desired S/N ratio is not obtained for the following reasons.

The drive tuning fork and the measuring tuning fork are, as described above, connected at ends thereof through the support member, thus causing the energy of self-excited oscillation of the drive tuning fork to leak to the measuring tuning fork, which will contribute to undesired vibrations of the measuring tuning fork even when no angular motion is applied to the sensor, thereby developing electrical noise undesirably.

Further, enhancing the sensitivity of the sensor requires effective transmission of vibratory energy to the measuring tuning fork which is produced by the Coriolis force resulting from application of angular motion to the sensor, but the above prior art structure dampens the vibration transmitted to the measuring tuning fork greatly, thus resulting in a decrease in sensitivity of the sensor.

SUMMARY OF THE INVENTION

It is therefore a principal object of the present invention to avoid the disadvantages of the prior art.

It is another object of the present invention to provide an improved structure of an angular rate sensor which includes a drive tuning fork and a measuring tuning fork and which is designed to minimize leakage of energy of self-excited oscillation from the drive tuning fork to the measuring tuning fork and to establish effective transmission of vibratory energy to the measuring tuning fork which is produced by the Coriolis force resulting from application of angular motion to the sensor.

According to one aspect of the invention, there is provided an angular rate sensor measuring an angular rate of angular motion applied around a z-axis of a three-dimensional cartesian coordinate system defined by x, y, and z axes which comprises: (a) a first tuning fork including a first and a second tine which extend in a z-axis direction substantially parallel to the z axis and which connect at ends thereof with each other through a first interconnecting member, the first tuning fork serving as one of a drive oscillator and a measuring oscillator; (b) a second tuning fork including a third and a fourth tine which extend in the z-axis direction outside the first and second tines, and which connect at ends thereof with each other through a second interconnecting member, the second tuning fork serving as the other of the drive oscillator and the measuring oscillator; (c) a torsion beam connecting at one end with the first interconnecting member and at the other end with the second interconnecting member, the torsion beam having an end portion connected to the first interconnecting member, the end portion having a width smaller than an overall width of the first tuning fork in a y-axis direction substantially parallel to the y axis; (d) a drive means for driving the first tuning fork to oscillate the first and second tines in phase opposition in the y-axis direction; and (e) an angular rate detecting means for detecting oscillations of the third and fourth tines of the second tuning fork in phase opposition in an x-axis direction substantially parallel to the x axis, resulting from the angular motion applied to the angular rate sensor during oscillation of the first and second tines in the y-axis direction, to detect the angular rate of the angular motion.

In the preferred mode of the invention, a second torsion beam if further provided which has a length in the z-axis direction and connects at one and with one of the first and second interconnecting members and the other end with a base to support the first and second tuning forks so as to allow the first and second tuning forks to oscillate in the y and x-axis directions. The second torsion beam has an end portion connected to the one of the first and second interconnecting members which has a width smaller than the overall width of the first tuning fork in the y-axis direction.

The first and second tines of the first tuning fork are disposed symmetrically with respect to the z axis. The third and fourth tines of the second tuning fork are disposed symmetrically with respect to the z axis. The torsion beam and the second torsion beam are oriented substantially in alignment with the z axis.

Adjacent two of the first, second, third, and fourth tines vibrate in opposite directions substantially parallel to the x-axis direction when the angular motion is applied. Geometries of the first and second tuning forks and the torsion beams are so determined that an amplitude ratio XU/XS of amplitude XU of oscillations of the first and second tines in the x-axis direction to amplitude XS of oscillations of the third and fourth tines in the x-axis direction resulting from the applied angular motion is less than or equal to 10.

Two of the first, second, third, and fourth tines on one side of the z axis may alternatively vibrate in a first direction substantially parallel to the x axis, while the other tines on the other side of the z axis may alternatively vibrate in a second direction opposite the first direction. Geometries of the first and second tuning forks and the torsion beams are so determined that an amplitude ratio XS/XU of amplitude XS of oscillations of the third and fourth in the x-axis direction to amplitude XU of oscillations of the first and second tines in the x-axis direction resulting from the applied angular motion is less than or equal to 10.

An interval ratio WS/WU of an interval WS between the first and second tines of the first tuning fork to an interval WU between the third and fourth tines of the second tuning fork is less than or equal to 2.5.

A ratio WU/HU of an interval WU between the first and second tines of the first tuning fork to a width HU of each of the first and second tines is within a range of 2.5 to 100.

A resonant frequency of the first and second tines for oscillation in the y-axis direction is different from that of the third and fourth tines for oscillation in the y-axis direction.

A resonant frequency ratio fd/fs of a resonant frequency fd of the first and second tines for oscillation in the y-axis direction resulting from excitation of the first and second tines by the drive means to a resonant frequency fs of the third and fourth tines for oscillation in the x-axis direction resulting from the applied angular motion is within one of ranges of $0.8 \leq fd/fs \leq 0.99$ and $1.01 \leq fd/fs \leq 1.2$.

The first and second tuning forks and the torsion beam are made of a single piece of piezoelectric material.

The torsion beam may alternatively be made of a single piece of material and glued to the first and second interconnecting members.

The second torsion beam may be connected with the second interconnecting member and extend in a direction opposite to the third and fourth tines.

The second torsion beam may alternatively be connected with the first interconnecting member and extends in the same direction as the first and second tines.

A third torsion beam is further provided which extends from the first interconnecting member in the same direction as the first and second tines. The second torsion beam may extend from the second interconnecting member in a direction opposite the third and fourth tines.

A support frame is provided which includes at least two side bar members extending from the second interconnecting member in a direction opposite the third and fourth tines and a connecting bar member connecting the side bar members. In this case, the second torsion beam extends in the z-axis direction from the second interconnecting member between the side bar members of the frame. The third torsion beam extends in the z-axis direction from the connecting bar member of the frame between the side bar members to support the first and second tuning forks on a base together with the second torsion beam.

The torsion beam, the second torsion beam, and the third torsion beam extend in alignment with each other.

Geometries of the first and second tuning forks and the torsion beam and the second and third torsion beams are so determined that the amplitude ratio XU/XS of amplitude XU of oscillations of the first and second tines in the x-axis direction to amplitude XS of oscillations of the third and fourth tines in the x-axis direction resulting from the applied angular motion is less than or equal to 10.

Two of the first, second, third, and fourth tines on one side of the z axis may vibrate in a first direction substantially parallel to the x axis, while the other tines on the other side of the z axis may vibrate in a second direction opposite the first direction. In this case, the geometries of the first and second tuning forks and the torsion beams are so determined that the amplitude ratio XS/XU of amplitude XS of oscillations of the third and fourth in the x-axis direction to amplitude XU of oscillations of the first and second tines in the x-axis direction resulting from the applied angular motion is less than or equal to 10.

The second interconnecting member has a width smaller in the z-axis direction than that of the first interconnecting member.

The width of each of the first and second tines and the width of each of the third and fourth tines in the y-axis direction are less than or equal to ⅗ of a length of the first interconnecting member in the y-axis direction.

A monitor means is further provided which monitors oscillation of the first tuning fork to provide a signal indicative thereof. The drive means excites the first and second tines to undergo self-excited oscillate in the y-axis direction based on the signal from the monitor means.

According to another aspect of the present invention, there is provided an angular rate sensor measuring an angular rate of angular motion applied around a z-axis of a three-dimensional cartesian coordinate system defined by x, y, and z axes which comprises: (a) an oscillating member including a first tuning fork, a second tuning fork, and a connecting member, the first turning fork including a first and a second tine which extend in a z-axis direction substantially parallel to the z axis, the first tuning fork serving as one of a drive oscillator and a measuring oscillator, the second tuning fork including a third and a fourth tine which extend in the z-axis direction outside the first and second tines of the first tuning fork, the second tuning fork serving as the other of the drive oscillator and the measuring oscillator, the connecting member connecting ends of the first, second, third and fourth tines ; (b) a drive means for driving the first tuning fork to oscillate the first and second tines in phase opposition in a y-axis direction substantially parallel to the y axis; and (c) an angular rate detecting means for detecting oscillations of the third and fourth tines of the second tuning fork in phase opposition in an x-axis direction substantially parallel to the x axis, resulting from the angular motion applied to the angular rate sensor during oscillation of the first and second tines in the y-axis direction, to detect the angular rate of the angular motion. Adjacent two of the first, second, third, and fourth tines vibrate in opposite directions substantially parallel to the x axis when the angular motion is applied. The geometry of the oscillating member is so determined that an amplitude ratio XU/XS of amplitude XU of oscillations of the first and second tines in the x-axis direction to amplitude XS of oscillations of the third and fourth tines in the x-axis direction resulting from the applied angular motion is less than or equal to 10.

In the preferred mode of the invention, a torsion beam is further provided which extends in the z-axis direction and connects at an end portion with the connecting member of the oscillating member to support the oscillating member on a base. The end portion of the torsion beam has a width smaller than an overall width of the first tuning fork in the y-axis direction.

The interval ratio WS/WU of an interval WS between the first and second tines of the first tuning fork to an interval WU between the third and fourth tines of the second tuning fork is less than or equal to 2.5.

The ratio WU/HU of an interval WU between the first and second tines of the first tuning fork to a width HU of each of the first and second tines is within a range of 2.5 to 100.

The oscillating member and the torsion beam are formed with a single piece of piezoelectric material.

The torsion beam may alternatively be made independently from the oscillating member and glued to the connecting member.

The torsion beam extends from the connecting member of the oscillating member in a direction opposite the first and second tuning forks.

A second torsion beam is further provided which extends from the connecting member in the same direction as the first and second tuning forks.

The resonant frequency of the first and second tines for oscillation in the y-axis direction is different from that of the third and fourth tines for oscillation in the y-axis direction.

The resonant frequency ratio fd/fs of a resonant frequency fd of the first and second tines for oscillation in the y-axis direction resulting from excitation of the first and second tines by the drive means to a resonant frequency fs of the third and fourth tines for oscillation in the x-axis direction resulting from the applied angular motion is within one of ranges of $0.8 \leq fd/fs \leq 0.99$ and $1.01 \leq fd/fs \leq 1.2$.

A monitor means is further provided which monitors oscillation of the first tuning fork to provide a signal indicative thereof. The drive means excites the first and second tines to undergo self-excited oscillate in the y-axis direction based on the signal from the monitor means.

According to the third aspect of the invention, there is provided an angular rate sensor measuring an angular rate of angular motion applied around a z-axis of a three-dimensional cartesian coordinate system defined by x, y, and z axes which comprises: (a) an oscillating member including a first tuning fork, a second tuning fork, and a connecting member, the first turning fork including a first and a second tine which extend in a z-axis direction substantially parallel to the z axis, the first tuning fork serving as one of a drive oscillator and a measuring oscillator, the second tuning fork including a third and a fourth tine which extend in the z-axis direction outside the first and second tines of the first tuning fork, the second tuning fork serving as the other of the drive oscillator and the measuring oscillator, the connecting member connecting ends of the first, second, third and fourth tines; (b) a drive means for driving the first tuning fork to oscillate the first and second tines in phase opposition in a y-axis direction substantially parallel to the y axis; and (c) an angular rate detecting means for detecting oscillations of the third and fourth tines of the second tuning fork in phase opposition in an x-axis direction substantially parallel to the x axis, resulting from the angular motion applied to the angular rate sensor during oscillation of the first and second tines in the y-axis direction, to detect the angular rate of the angular motion. The first and second tines of the first tuning fork are disposed symmetrically with respect to the z axis, and the third and fourth tines of the second tuning fork are disposed symmetrically with respect to the z axis, two of the first, second, third, and fourth tines on one side of the z axis vibrating in a first direction substantially parallel to the x axis and the other tines on the other side of the z axis vibrate in a second direction opposite the first direction. The geometry of the oscillating member is so determined that an amplitude ratio XS/XU of amplitude XS of oscillations of the third and fourth in the x-axis direction to amplitude XU of oscillations of the first and second tines in the x-axis direction resulting from the applied angular motion is less than or equal to 10.

In the preferred mode of the invention, a torsion beam is further provided which extends in the z-axis direction and connects at an end portion with the connecting member of the oscillating member to support the oscillating member on a base. The end portion of the torsion beam has a width smaller than an overall width of the first tuning fork in the y-axis direction.

The interval ratio WS/WU of an interval WS between the first and second tines of the first tuning fork to an interval WU between the third and fourth tines of the second tuning fork is less than or equal to 2.5.

The ratio WU/HU of an interval WU between the first and second tines of the first tuning fork to a width HU of each of the first and second tines is within a range of 2.5 to 100.

The resonant frequency of the first and second tines for oscillation in the y-axis direction is different from that of the third and fourth tines for oscillation in the y-axis direction.

The resonant frequency ratio fd/fs of a resonant frequency fd of the first and second tines for oscillation in the y-axis direction resulting from excitation of the first and second tines by the drive means to a resonant frequency fs of the third and fourth tines for oscillation in the x-axis direction resulting from the applied angular motion is within one of ranges of $0.8 \leq fd/fs \leq 0.99$ and $1.01 \leq fd/fs \leq 1.2$.

A monitor means is further provided which monitors oscillation of the first tuning fork to provide a signal indicative thereof. The drive means excites the first and second tines to undergo self-excited oscillate in the y-axis direction based on the signal from the monitor means.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4(a) is a front view which shows electrodes formed on a front surface of an oscillating member;

FIGS. 4(b), 4(c), 4(d), and 4(e) are side views which show electrodes formed on side surfaces of outer tines of an oscillating member;

FIG. 7 is a plan view which shows self-excited oscillation of drive tines of an oscillating member;

FIG. 21(a) is a front view which shows electrodes formed on a front surface of a measuring oscillating of the fifth embodiment;

FIG. 21(b) is a back view which shows electrodes formed on a back surface of a measuring oscillator of the fifth embodiment;

FIGS. 21(c) and 21(d) are side views which show electrodes formed on side surfaces of a measuring oscillator of the fifth embodiment;

FIG. 24 (a) is a front view which shows electrodes formed on a front surface of the oscillating member of FIG. 23;

FIGS. 25(a), 25(b), 25(c), 25(d), 25(e), and 25(f) are side views which show electrodes formed on side surfaces of a drive oscillator and a measuring oscillator of the oscillating member of FIG. 23;

FIG. 34(a) is a front view which shows electrodes formed on a front surface of an oscillating member of the eighth embodiment;

FIG. 34(b) is a back view which shows an electrode formed on a back surface of an oscillating member of the eighth embodiment;

FIGS. 34(c) and 32(d) are side views which show electrodes formed on side surfaces of outer tines of an oscillating member of the eighth embodiment;

DESCRIPTION OF THE PREFERRED EMBODIMENTS

Figure 1:
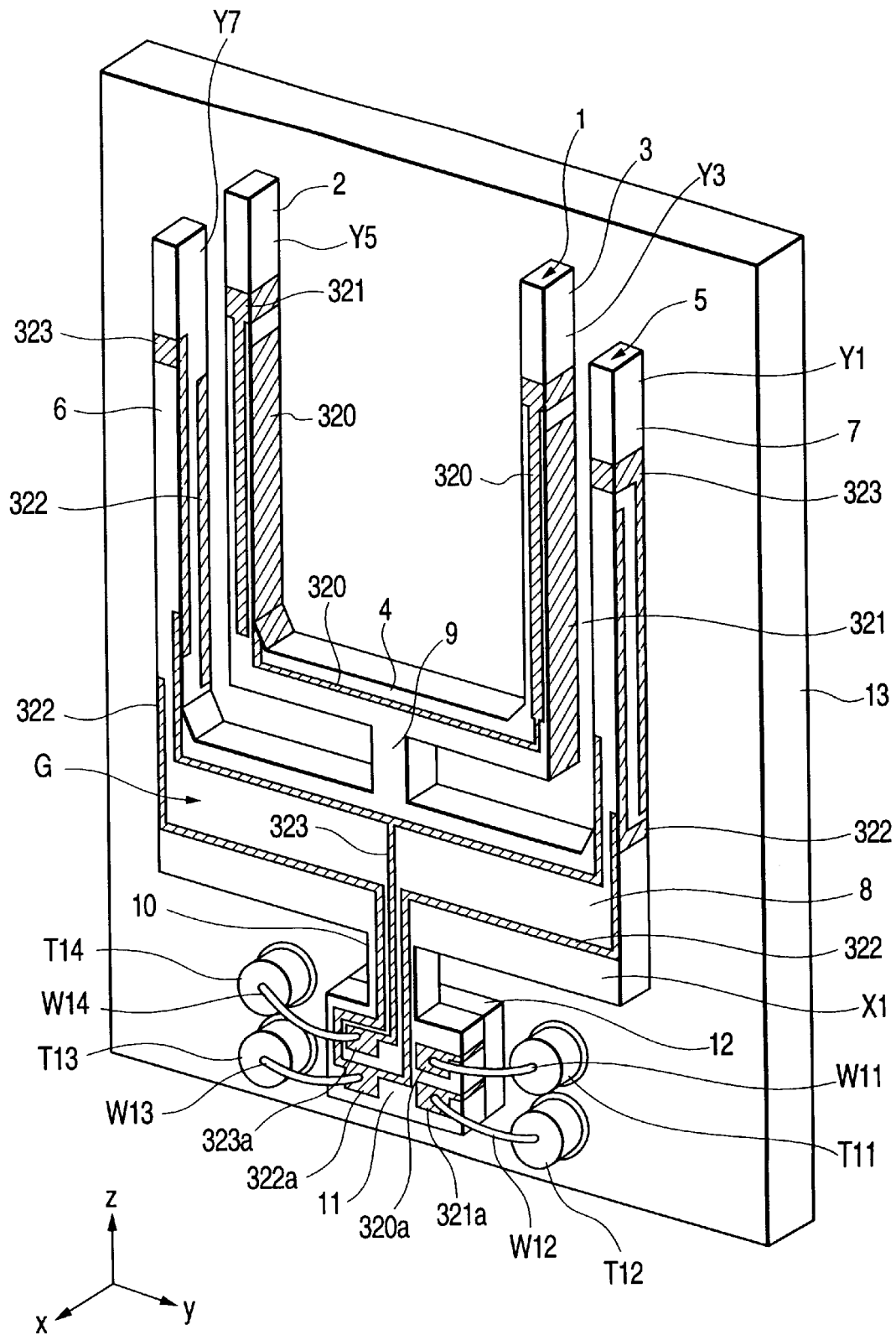
FIG. 1 is a perspective view which shows an angular rate sensor according to the first embodiment of the invention.

Referring now to the drawings, wherein like numbers refer to like parts in several views, particularly to FIG. 1, there is shown an angular rate sensor according to the first embodiment of the invention which may be employed as a yaw rate sensor designed to measure the yaw rate of motion applied to a moving object such as an automotive vehicle or a handy video camera. G denotes an oscillating member which is made of, for example, a single piece of piezoelectric material and which consists of a drive oscillator 1, a measuring oscillator 5, a first torsion beam 9, and a second torsion beam 10.

The drive oscillator 1 is made of a U-shaped tuning fork consisting of a pair of tines 2 and 3. The tines 2 and 3 are square in cross section and extend substantially parallel to each other. The tines 2 and 3 are connected at ends thereof through an interconnecting member 4.

Similarly, the measuring oscillator 5 is made of a U-shaped tuning fork consisting of a pair of tines 6 and 7. The tines 6 and 7 are square in cross section and extend substantially parallel to each other. The tines 6 and 7 are connected at ends thereof to each other through an interconnecting member 8. The measuring oscillator 5 is disposed outside the drive oscillator 1 with the tines 6 and 7 extending parallel to the tines 2 and 3 and the interconnecting member 4 extending parallel to the interconnecting member 8.

The following discussion will be made using a three-dimensional cartesian coordinate system defined by x, y, and z axes. The x axis is defined in a thicknesswise direction of each tine and each interconnecting member, the z axis is defined in a lengthwise direction of each tines, and y axis is so defined as to extend along the longitudinal center line between the tines 2 and 3. In other words, the tines 2 and 3 and the tines 6 and 7 are arranged symmetrically about the z axis.

The first torsion beam 9 is connected at one end to the center of the interconnecting member 4 and at the other end to the center of the interconnecting member 8 to support the drive oscillator 1 inside the measuring oscillator 5.

The second torsion beam 10 is connected at one end to the center of the interconnecting member 8 and at the other end to a connecting member 11 attached to a spacer 12, as will be described later in detail.

The torsion beams 9 and 10 are greater in width in the y-axis direction than the oscillator 1 and have center lines aligned with each other in the z-axis direction. In other words, the torsion beams 9 and 10 are disposed along the longitudinal center line of the oscillator 1.

The oscillating member G is made of a piezoelectric monocrystal such as a Zcut crystal plate and shaped by etching. The connecting member 11 is, as shown in FIG. 1, attached to the spacer 12 using adhesive. The spacer 12 is also attached to the base 13 using adhesive.

Specifically, the drive oscillator 1 is supported by the measuring oscillator 5 through the first torsion beam 9. The oscillators 1 and 5 and the first torsion beam 9 are supported by the second torsion beam 10. The oscillating member G is so retained by the connecting member 11 and the spacer 12 above the base 13 as to be allowed to vibrate in any directions.

The oscillating member G may alternatively be secured at an end of the second torsion beam 10 directly on the spacer 12 without use of the connecting member 11.

The geometry of the oscillating member G and the torsion beams 9 and 10 is so determined as to satisfy three conditions (1) that a ratio XU/XS of amplitude XU of oscillation of the tines 2 and 3 of the drive oscillator 1 to amplitude XS of oscillation of the tines 6 and 7 of the measuring oscillator 5 is less than or equal to 10, (2) that a resonant frequency fd of the tines 2 and 3 for vibration in the y-axis direction is different from a resonance frequency fd0 of the tines 6 and 7 for vibration in the y-axis direction, and (3) that a resonant frequency ratio fd/fs of the resonant frequency fd of the tines 2 and 3 to a resonant frequency fs of the tines 6 and 7 for vibration in the x-axis direction lies within a given range.

One example of measurements of the oscillating member G will be described with reference to FIG. 2.

The length L1 of each of the tines 2 and 3 is 6 mm. The length L2 of the interconnecting member 4 is 0.5 mm. The length L3 of the first torsion beam 9 is 1.0 mm. The length L4 of each of the tines 6 and 7 is 6.5 mm. The length L5 of the interconnecting member 8 is 1.5 mm. The length L6 of the second torsion beam 10 is 1.0 mm.

The width W1 of each of the tines 2, 3, 6, and 7 is 0.25 mm. The intervals between the tines 6 and 2 and between the tines 3 and 7 (i.e., widths W2 and W3 of slits) are each 0.3 mm. The interval W4 between the tines 2 and 3 is 3.0 mm. The width W5 of each of the torsion beams 9 and 10 is 0.4 mm. The width W6 of the interconnecting member 4 is 3.5 mm. A ratio WS/WU of an interval WS between longitudinal center lines of the tines 6 and 7 to an interval WU between longitudinal center lines of the tines 2 and 3 is approximately 1.6. The widths W5 of the torsion beams 9 and 10 may alternatively be different from each other.

As apparent from the above, the width W5 of each of the torsion beams 9 and 10 is smaller than the interval W4 between the tines 2 and 3. The dimension of the oscillating member G in the x-axis direction or the thickness t is constant, e.g., 0.3 mm.

Figure 3:
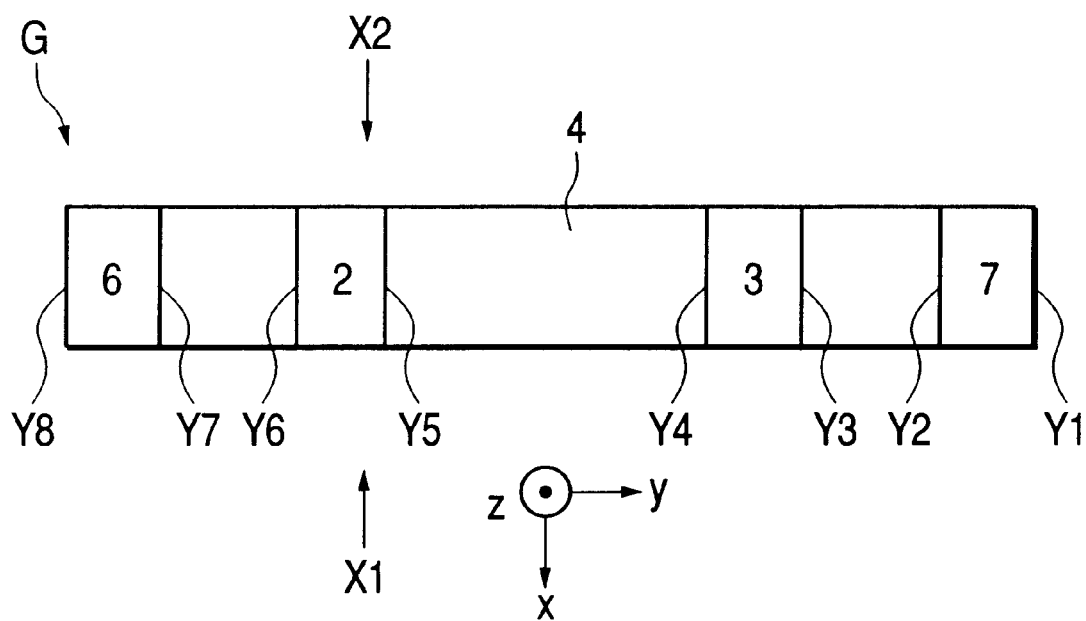
FIG. 3 is a top view of the oscillating member of FIG. 2.
Figures 5A, 5B, 5C, 5D, 5E:
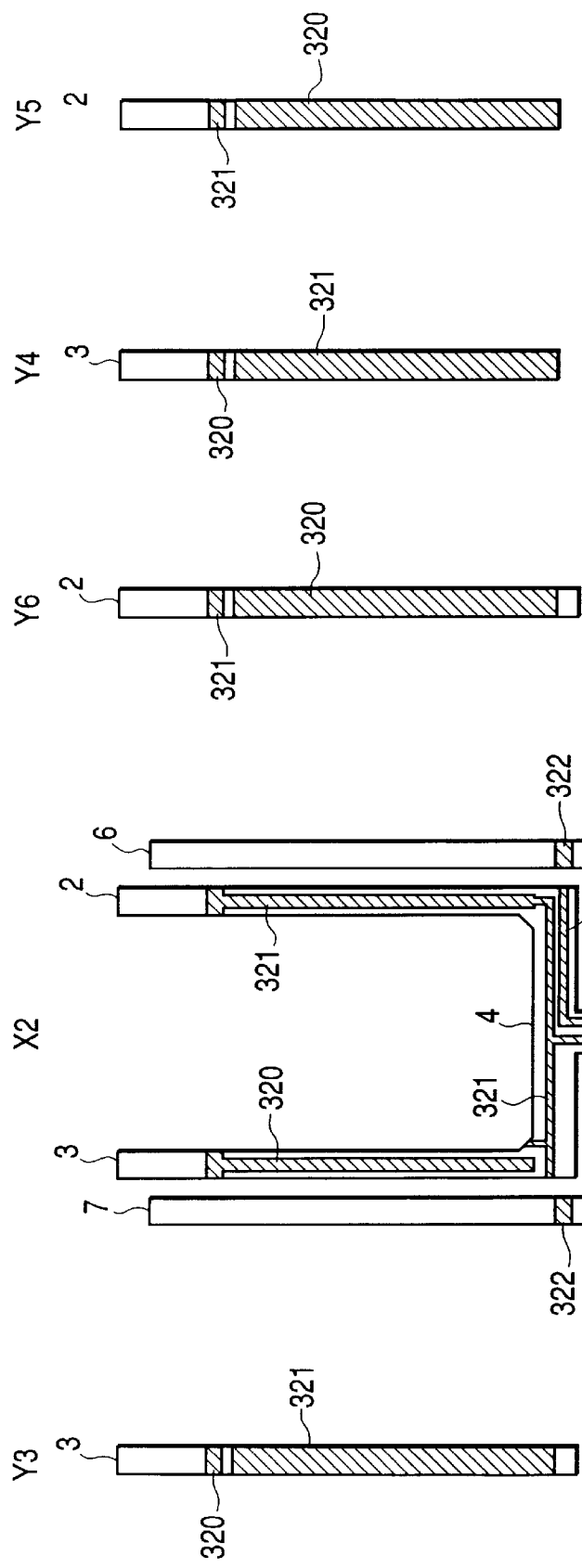
FIG. 5(a) is a back view which shows electrodes formed on a back surface of an oscillating member.
FIGS. 5(b), 5(c), 5(d), and 5(e) are side views which show electrodes formed on side surfaces of inner tines of an oscillating member.

The structure of electrodes disposed on the angular rate sensor will be described below with reference to FIGS. 3 to 5(*e*). In the following discussion, a surface of the oscillating member G facing the base 13 and the opposite surface will be referred to as the surface X2 and the surface X1, respectively. The oscillators 1 and 5, the torsion beams 9 and 10, and the connecting member 11 are, as shown in FIG. 3, flush with the surfaces X1 and X2. Outer side surfaces of the tines 7, 3, 2, and 6 will be referred to as the surfaces Y1, Y3, Y6, and Y8, respectively, and inner side surfaces thereof will be referred to as the surfaces Y2, Y4, Y5, and Y7, respectively.

The drive oscillator 1 has a drive electrode 320 formed over the surfaces Y5 and Y6 of the tine 2, the surfaces X1, X2, Y3, and Y4 of the tine 3, and the surfaces X1 and X2 of the connecting member 4. The drive electrode 320 has an extension which leads to a pad electrode 320*a* formed on the surface X1 of the connecting member 11 through the surface X1 of the interconnecting member 4, the surface X6 of the tine 2, the surfaces X2 of the interconnecting member 4, the torsion beam 9, the interconnecting member 8, the torsion beam 10 and the connecting member 1 1, and the surface Y1 of the connecting member 11.

The oscillator 1 has also a monitor electrode 321 formed over the surfaces X1, X2, Y5, and Y6 of the tine 2, the surfaces Y3 and Y4 of the tine 3, and the surface X2 of the interconnecting member 4. The monitor electrode 321 has an extension which leads to a pad electrode 321*a* formed on the surface X1 of the connecting electrode 11 through the surfaces X2 of the interconnecting member 4, the torsion beam 9, the interconnecting member 8, the torsion beam 10, and the connecting member 4 and the surface the connecting member 4 and the surface Y1 of the connecting member 11.

The measuring oscillator 5 has pickup electrodes 322 and 323 for picking up the current indicative of the angular rate of motion of the angular rate sensor. The pickup electrode 322 is formed over the surfaces X1, X2, Y7, and Y8 of the tine 6, the surfaces X1, X2, Y1, and Y2 of the tine 7, and the surface X1 of the interconnecting member 8 and leads to a pad electrode 322*a* formed on the surface X1 of the connecting member 11 through the torsion beam 10.

The pickup electrode 323 is formed over the surfaces X1, Y7, and Y8 of the tine 6, the surfaces X1, Y1, and Y2 of the tine 7, and the surface X1 of the interconnecting member 8 and leads to a pad electrode 323*a* formed on the surface X1 of the connecting member 11 through the torsion beam 10.

The base 13, as shown in FIG. 1, has terminals T11 to T14 leading to a control circuit C10, as will be described later in detail. The terminal T11 is connected to the drive electrode 320 through the wire W11 and the pad electrode 320a. The terminal T12 is connected to the monitor electrode 321 through the wire W12 and the pad electrode 321a. The terminal T13 is connected to the pickup electrode 322 through the wire W13 and the pad electrode 322a1. The terminal T14 is connected to the pickup electrode 323 through the wire W14 and the pad electrode 323a. The connection of each of the wires W11 to W14 with one of the terminals T11 to T14 and one of the electrodes 320 to 323 is accomplished with, for example, wire bonding.

Figure 6:
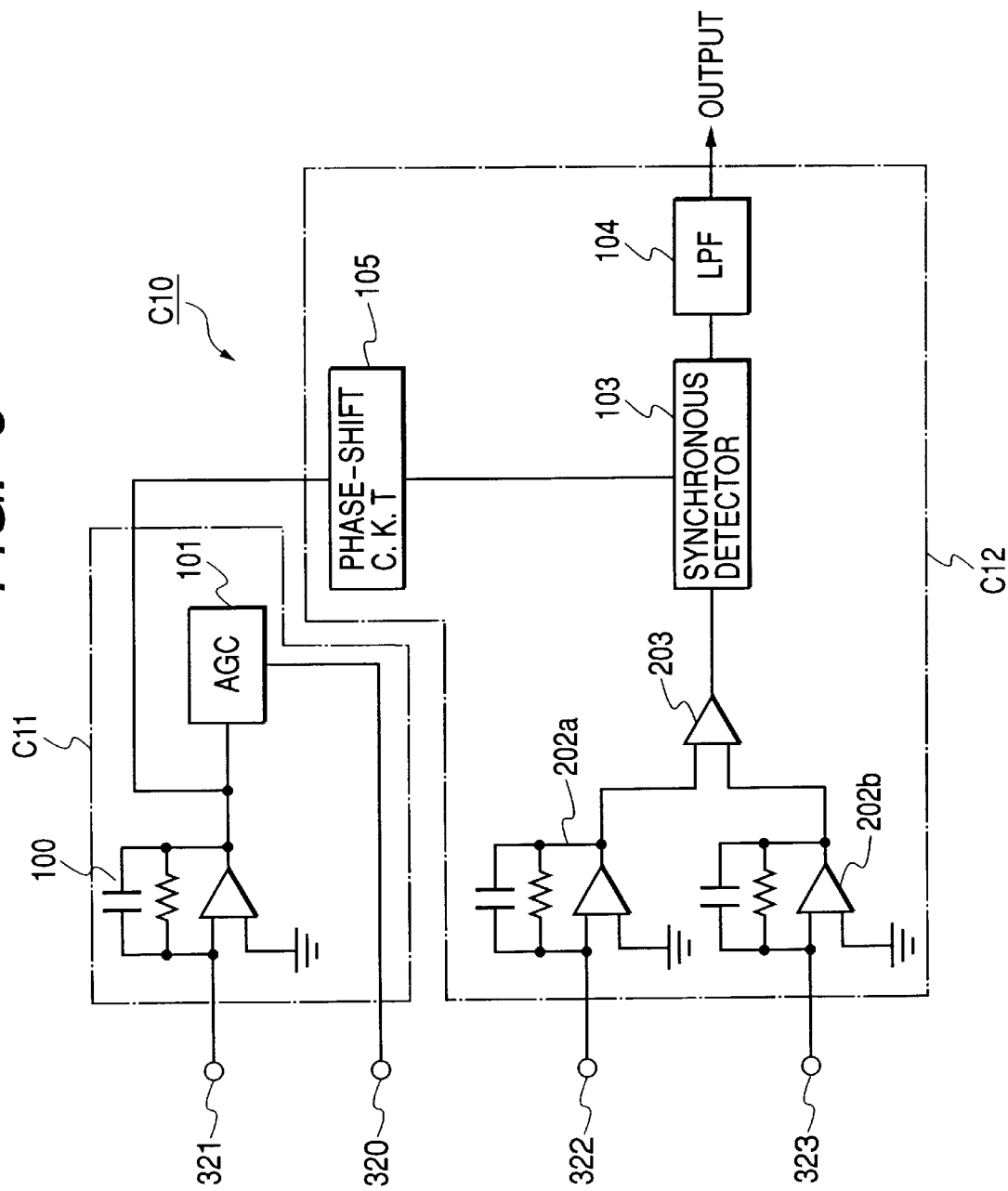
FIG. 6 is a circuit diagram which shows a control circuit of the angular rate sensor of FIG. 1.

The angular rate sensor also includes the control circuit C10, as shown in FIG. 6, which consists essentially of a drive circuit C11 for inducing self-excited oscillation of the tines 2 and 3 of the drive oscillator 1 and a detection circuit C12 for monitoring oscillations of the tines 6 and 7 of the measuring oscillator 5 to determine the angular rate of motion applied to the angular rate sensor.

The drive circuit C11 includes a charge amplifier 100 for transforming a current output from the monitor electrode 321 into a voltage and an AGC (automatic gain control) 101. The AGC 101 keeps a feedback signal from the charge amplifier 100 constant in voltage and applies it to the drive electrode 320.

The detection circuit C12 includes current-voltage converters 202a and 202b for transforming current outputs from the pickup electrodes 322 and 323 into voltages, a differential circuit 203, a synchronous detector 103, a low-pass filter 104, and a phase-shift circuit 105 for shifting the phase of the feedback signal from the charge amplifier 100 by 90°.

The outputs of the current-voltage converters 202a and 202b are inputted to the differential circuit 203. The differential circuit 203 determines the difference between the outputs of the current-voltage converters 202a and 202b and provides it to the synchronous detector 103. The synchronous detector 103 demodulates the output of the differential circuit 203 based on the feedback signal whose phase is shifted by the phase-shift circuit 105 and provides it to the LPF 104. The LPF smoothes and transforms the output of the synchronous detector 103 into a dc voltage and provides it as an angular rate signal.

In operation, an ac voltage is applied to the drive electrode 320 on the drive oscillator 1. This causes the tines 2 and 3 to oscillate, as shown in FIG. 7, symmetrically with respect to the center line (i.e., the z axis) of the drive oscillator 1 in the y-axis direction, which will be referred to as a driven oscillation mode below.

The monitor electrode 321 produces the current proportional to the amplitude of oscillations of the tines 2 and 3 and outputs it to the charge amplifier 100. The charge amplifier 100 transforms the input current into the voltage. The AGC 101 controls the voltage outputted from the charge amplifier 100 to keep it constant and applies a constant voltage to the drive electrode 320, thereby inducing the self-excited oscillations of the tines 2 and 3.

The oscillatory energy of the drive oscillator 1 is shut therein, so that the tines 6 and 7 of the measuring oscillator 5 hardly vibrate. The output or noise from the pickup electrodes 322 and 323 is, thus, very low. This is because the torsion beam 9 connecting the drive oscillator 1 and the measuring oscillator 5 has the width smaller than those of the oscillators 1 and 5, which serves to prevent particular vibrations in the y-axis direction as the oscillations of the drive oscillator 1 during the driven oscillation mode to be transmitted to the measuring oscillator 5 and because the geometries of the drive oscillator 1 and the measuring oscillator 5 are so determined that the resonant frequency of the drive oscillator 1 is different from that of the measuring oscillator 5.

Figure 8A:
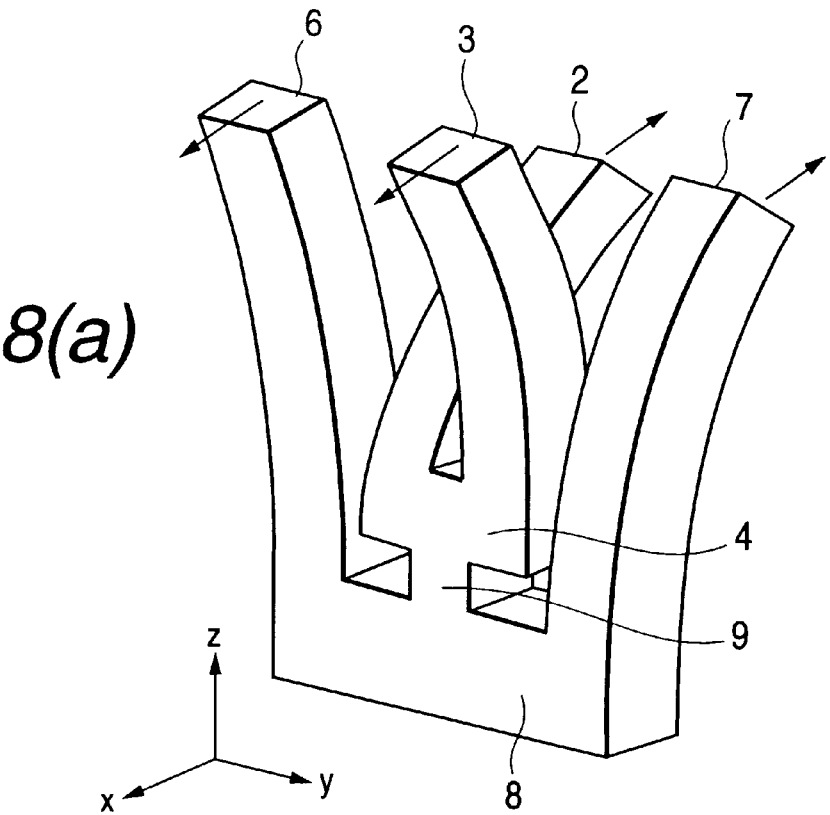
FIG. 8(a) is a perspective view which shows oscillation of an oscillating member in a first detection oscillation mode in which adjacent tines vibrate in opposite directions when angular motion is applied.

When angular motion is applied to the angular rate sensor around the z axis, it will cause the Coriolis force to act on the oscillating tines 2 and 3 of the drive oscillator 1 so that forces which are opposed to each other in the x-axis direction perpendicular to the oscillation of the drive oscillator 1 are applied to the tines 6 and 7 of the measuring oscillator 5, which causes a twisting deformation or torsion about the z axis to act on the torsion beam 9. The measuring oscillator 5, thus, twists so that the tines 6 and 7 oscillate, as shown in FIG. 8(a), in opposite directions parallel to the z axis, which will be referred to as a detection oscillation mode below.

During the detection oscillation mode, the pickup electrodes 322 and 323 produce currents proportional to the oscillations of the tines 6 and 7 in the x-axis direction, that is, the angular rate of motion of the angular rate sensor, which are, in turn, converted by the current-voltage converters 202a and 202b into voltage signals. Since the outputs of the pickup electrodes 322 and 323 are 180° out of phase with each other, the differential circuit 203 determines a difference between the outputs of the pickup electrodes 322 and 323 and provides it to the synchronous detector 103. The synchronous detector 103 demodulates the input based on the feedback signal from the phase-shift circuit 105, which is, in turn, smoothed by the LPF 104 to produce an angular rate signal in the form of a dc output.

The first torsion beam 9, as described above, has the width W5 which is smaller than not only the overall width of the drive oscillator 1 (equal to the with W6), but also the interval W4 between the tines 2 and 3. The torsion beam 9, thus, dampens oscillations of the tines 2 and 3 in the y-axis direction during the driven oscillation mode and minimizes transmission thereof to the tines 6 and 7 of the measuring oscillator 5, thereby resulting in a great decrease in noise outputted from the pickup electrodes 322 and 323.

Similarly, the second torsion beam 10 also has the width W5 smaller than the interval W4 between the tines 2 and 3, thereby minimizing transmission of unwanted vibrations applied to the base 13 from outside the angular rate sensor to the oscillators 1 and 5.

Further, the first and second torsion beams 9 and 10 are arranged substantially in alignment with each other along the z axis, thereby assuming vibration transfer characteristics that allow only torsional vibrations around the z axis to be transmitted through the first and second torsion beams 9 and 10. This allows the vibratory energy produced by the Coriolis force acting on the tines 2 and 3 when the angular motion around the z axis is applied to the angular rate sensor to be transmitted to the tines 6 and 7 in the form of torsional vibrations effectively, thereby resulting in a greatly improved S/N ratio of the angular rate sensor.

The geometry of the oscillating member G is, as described above, so determined that the ratio XU/XS of the amplitude XU of oscillation of the drive oscillator 1 to the amplitude XS of oscillation of the measuring oscillator 5 in the detection oscillation mode is less than or equal to 10, thereby also resulting in improvement of the S/N ratio.

The amplitude ratio XU/XS of the oscillator, as taught in Japanese Patent First Publication No. 8-278141 discussed in the introductory part of this application, is 10.7. In this case, the amplitude of oscillation in the x-axis direction resulting from the Coriolis force applied to the drive oscillator will be small, thus resulting in a small amplitude of oscillation of the measuring oscillator. The same is true for the case where the drive oscillator is arranged outside the measuring oscillator. Specifically, an increase in the ratio XU/XS causes the sensitivity of the angular rate sensor to be decreased.

Figure 9:
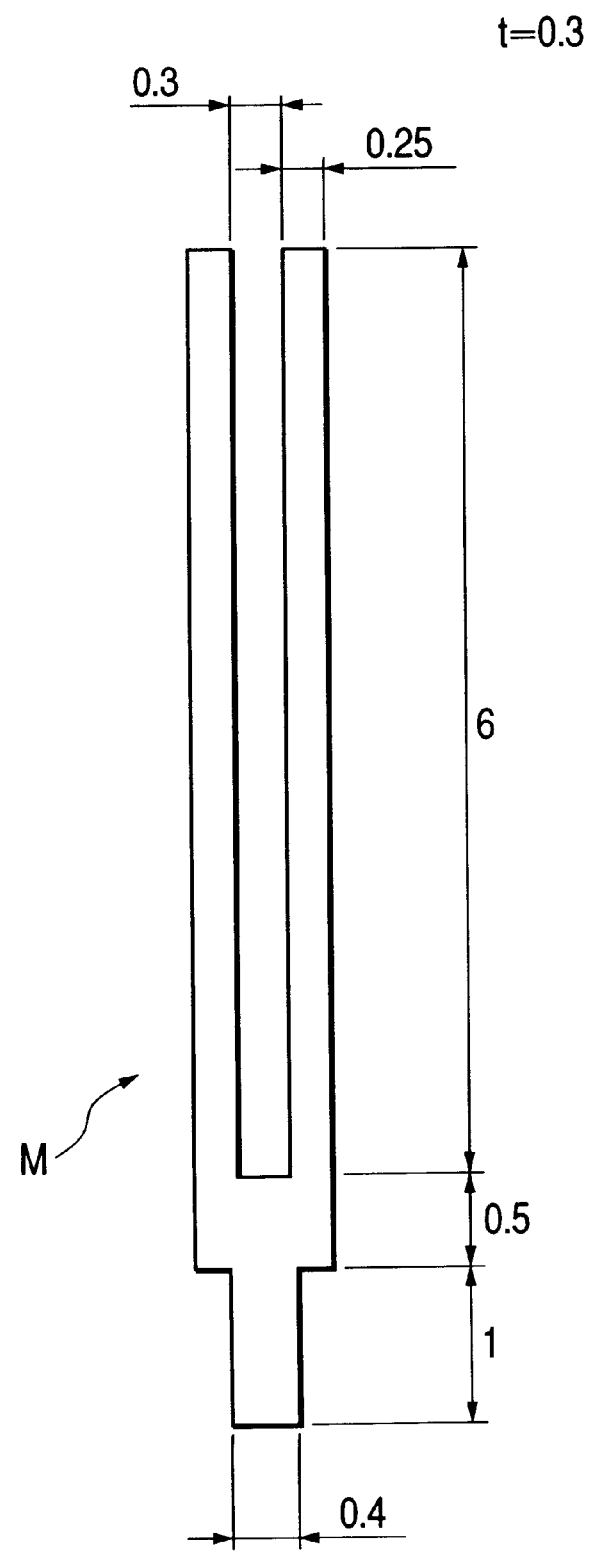
FIG. 9 is a plan view which shows a reference specimen of an oscillating member.
Figure 10:
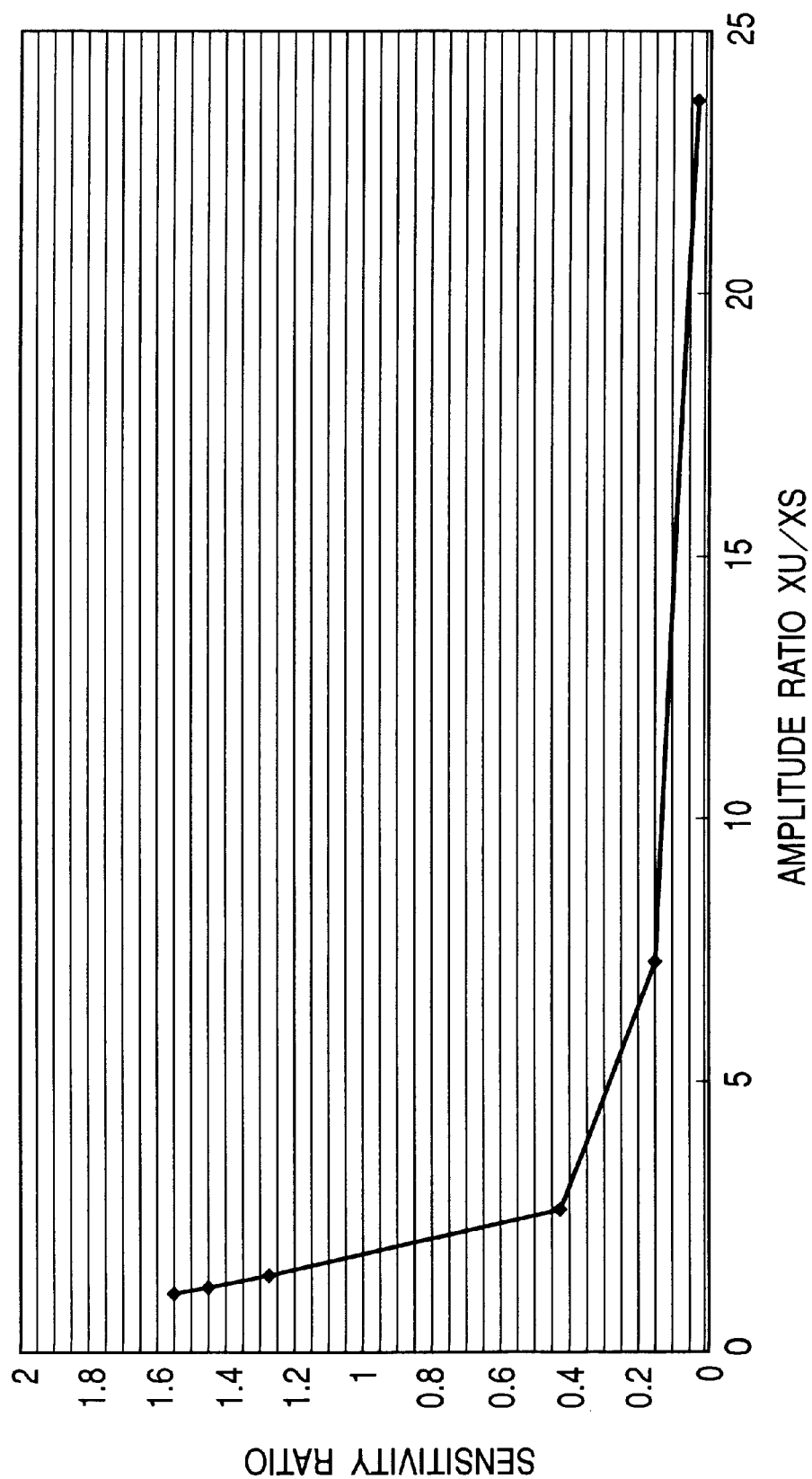
FIG. 10 is a graph which shows the relation between a sensitivity ratio and a ratio XU/XS of amplitude XU of oscillation of a drive oscillator to amplitude XS of oscillation of a measuring oscillator.

FIG. 10 represents the relation between the amplitude ratio XU/XS and the sensitivity of the angular rate sensor of this embodiment (i.e., the amplitude of oscillation of the measuring oscillator 5). The sensitivity ratio on the ordinate axis represents a ratio of amplitude of oscillation of the tines 6 and 7 of the measuring oscillator 5 of this embodiment to amplitude of oscillation of a two-tine tuning fork M, as illustrated as a reference specimen in FIG. 9, produced when a dynamic load corresponding to the Coriolis force acting on the tines 2 and 3 of the drive oscillator 1 of this embodiment is applied. The amplitude ratio XU/XS is changed by changing the interval between the tines 2 and 3 of the drive oscillator 1 (i.e., the width W4 shown in FIG. 2) within a range from 0.3 to 5 mm. The graph shows that a decrease in the amplitude ratio XU/XS causes the sensitivity to be increased. Specifically, the decrease in the amplitude ratio XU/XS causes the vibratory energy resulting from the Coriolis force to be dispersed over the drive oscillator 1 and the measuring oscillator 5, thereby resulting in a great increase in sensitivity of the angular rate sensor.

Figure 2:
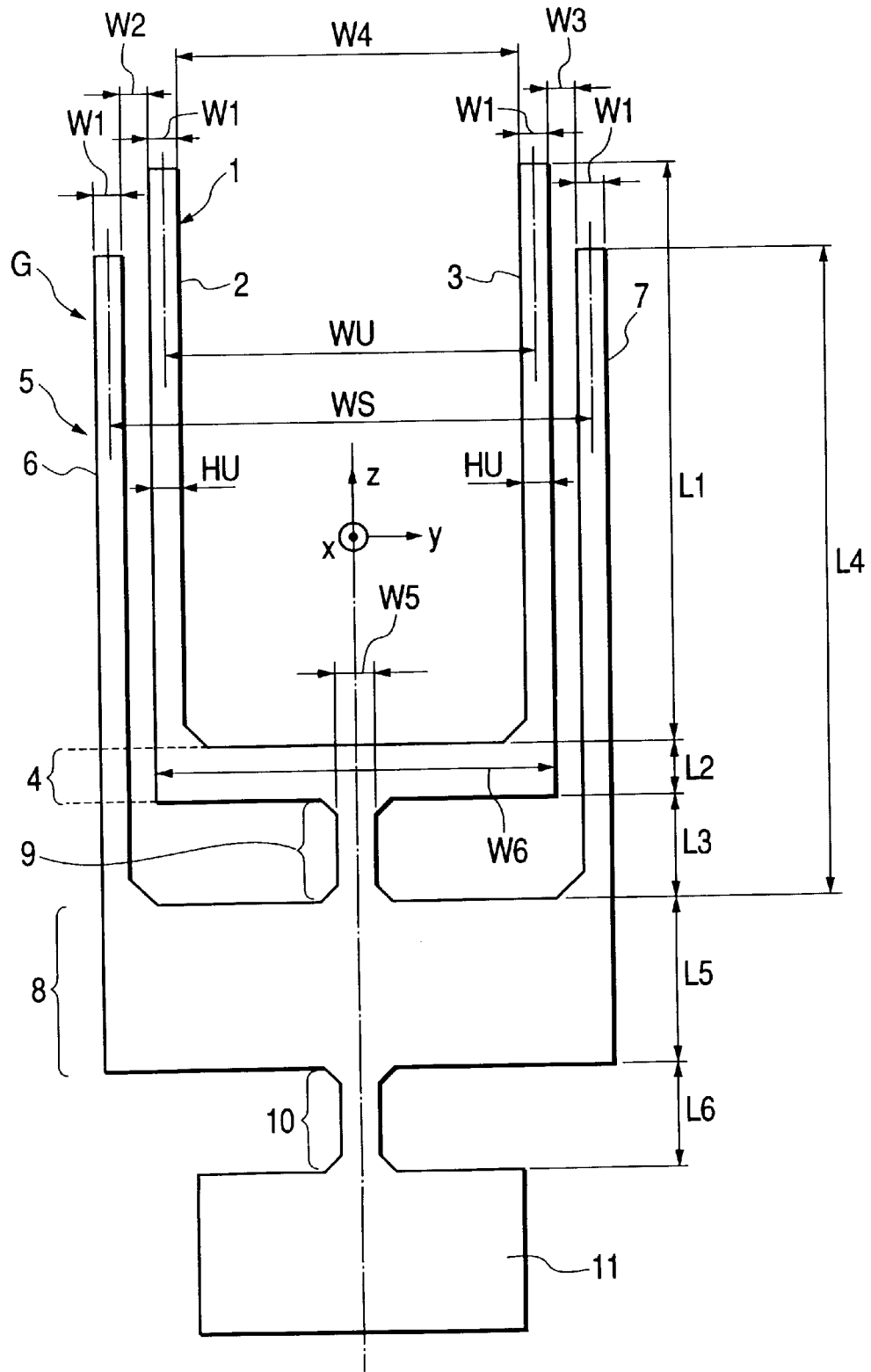
FIG. 2 is a plan view of an oscillating member for explaining measurements thereof.

The decrease in the amplitude ratio XU/XS may be accomplished by decreasing the ratio WS/WU of the interval WS, as shown in FIG. 2, between the tines 6 and 7 of the measuring oscillator 5 to the interval WU between the tines 2 and 3 of the drive oscillator 1.

Figure 11:
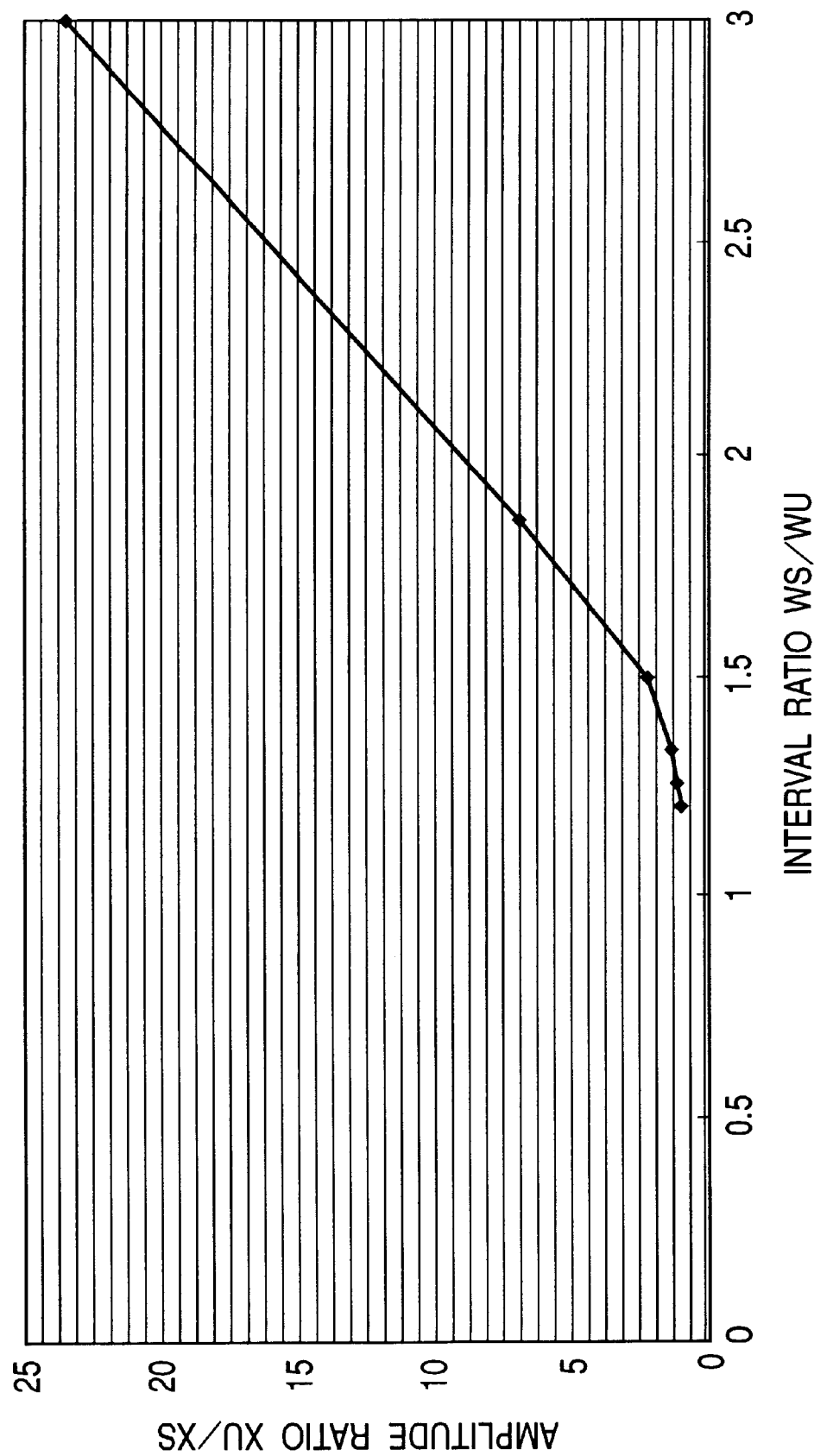
FIG. 11 is a graph which shows the relation between a ratio XU/XS of amplitude XU of oscillation of a drive oscillator to amplitude XS of oscillation of a measuring oscillator and a ratio WS/WU of an interval WS between tines of a measuring oscillator and an interval WU between tines of a drive oscillator.

Decreasing the amplitude ratio XU/XS, that is, matching amplitudes of oscillations of the drive oscillator 1 and the measuring oscillator 5 in the x-axis direction requires matching lengths of portions of the oscillators 1 and 5 perpendicular to the axis of rotation (i.e., the z-axis), that is, decreasing the interval ratio WS/WU of the interval WS between the tines 6 and 7 of the measuring oscillator 5 to the interval WU between the tines 2 and 3 of the drive oscillator 1 from the view point of agreement of measures of ease of rotational vibrations of the oscillators 1 and 5 (i.e., agreement of moments of inertia of the oscillators 1 and 5). The relation between the interval ratio WS/WU and the amplitude ratio XU/XS is represented in FIG. 11. The graph shows that the interval ratio WS/WU is preferably less than or equal to 2.5 for obtaining a desired value of the amplitude ratio XU/XS.

For the agreement of measures of ease of rotational vibrations of the oscillators 1 and 5, it is also advisable that the measuring oscillator 5 arranged outside the drive oscillator 1 be supported on the base 13 through the second torsion beam 10.

For increasing a measure of torsion or torque applied to the measuring oscillator 5 resulting from the Coriolis force acting on the drive oscillator 1, it is advisable that the interval WU between the tines 2 and 3 of the drive oscillator 1 be increased and that a ratio WU/HU of the interval WU to the width HU, as shown in FIG. 2, of each of the tines 2 and 3 be more than or equal to 2.5 and less than or equal to 100. When the ratio WS/WU is 1.34, the amplitude ratio XU/XS has been found to show a smaller value of 1.33 and that the amplitude XS of oscillation of the measuring oscillator 5 resulting from the Coriolis force, that is, the sensitivity of the angular rate sensor is 1.3 times that of the two-tine tuning fork, as illustrated in FIG. 9. It has been found experimentally that the amplitude ratio XU/XS is preferably less than or equal to 20.

The tines 2 and 3 of the drive oscillator 1 and the tines 6 and 7 of the measuring oscillator 5 have, as described above, the same width W1. The length L1 of the drive oscillator 1 is different from the length L4 of the measuring oscillator 5. This causes the resonant frequencies at which vibrations of the oscillators 1 and 5 in the y-axis direction are produced during the driven oscillation mode to be different from each other, thereby attenuating the vibrations of the tines 2 and 3 of the drive oscillator I transmitted to the tines 6 and 7 of the measuring oscillator 5, resulting in improvement of the S/N ratio.

The geometry of the oscillating member G provides a ratio fd/fs of the resonant frequency fd of the tines 2 and 3 to the resonant frequency fs of the tines 6 and 7 of 1.04, thereby minimizing interference of oscillation of the drive oscillator 1 in the driven oscillation mode with oscillation of the measuring oscillator 5 in the detection oscillation mode, resulting in improvement of the S/N ratio.

The inventors of this application have found experimentally that the resonant frequency ratio fd/fs lies preferably within a range of 0.8 to 0.99 (i.e., $0.8 \leq fd/fs \leq 0.99$) or a range of 1.01 to 1.2 (i.e., $1.01 \leq S\ fd/fs \leq 1.2$).

The oscillators 1 and 5 may alternatively be made from PZT, lithium niobate, or La3Ga5SiO20 and machined using a dicing technique.

It is advisable that width W1 of each of the tines 2, 3, 6, and 7 be 0.01 mm to 5 mm from the standpoint of a useful size, ease of machining, and driving frequency of the angular rate sensor. It is also advisable that the thickness of the oscillators 1 and 5 be greater than half the width W1 and smaller than twice the width W1, namely 0.005 mm to 10 mm.

The above dimensional and electrical requirements hold true of several embodiments as will be discussed below.

Figure 12:
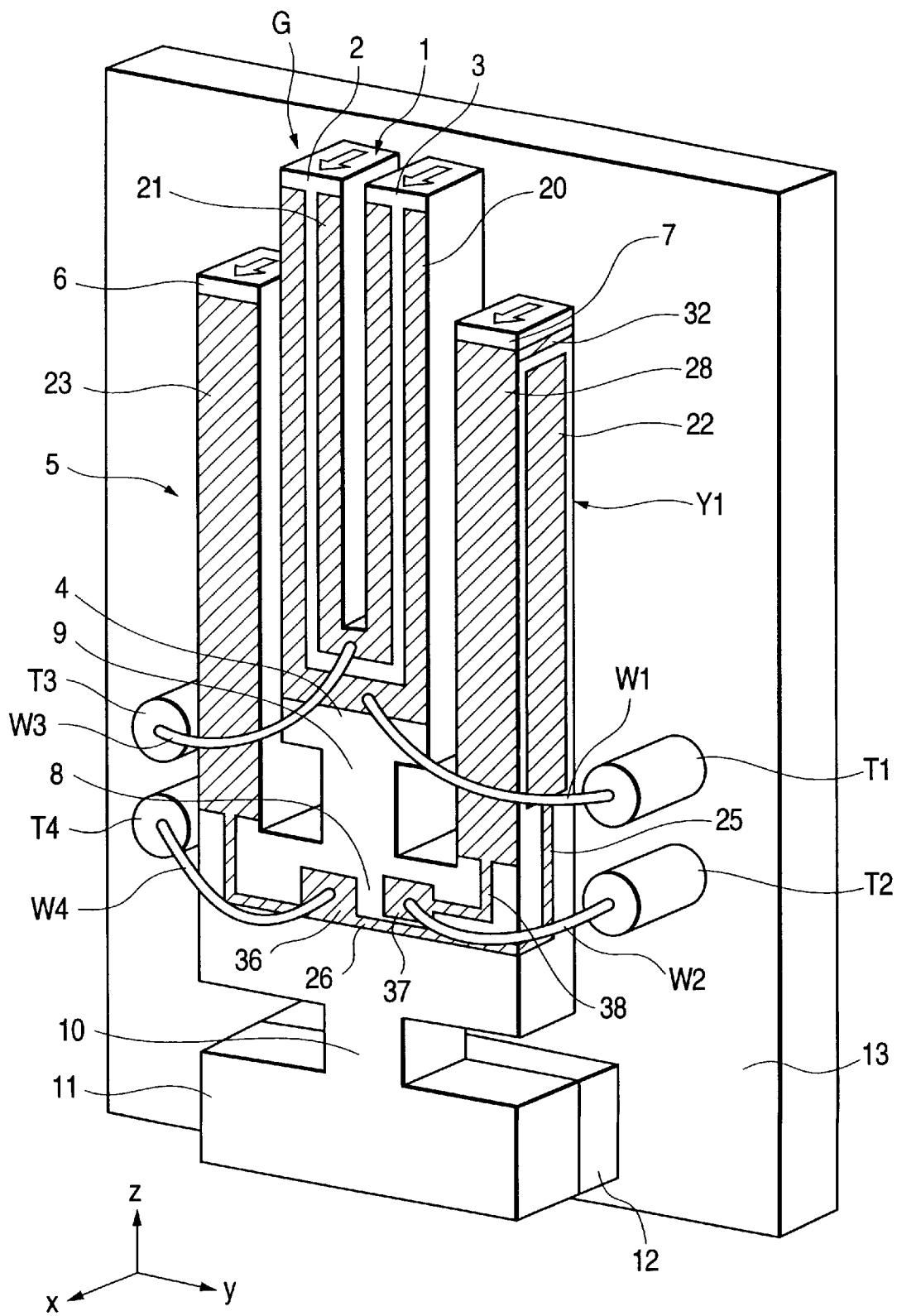
FIG. 12 is a perspective view which shows an angular rate sensor according to the second embodiment of the invention.

FIG. 12 shows an angular rate sensor according to the second embodiment of the invention. The same reference numbers as employed in the first embodiment refer to the same parts, and explanation thereof will be omitted here.

The drive oscillator 1 and the measuring oscillator 5 are of U-shape. The drive oscillator 1 projects upward from the measuring oscillator 5.

The oscillating member G is made of a single piece of piezoelectric material such as PZT (lead zirconate titanate) and machined by dicing. The tines 2, 3, 6, and 7 are polarized uniformly in the x-axis direction, as indicated by white arrows in the drawing.

The connecting member 11 is welded to the spacer 12. The spacer 12 is also welded to the base 13.

The geometry of the oscillating member G is, similar to the first embodiment, so determined as to satisfy three conditions (1) that the ratio XU/XS of amplitude XU of oscillation of the tines 2 and 3 of the drive oscillator 1 to amplitude XS of oscillation of the tines 6 and 7 of the measuring oscillator 5 is less than or equal to 10, (2) that the resonant frequency fd of the tines 2 and 3 for vibration in the y-axis direction is different from the resonance frequency fd0 of the tines 6 and 7 for vibration in the y-axis direction during the driven oscillation mode, and (3) that the resonant frequency ratio fd/fs of the resonant frequency fd of the tines 2 and 3 for vibration in the driven oscillation mode to the resonant frequency fs of the tines 6 and 7 for vibration in the detection oscillation mode lies within a given range.

Figure 13:
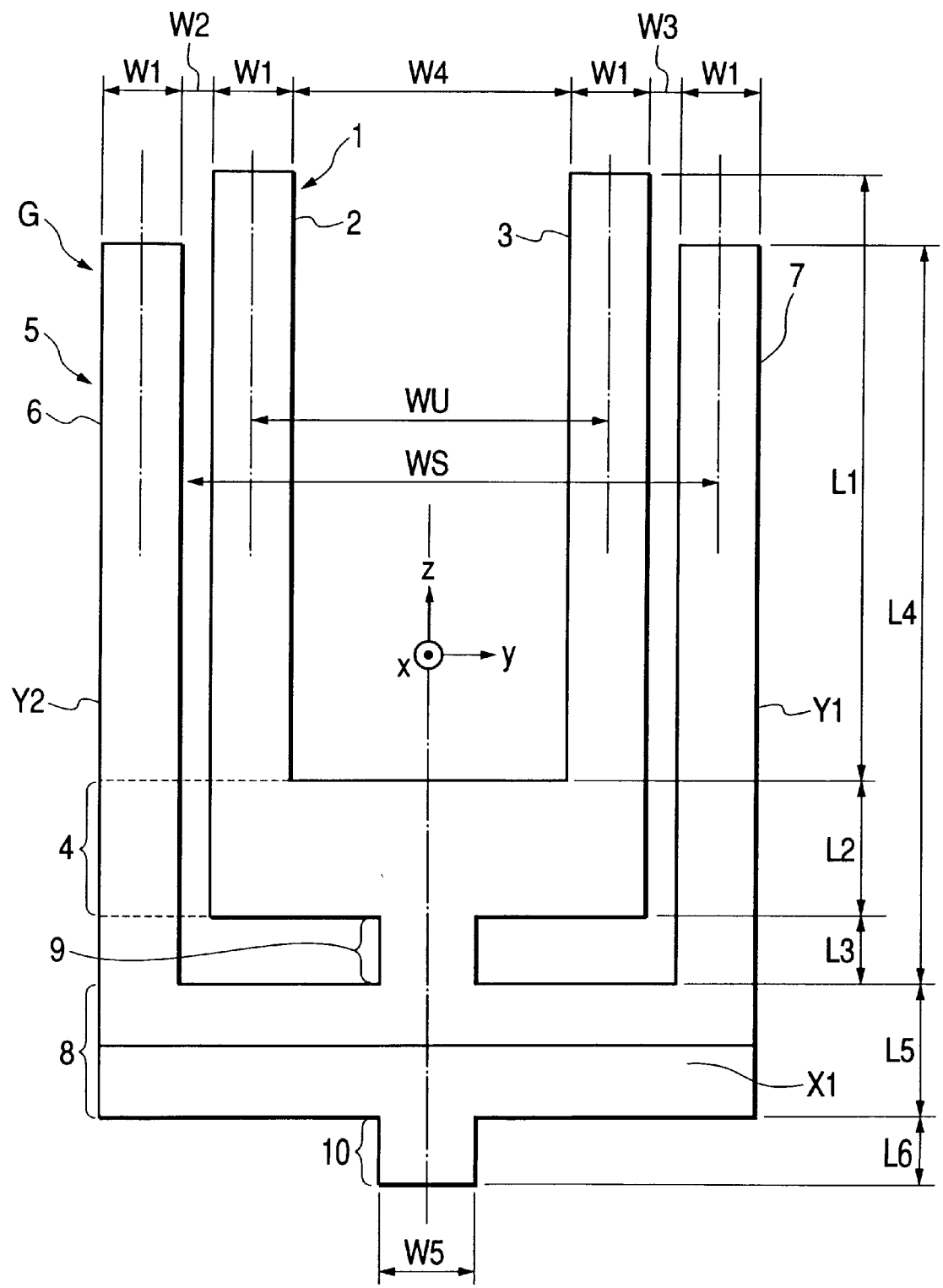
FIG. 13 is a plan view of an oscillating member for explaining measurements thereof.

FIG. 13 shows one example of measurements of the oscillating member G of the second embodiment.

The length L1 of each of the tines 2 and 3 is 9 mm. The length L2 of the interconnecting member 4 is 2 mm. The length L3 of the first torsion beam 9 is 1.0 mm. The length L4 of each of the tines 6 and 7 is 11 mm. The length L5 of the interconnecting member 8 is 2.0 mm. The length L6 of the second torsion beam 10 is 1.0 mm.

The width W1 of each of the tines 2,3,6, and 7 is 1.2 mm. The intervals between the tines 6 and 2 and between the tines 3 and 7 (i.e., widths W2 and W3 of slits) are each 0.4 mm. The interval W4 between the tines 2 and 3 is 4.0 mm. The overall width of the oscillator 1 is, thus, 9.6 mm. The width W5 of each of the torsion beams 9 and 10 is 1.4 mm. The width W6 of the interconnecting member 4 is 3.5 mm. The ratio WS/WU of the interval WU between longitudinal center lines of the tines 2 and 3 to the interval WU between longitudinal center lines of the tines 6 and 7 is approximately 1.6. The widths W5 of the torsion beams 9 and 10 may alternatively be different from each other.

Figures 14A, 14B, 14C, 14D:
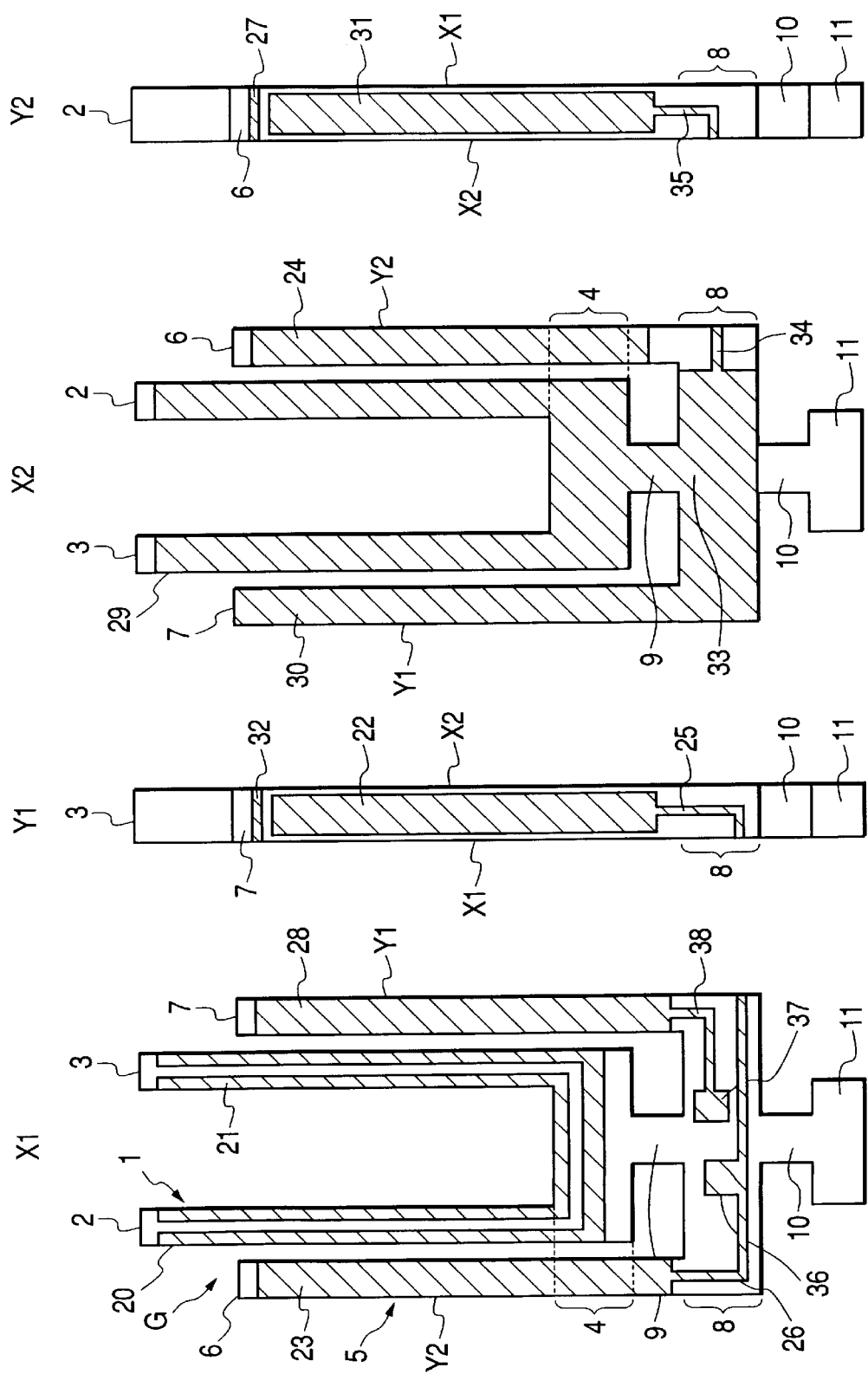
FIG. 14(a) is a front view which shows electrodes formed on a front surface of an oscillating member of the second embodiment.
FIG. 14(b) is a back view which shows electrodes formed on a back surface of an oscillating member of the second embodiment.
FIGS. 14(c) and 14(d) are side views which show electrodes formed on side surfaces of outer tines of an oscillating member of the second embodiment.

The drive oscillator 1 has, as shown in FIG. 14(a), the drive electrode 20 and the monitor electrode 21 arranged inside the drive electrode 20. The drive electrode 20 extends from an outer side of the surface X of the tine 2 to an outer side of the surface X of the tine 3 through the interconnecting member 4. The monitor electrode 21 extends from an inner side of the surface X1 of the tine 2 to an inner side of the surface X of the tine 3 through the interconnecting member 4.

The measuring oscillator 5 has, as shown in FIGS. 14(a), 14(b), and 14(c), pickup electrodes 22, 23, and 24. The pickup electrode 22 occupies most of the surface Y1 of the tine 7. Similarly, the pickup electrodes 23 and 24 occupy most of the surface X1 of the tine 6 and most of the surface X2 of the tine 6, respectively. The pickup electrodes 22, 23, and 24 are connected to each other through leads 25, 26, and 27. Specifically, the pickup electrodes 22 and 23 are connected through the lead 25 formed on the surface Y1 of the tine 7 and the lead 26 formed on the surface X1 of the interconnecting member 8. The pickup electrodes 23 and 24 are connected through the lead 27, as shown in FIG. 14(d), formed on the surface Y2 of the tine 6.

Common electrodes 28, 29, 30, and 31 are, as shown in FIGS. 14(a), 14(b), and 14(d), provided to develop a reference potential for the drive, monitor, and pickup electrodes, as described above. The common electrode 28 is formed on substantially all the surface X1 of the tine 7. The common electrode 29 is formed on substantially all the surface X2 of the drive oscillator 1. The common electrode 30 occupies most of the surfaces X2 of the tine 7 and the interconnecting member 8. The common electrode 31 occupies most of the surface Y2 of the tine 6. The common electrodes 28 to 31 are connected to each other through leads 32, 33, 34, and 35. The common electrodes 28 and 30 are connected through the lead 32, as shown in FIG. 14(c), formed on the surface Y1 of the tine 7. The common electrodes 29 and 30 are connected through the lead 33, as shown in FIG. 14(b), formed on the surface X2 of the torsion beam 9. The common electrodes 30 and 31 are connected through the leads 34 and 35, as shown in FIGS. 14(b) and 14(d), formed on the surface X2 of the interconnecting member 8 and the surface Y2 of the tine 6, respectively.

The interconnecting member 8 has pad electrodes 36 and 37 formed on the surface X1. The pad electrode 36 is connected to the middle of the lead 26 leading to the pickup electrodes 22 and 23. The pad electrode 37 is connected to an end of the lead 38 leading to the common electrode 28. Thus, the pad electrode 36 communicates with the pickup electrodes 22 to 24. The pad electrode 37 communicates with the common electrodes 28 to 31.

No electrodes are formed on inner and outer side surfaces of the drive oscillator 1 perpendicular to the surfaces X1 and Y1 and inner surfaces of the measuring oscillator 5 perpendicular to the surfaces X1 and Y1.

The base 13 has disposed thereon the terminals T1 to T4 which communicate with the drive electrode 20, the pad electrode 37, the monitor electrode 21, and the pad electrode 36 through the wires W1, W2, W3, and W4, respectively.

Figure 15:
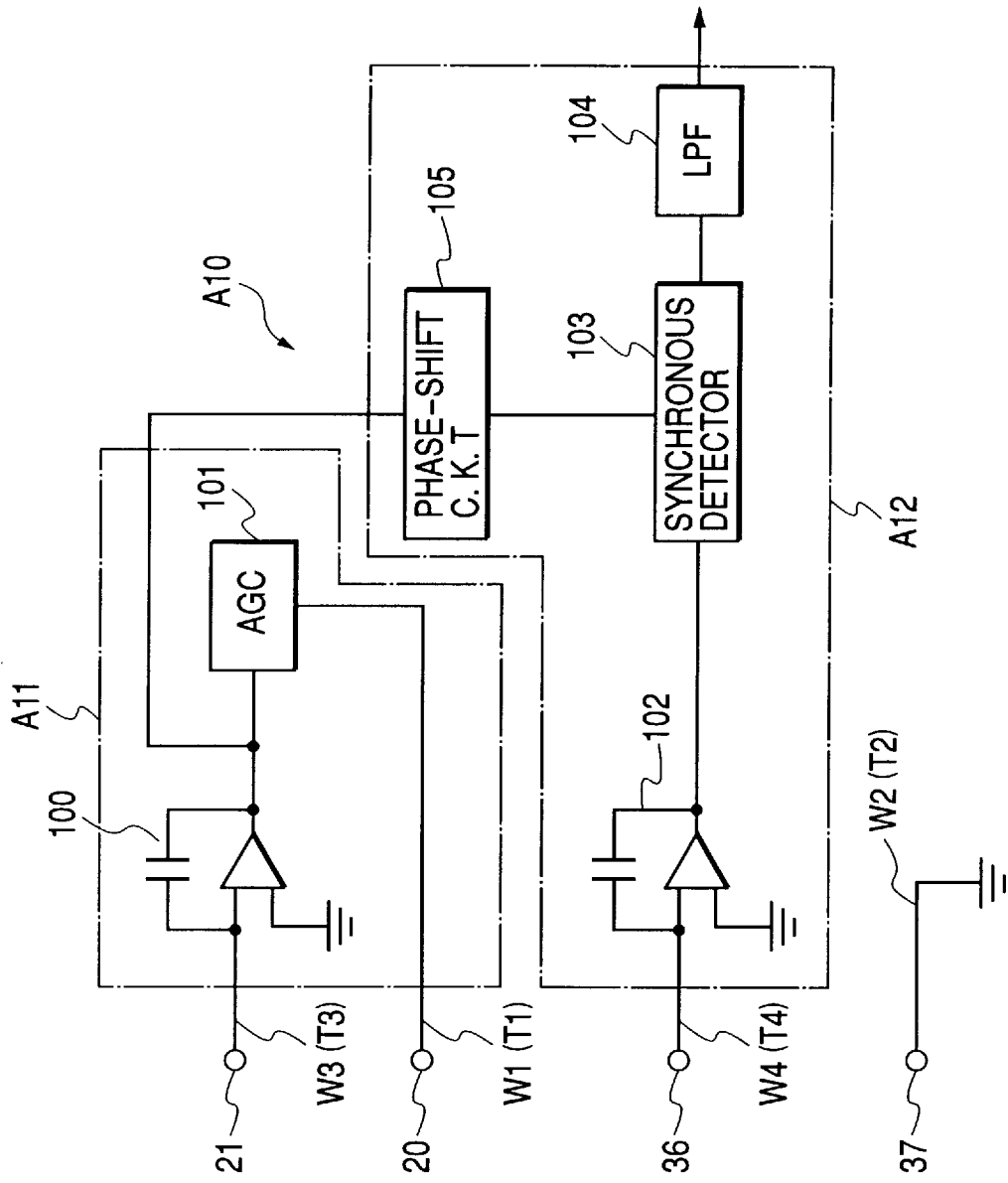
FIG. 15 is a circuit diagram which shows a control circuit of the angular rate sensor of FIG. 12.

FIG. 15 shows a control circuit A10 for the angular rate sensor of the second embodiment. The control circuit A10 consists essentially of a drive circuit A11 for inducing self-excited oscillation of the tines 2 and 3 of the drive oscillator 1 and a detection circuit A12 for monitoring oscillations of the tines 6 and 7 of the measuring oscillator 5 to determine the angular rate of motion applied to the angular rate sensor. The common electrodes 28, 29, 30, and 31 are connected to ground through the pad electrode 37.

The drive circuit A11 includes a charge amplifier 100 for transforming a current output from the monitor electrode 21 into a voltage and an AGC (automatic gain control) 101. The AGC 101 keeps a feedback signal from the charge amplifier 100 constant in voltage and applies it to the drive electrode 20.

The detection circuit A12 includes a current-voltage converter 102 for transforming a current output from the pad electrode 36 communicating with the pickup electrodes 22 to 24 into voltages, a synchronous detector 103, a low-pass filter 104, and a phase-shift circuit 105 for shifting the phase of the feedback signal from the charge amplifier 100 by 90°.

The output of the current-voltage converter is inputted to the synchronous detector 103. The synchronous detector 103 demodulates the input based on the feedback signal whose phase is shifted by the phase-shift circuit 105 and provides it to the LPF 104. The LPF smoothes and transforms the output of the synchronous detector 103 into a dc voltage and provides it as an angular rate signal.

In operation, an ac voltage is applied across the drive electrode 20 and the common electrode 29. This causes electric charge to be biased on the tines 2 and 3 so that the tines 2 and 3 oscillate, as shown in FIG. 7, in the driven oscillation mode.

The monitor electrode 21 produces the current proportional to the amplitude of oscillations of the tines 2 and 3 and outputs it to the charge amplifier 100. The charge amplifier 100 transforms the input current into the voltage. The AGC 101 controls the voltage outputted from the charge amplifier 100 to keep it constant and applies a constant voltage to the drive electrode 20, thereby inducing the self-excited oscillations of the tines 2 and 3.

When the angular rate of motion applied to the angular rate sensor is zero (0), the tines 6 and 7 of the measuring oscillator 5 hardly vibrate in the y-axis direction, so that outputs from the pickup electrodes 22 to 24 or noise signals are very small. The amplitude of oscillations of the tines 6 and 7 is approximately 1/20000 of that of oscillations of the tines 2 and 3. This is because the geometry of the oscillating member G is so determined that the resonant frequencies of the oscillators 1 and 5 which induce oscillations in the y-axis direction are different from each other.

When angular motion is applied to the angular rate sensor around the z axis, it will cause the Coriolis force to act on the oscillating tines 2 and 3 of the drive oscillator 1, so that forces which are opposed to each other in the x-axis direction perpendicular to the oscillation of the drive oscillator 1 are applied to the tines 6 and 7 of the measuring oscillator 5, which induces a twisting deformation or torsion of the interconnecting member 4 and the torsion beam 9 about the z axis. The torsion of the torsion beam 9 causes the measuring oscillator 5 to twist to oscillate the tines 6 and 7, as shown in FIG. 8(a), in the detection oscillation mode.

During the detection oscillation mode, the pickup electrodes 22 to 24 produce current proportional to the oscillations of the tines 6 and 7 in the x-axis direction, that is, the angular rate of motion of the angular rate sensor, which is, in turn, converted by the current-voltage converter 102 into a voltage signal. The voltage signal is inputted to the synchronous detector 103 and then outputted from the LPF as an angular rate signal in the form of a dc output.

The pickup electrodes 23 and 24 and the common electrode 31 on the tine 6 are reverse in positional relation to the pickup electrodes 22 and the common electrodes 28 and 30 on the tine 7. Thus, when the tines 2 and 7 oscillate in opposite directions, it will cause the pickup electrodes 22, 23, and 24 to produce in-phase currents.

The first torsion beam 9, similar to the first embodiment, has the width W5 which is smaller than not only the overall width of the drive oscillator 1 (equal to the with W6), but also the interval W4 between the tines 2 and 3. The torsion beam 9, thus, dampens oscillations of the tines 2 and 3 in the y-axis direction during the driven oscillation mode and minimizes transmission thereof to the tines 6 and 7 of the measuring oscillator 5, thereby resulting in a great decrease in noise outputted from the pickup electrodes 22 to 24.

Similarly, the second torsion beam 10 also has the width W5 smaller than the interval W4 between the tines 2 and 3, thereby minimizing transmission of unwanted vibrations applied to the base 13 from outside the angular rate sensor to the oscillators 1 and 5.

The first and second torsion beams 9 and 10 are arranged substantially in alignment with each other along the z axis, thereby assuming vibration transfer characteristics that allow only torsional vibrations around the z axis to be transmitted through the first and second torsion beams 9 and 10. This allows the vibratory energy produced by the Coriolis force acting on the tines 2 and 3 when the angular motion around the z axis is applied to the angular rate sensor to be transmitted to the tines 6 and 7 in the form of torsional vibrations effectively, thereby resulting in a greatly improved S/N ratio of the angular rate sensor.

The tines 2 and 3 of the drive oscillator 1 and the tines 6 and 7 of the measuring oscillator 5 have the same width W1. The length L1 of the drive oscillator 1 is different from the length L4 of the measuring oscillator 5. The resonant frequencies at which vibrations of the oscillators 1 and 5 in the y-axis direction are produced during the driven oscillation mode is, thus, different from each other, thereby attenuating unwanted vibrations of the tines 2 and 3 of the drive oscillator 1 transmitted to the tines 6 and 7 of the measuring oscillator 5, resulting in improvement of the S/N ratio.

The geometry of the oscillating member G is so determined as to provide a ratio fd/fs of the resonant frequency fd of the tines 2 and 3 to the resonant frequency fs of the tines 6 and 7 of 1.13, thereby minimizing interference of oscillation of the drive oscillator 1 in the driven oscillation mode with oscillation of the measuring oscillator 5 in the detection oscillation mode, resulting in improvement of the S/N ratio. It is advisable that the resonant frequency ratio fd/fs be within a range of 0.8 to 0.99.

The geometry of the oscillating member G is, similar to the first embodiment, so determined that the ratio XU/XS of the amplitude XU of oscillation of the drive oscillator 1 to the amplitude XS of oscillation of the measuring oscillator 5 in the detection oscillation mode is less than or equal to 10, thereby also resulting in improvement of the S/N ratio.

The decrease in the amplitude ratio XU/XS may be accomplished by decreasing the ratio WS/WU of the interval WS, as shown in FIG. 13, between the tines 6 and 7 of the measuring oscillator 5 to the interval WU between the tines 2 and 3 of the drive oscillator 1.

In this embodiment, the interval ratio WS/WU is 1.6. The amplitude ratio XU/XS is 3.1.

The oscillating member G may be secured on the connecting member 11 without use of the second torsion beam 10 by retaining the bottom of the measuring oscillator 5 (i.e., the interconnecting member 8) on the connecting member 11 using a clamper.

Figure 8B:
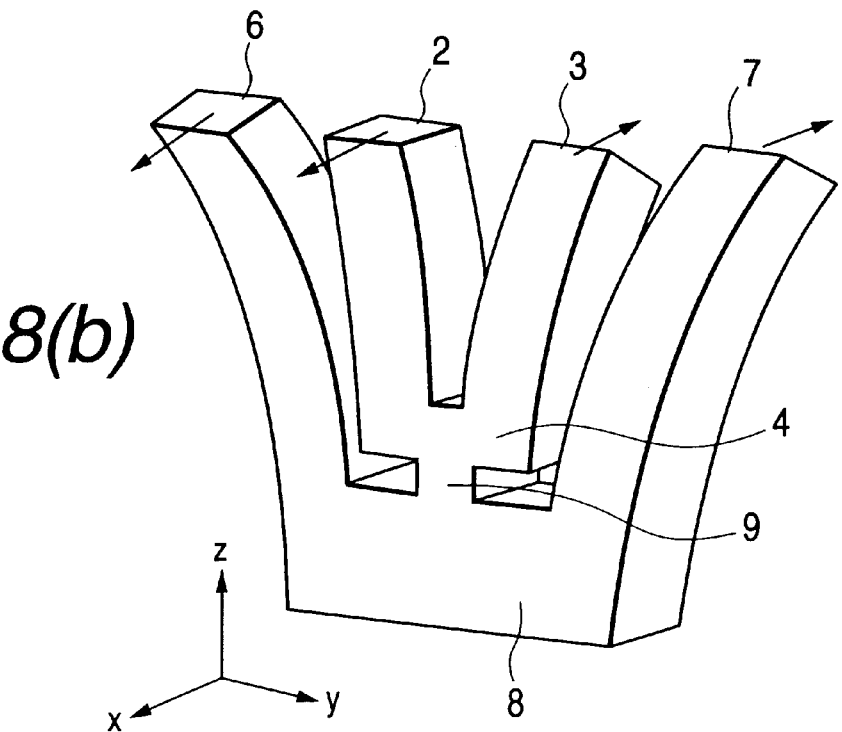
FIG. 8(b) is a perspective view which shows oscillation of an oscillating member in a second detection oscillation mode in which two left tines and two right tines vibrate in the same directions, respectively, when angular motion is applied.

An angular rate sensor according to the third embodiment of the invention will be described below which is different from the first and second embodiment only in that the tines 2 and 3 of the drive oscillator 1 vibrate, as shown in FIG. 8(b), in 180° phase opposition and the tines 6 and 7 of the measuring oscillator 5 also vibrate in 180° phase opposition, but the tines 2 and 6 vibrate in the same direction and the tines 3 and 7 vibrate in the same direction. This vibration mode will be referred to as the second detection oscillation mode below.

The second detection oscillation mode is achieved by decreasing the width W1 of each of the tines 2, 3, 6, and 7 less than that in the first and second embodiments. The geometry of the oscillating member G is so determined as to satisfy a condition that the ratio XS/XU of the amplitude XS of oscillation of the tines 6 and 7 of the measuring oscillator 5 to the amplitude XU of oscillation of the tines 2 and 3 of the drive oscillator 1, which is reverse to the ratio XU/XS in the first and second embodiments, is less than or equal to 10 and the same conditions as (2) and (3) in the first and second conditions.

If the length of the tines 6 and 7 of this embodiment is identical with that in the first and second embodiments, the resonant frequency of the tines 6 and 7 in the second detection oscillation mode will be lower than that in the above first detection oscillation mode. The angular rate sensor of this embodiment may, thus, be used in a case where the sensor needs to be oscillated at lower frequency.

Figure 16:
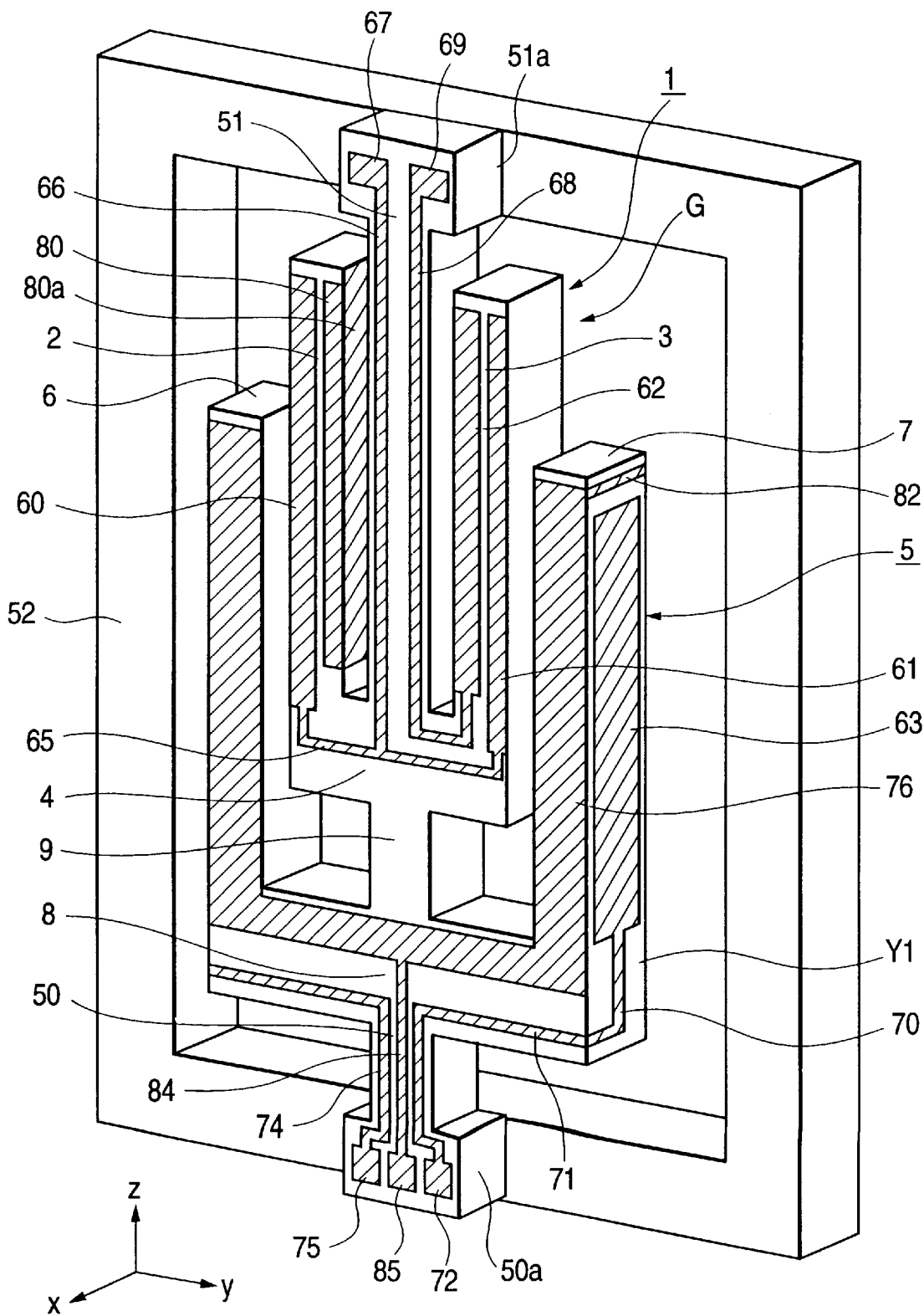
FIG. 16 is a perspective view which shows an angular rate sensor according to the fourth embodiment of the invention.

FIG. 16 shows an angular rate sensor according to the fourth embodiment of the invention which features the structure wherein the oscillating member G is supported on a frame 52 using two torsion beams 50 and 51. The same reference numbers as employed in the above embodiments refer to the same parts, and explanation thereof in detail will be omitted here.

The drive oscillator 1 and the measuring oscillator 5 have substantially the same structures as shown in FIG. 12. The torsion beam 51 connects the interconnecting member 4 and an upper end of the frame 52 through a connecting block 51a. The torsion beam 50 connects the interconnecting member 8 and a lower end of the frame 52 through a connecting block 50a. The torsion beams 50, 51 and 9 are arranged in alignment with each other on the z-axis. Each of the torsion beams 9, 50, and 51 has the width smaller than the interval between the tines 2 and 3 of the drive oscillator 1.

The oscillating member G is made of a single piece of piezoelectric material such as an X-cut crystal and machined by dicing. Note that the x-axis of the quartz crystal may be oriented in any direction.

The frame 52 is made of a glass material and chemically bonded to the connecting blocks 50a and 51a so as to allow the oscillating member G to vibrate in any directions.

The oscillating member G may vibrate either in the first detection oscillation mode, as shown in FIG. 8(a), or in the second detection oscillation mode, as shown in FIG. 8(b), but in the following discussion, the oscillating member G is assumed to vibrate in the second detection oscillation mode.

Figure 17:
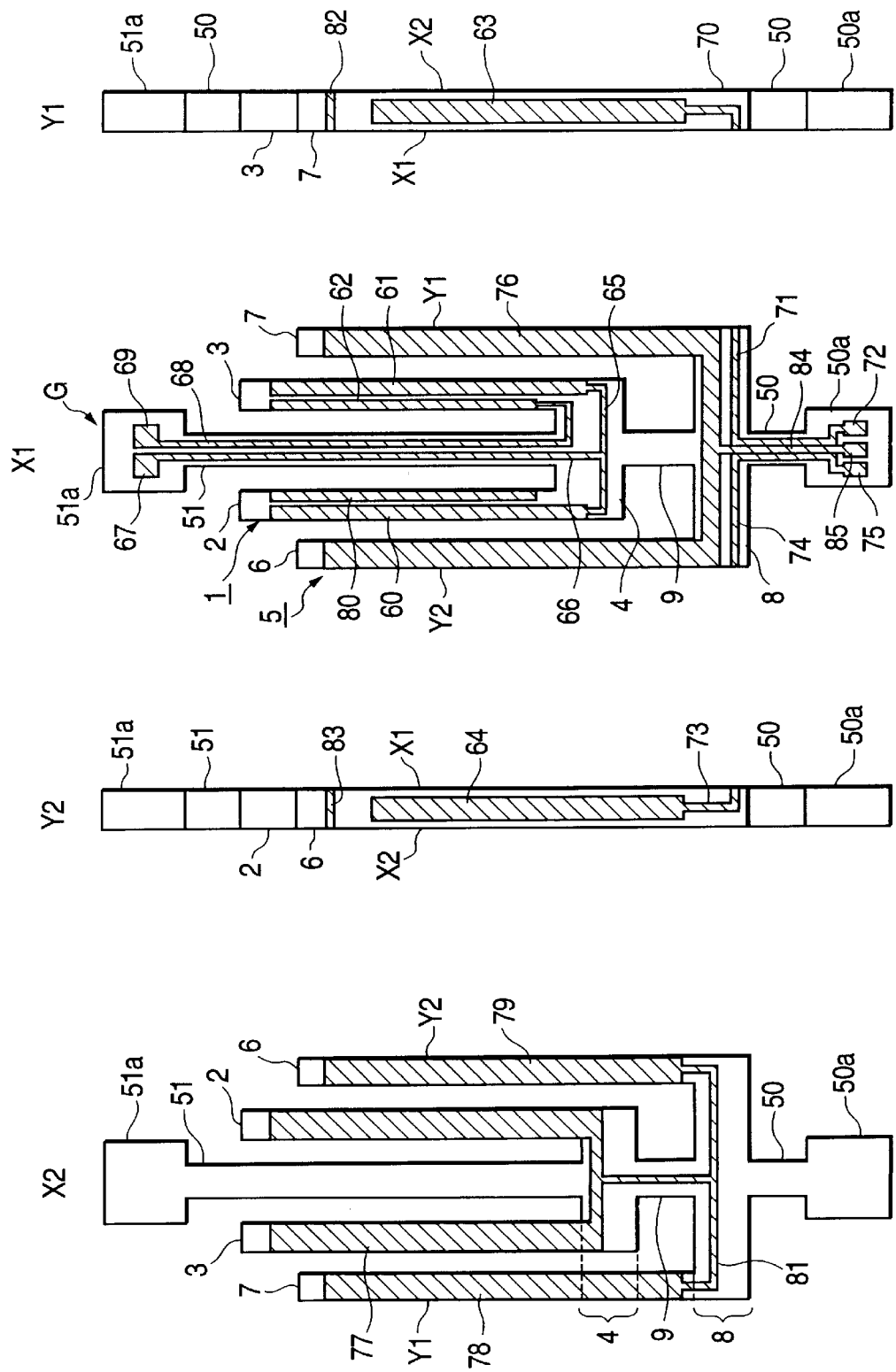
FIG. 17(a) is a front view which shows electrodes formed on a front surface of an oscillating member of the fourth embodiment.
FIG. 17(b) is a back view which shows electrodes formed on a back surface of an oscillating member of the fourth embodiment.
FIGS. 17(c) and 17(d) are side views which show electrodes formed on side surfaces of outer tines of an oscillating member of the fourth embodiment.

The drive oscillator 1 has, as shown in FIG. 17(a), drive electrodes 60 and 61 formed on outside portions of the surfaces X1 of the tines 2 and 3 and a monitor electrode 62 formed an inside portion of the surface X1 of the tine 3.

The measuring oscillator 5 has, as shown in FIGS. 17(c) and 17(d), pickup electrodes 63 and 64 formed on the surface Y1 and the surface Y2 of the tines 7 and 6, respectively.

The drive electrodes 60 and 61 are connected to a pad electrode 67 formed on the connecting block 51a through a lead 65 formed on the interconnecting member 4 and a lead 66 formed on the torsion beam 51. The monitor electrode 62 is connected to a pad electrode 69 formed on the connecting block 51a through a lead 68 extending over the interconnecting member 4 and the torsion beam 51.

The pickup electrode 63 is connected to a pad electrode 72 formed on the connecting block 50a through a lead 70 formed on the surface Y1 of the tine 7 and a lead 71 formed on the surfaces X1 of the interconnecting member 8 and the torsion beam 50. The pickup electrode 64 is connected to a pad electrode 75 formed on the connecting block 50a through a lead 73 formed on the surface Y2 of the tine 6 and a lead 74 formed on the surfaces X1 of the interconnecting member 8 and the torsion beam 50.

Common electrodes 76, 77, 78, 79, and 80, as shown in FIGS. 17(a) and 17(b), are formed on the surfaces X1 and X2 of the oscillating member G to develop a reference potential for the drive, monitor, and pickup electrodes, as described above.

The common electrode 76 extends from the tine 6 to the tine 7 through the interconnecting member 8. The common electrode 77 extends from the tine 2 to the tine 3 through the interconnecting member 4. The common electrode 78 occupies most of the surface X2 of the tine 7. The common electrode 79 occupies most of the surface X2 of the tine 6. The common electrode 80 is formed on an inside portion of the surface X1 of the tine 2 and connects with the common electrode 77 through a short-circuit electrode 80a, as shown in FIG. 16, formed on an inner surface of the tine 2.

The common electrodes 77 to 79 are connected to each other through a lead 81 formed on the interconnecting members 4 and 8 and the torsion beam 9. The common electrodes 78 and 76 are connected through a lead 82 formed on the surface Y1 of the tine 7. The common electrodes 79 and 76 are connected through a lead 83 formed on the surface Y2 of the tine 6.

The common electrode 76 is connected to a pad electrode 85 formed on the connecting block 50a through a lead 84 extending over a lower portion of the second interconnecting member 8, the torsion beam 50, and the connecting block 50a.

Figure 18:
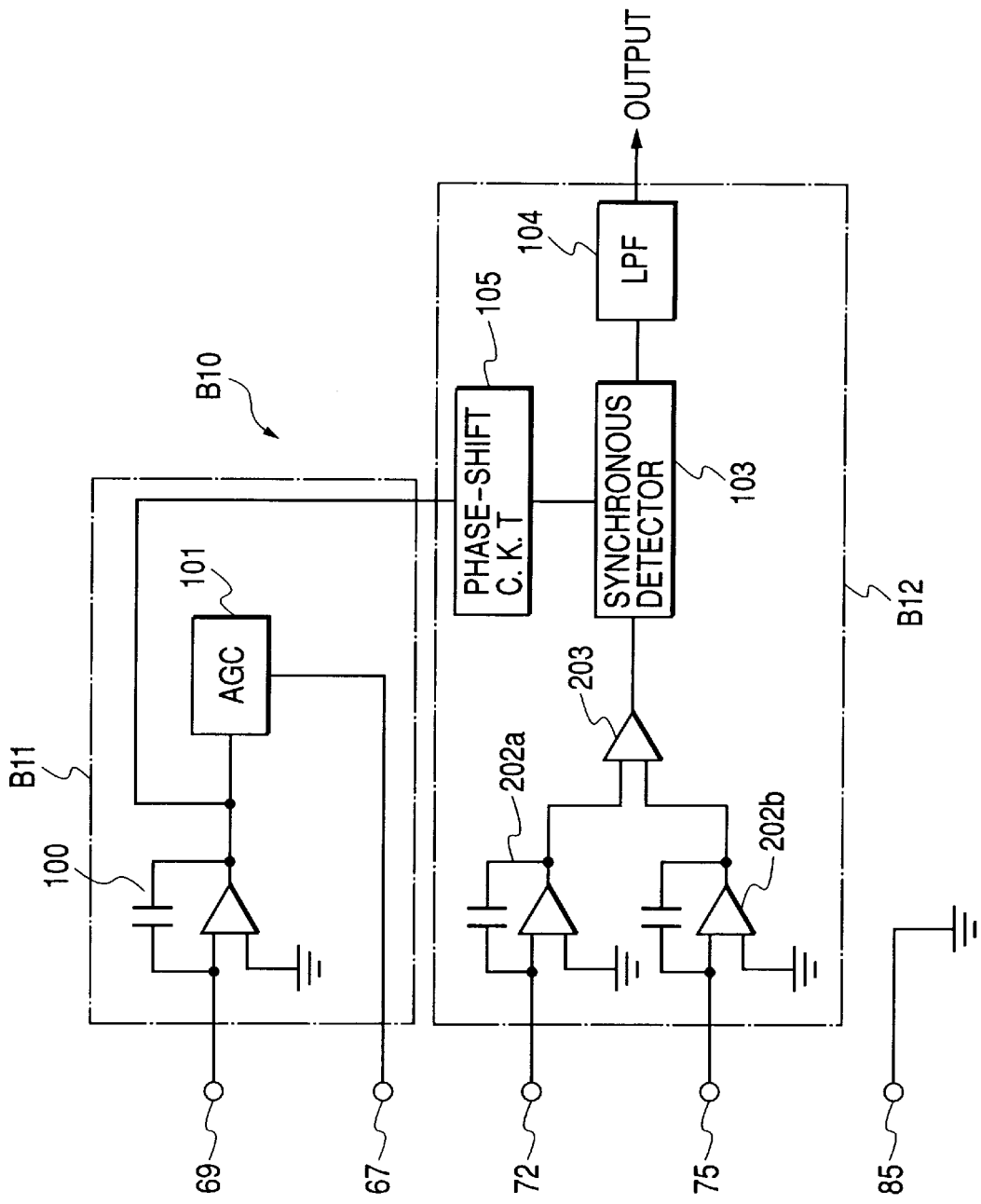
FIG. 18 is a circuit diagram which shows a control circuit of the angular rate sensor of FIG. 16.

Thus, the pad electrode 67 electrically communicates with the drive electrodes 60 and 61. The pad electrode 69 electrically communicates with the monitor electrode 62. The pad electrode 72 electrically communicates with the pickup electrode 63. The pad electrode 75 electrically communicates with the pickup electrode 64. The pad electrode 85 electrically communicates with all the common electrodes 76 to 80. The pad electrodes 67 to 85 connect with a control circuit B10, as shown in FIG. 18, by wire bonding. All the electrodes 60 to 85 are formed by evaporating a coating of Cr or Au.

The control circuit B10 includes, as shown in FIG. 18, a drive circuit B11 and a detection circuit B12. The drive circuit B11 has the same structure as that of the drive circuit A11 in FIG. 15. The charge amplifier 100 receives an output of the monitor electrode 62 through the pad electrode 69. The AGC 101 outputs a constant voltage signal to the drive electrodes 60 and 61 through the pad electrode 67. The detection circuit B12 has the same structure as that of the detection circuit C12 in FIG. 6. The current-voltage converters 202a and 202b receive outputs of the pickup electrodes 63 and 64 through the pad electrodes 72 and 75, respectively. The pad electrode 85 is connected to ground through the control circuit B11.

The operations of the angular rate sensor and the control circuit B10 are identical with those in the above embodiments, and explanation thereof in detail will be omitted here.

When angular motion is applied to the angular rate sensor, the measuring oscillator 5, as described above, vibrates in the second detection oscillation mode, as shown in FIG. 8(b). The vibration of the measuring oscillator 5 in the second detection oscillation mode is developed by adjusting the interval ratio WS/WU of the interval WS between the tines 6 and 7 of the measuring oscillator 5 to the interval WU between the tines 2 and 3 of the drive oscillator 1 so that the ratio XS/XU of the amplitude XS of oscillation of the measuring oscillator 5 in the second detection oscillation mode to the amplitude XU of oscillation of the drive oscillator 1 is less than or equal to 10.

The oscillating member G is, as described above, retained on the frame 52 at two support points using the two torsion beams 50 and 51 and thus superior to one retained at a single support point in impact resistance. The oscillation member G may be made of a Zcut crystal and machined by etching.

Figure 19:
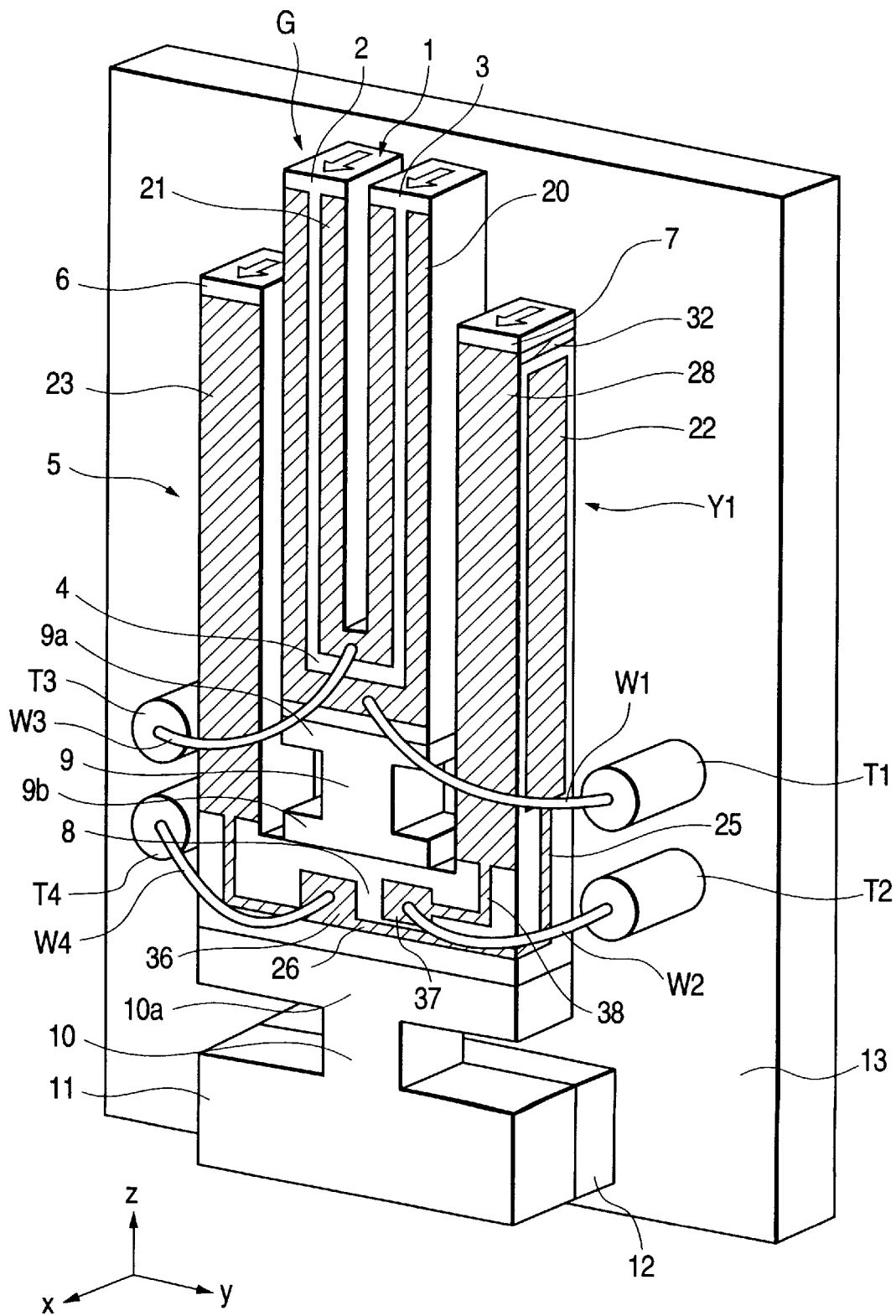
FIG. 19 is a perspective view which shows an angular rate sensor according to the fifth embodiment of the invention.

FIG. 19 shows an angular rate sensor according to the fifth embodiment of the invention which features the structure wherein the drive oscillator 1 and the measuring oscillator 5 are made of separate piezoelectric members and bonded to each other through the torsion beam 9. The same reference numbers as employed in the above embodiments refer to the same parts, and explanation thereof in detail will be omitted here.

The first torsion beam 9 is made of a single piece of high-durability metal such as a 42 alloy and has flanges 9a and 9b on upper and lower ends thereof. The width of each of the flanges 9a and 9b is substantially equal to the width of the interconnecting member 4. The flange 9a is glued to the interconnecting member 4, and the flange 9b is glued to the interconnecting member 8 to connect the oscillators 1 and 5 together.

The second torsion beam 10 has formed on an end thereof a mount block 10a glued to the interconnecting member 8 and on the other end the connecting member 11 welded to the base 13 through the spacer 12. The width of the mount block 10a is substantially the same as that of the interconnecting member 8.

The first and second torsion beams 9 and 8 are, similar to the above embodiments, arranged in alignment with each other along the z-axis.

Figure 20D:
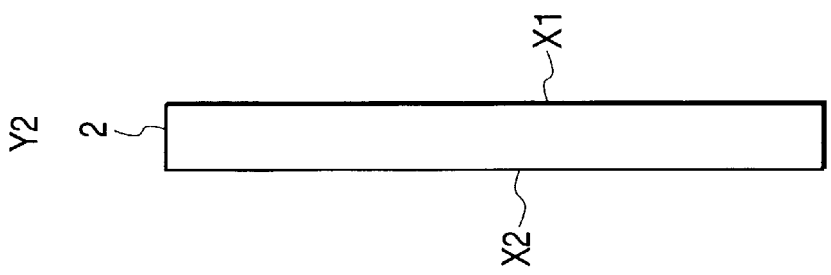
FIGS. 20(c) and 20(d) are side views which show electrodes formed on side surfaces of a drive oscillator of the fifth embodiment.
Figure 20B:
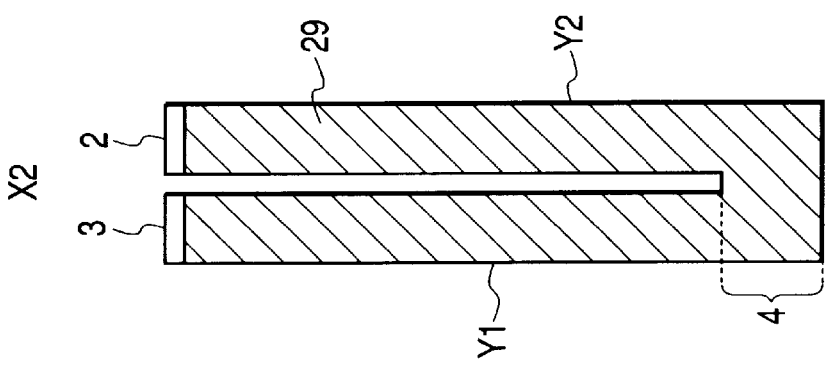
FIG. 20(b) is a back view which shows electrodes formed on a back surface of a drive oscillator of the fifth embodiment.
Figure 20C:
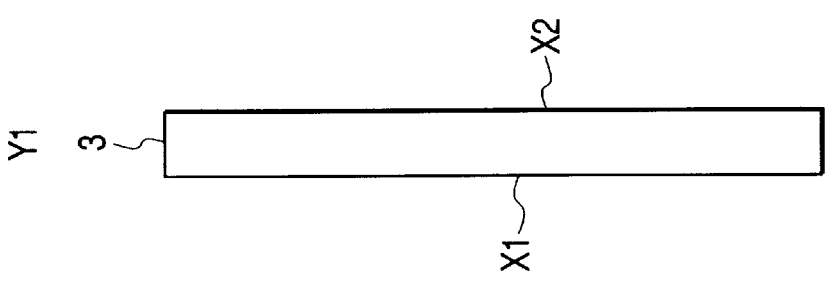
Figure 20A:
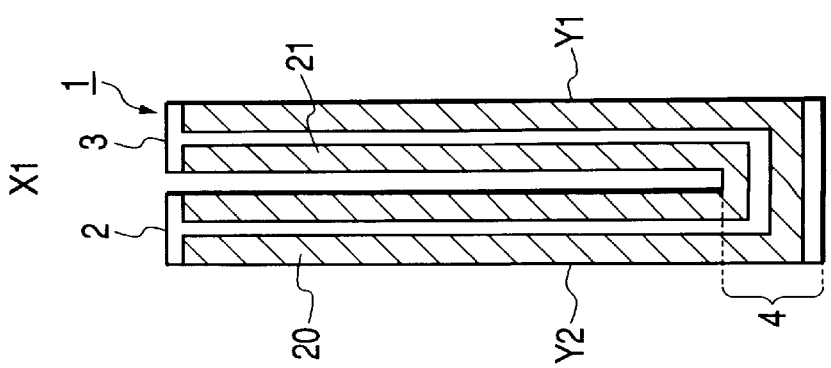
FIG. 20(a) is a front view which shows electrodes formed on a front surface of a drive oscillating of the fifth embodiment.

Electrodes formed on the oscillating member G, as can be seen in FIGS. 20(a) to 21 (d), are substantially identical with the ones of the second embodiment as shown in FIGS. 14(a) to 14(d), but the common electrodes 29 and 30 are electrically connected to each other through the conductive torsion beam 9 without use of the lead 33 as shown in FIG. 14(b). The formation of each electrode is achieved by baking a layer of sliver electrode on the oscillating member G.

A control circuit used in this embodiment is identical with the control circuit A10 in FIG. 15, and explanation of structure and operation of the control circuit will be omitted here.

The torsion beam 9 is, as described above, made of metal and thus may be decreased in size without sacrificing mechanical strength thereof as compared with one made of a piezoelectric material. This allows more vibratory energy of the drive oscillator 1 than that in the above embodiments to be shut therein without being transmitted to the measuring oscillator 5, thus resulting in further improvement of the S/N ratio.

Figure 22:
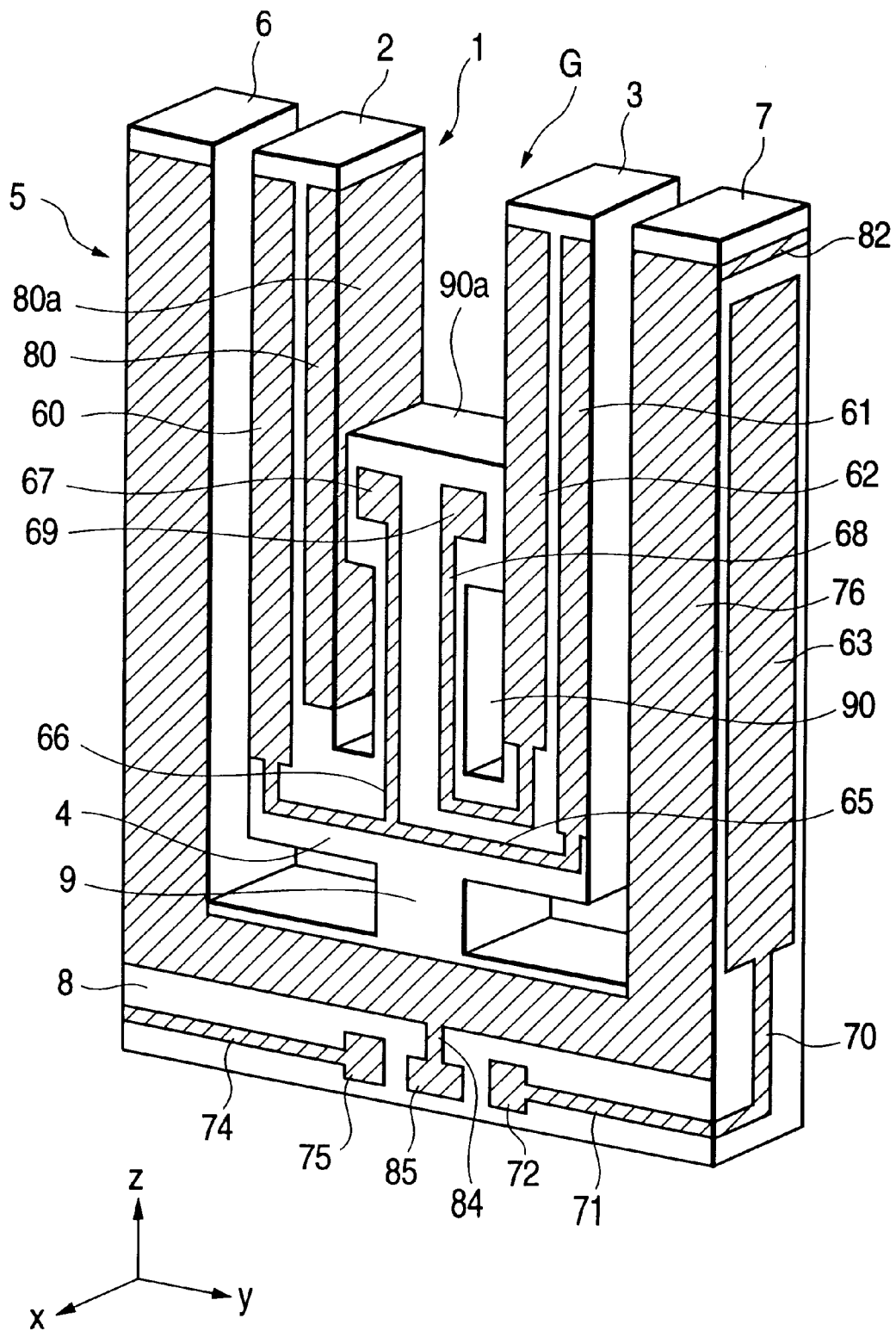
FIG. 22 is a perspective view which shows an angular rate sensor according to the sixth embodiment of the invention.

FIG. 22 shows an angular rate sensor according to the sixth embodiment of the invention which is a modification of the fourth embodiment, as shown in FIG. 14, and features the structure wherein a second torsion beam 90 supports near the center of the whole of the oscillating member G.

The second torsion beam 90 is formed integrally with the interconnecting member 4 and extends up to the middle of the tines 2 and 3 in the lengthwise direction thereof along the z-axis in alignment with the torsion beam 9. The second torsion beam 90 has a connecting block 90a which is attached to a frame or a base such as the one shown in FIG. 16 or 19 to support the whole of the oscillating member G so as to allow it to vibrate in any directions.

The oscillating member G is made of a single piece of piezoelectric material such as crystal.

The structure and arrangement of electrodes are substantially the same as those in the fourth embodiment in FIG. 16 except that the pad electrodes 72, 75, and 85 are formed on a lower portion of the interconnecting member 8, and the leads 71, 74, and 84 extend only over the interconnecting member 8.

The second torsion beam 90, as described above, supports near the center of the whole of the oscillating member G, in other words, it supports near the center of gravity of the oscillating member G, thus resulting in an increase in resistance to external impact and allowing the torsion beam 90 to be lengthened as compared with the first to third, and fifth embodiments to decrease the amplitude ratio XU/XS or XS/XU or increase the sensitivity of the angular rate sensor.

Figure 23:
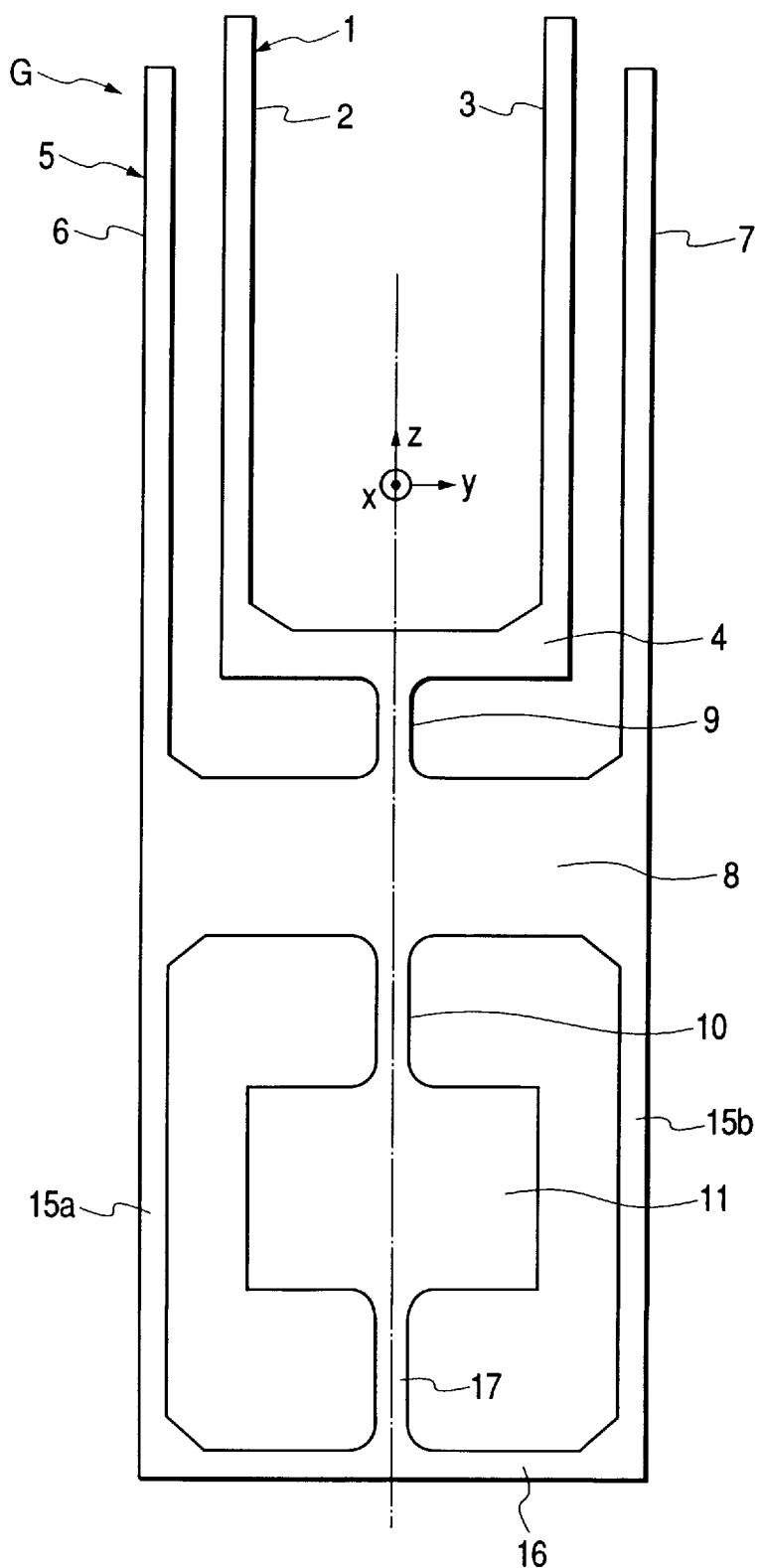
FIG. 23 is a plan view which shows a modification of an oscillating member.

FIG. 23 shows a modification of the oscillating member G.

The shown oscillating member G has a support frame which consists of the interconnecting member 8, a pair of vertical strip members 15a and 15b, and the horizontal strip member 16. The strip members 15a and 15b extend from ends of the interconnecting member 8 in a direction opposite the tines 6 and 7 in alignment with the tines 6 and 7, respectively.

The second torsion beam 10 and the third torsion beam 17 extend from the interconnecting member 8 and the horizontal strip member 16 in alignment with each other along the z-axis and connect with the connecting block 11. The vertical strip members 15a and 15b, the horizontal strip member 16, the second and third torsion beams 10 and 17, and the connecting block 11 are formed integrally with the oscillating member G.

FIGS. 24(a) to FIG. 26 show electrodes installed on the oscillating member G.

Figures 24A, 24B, 24C:
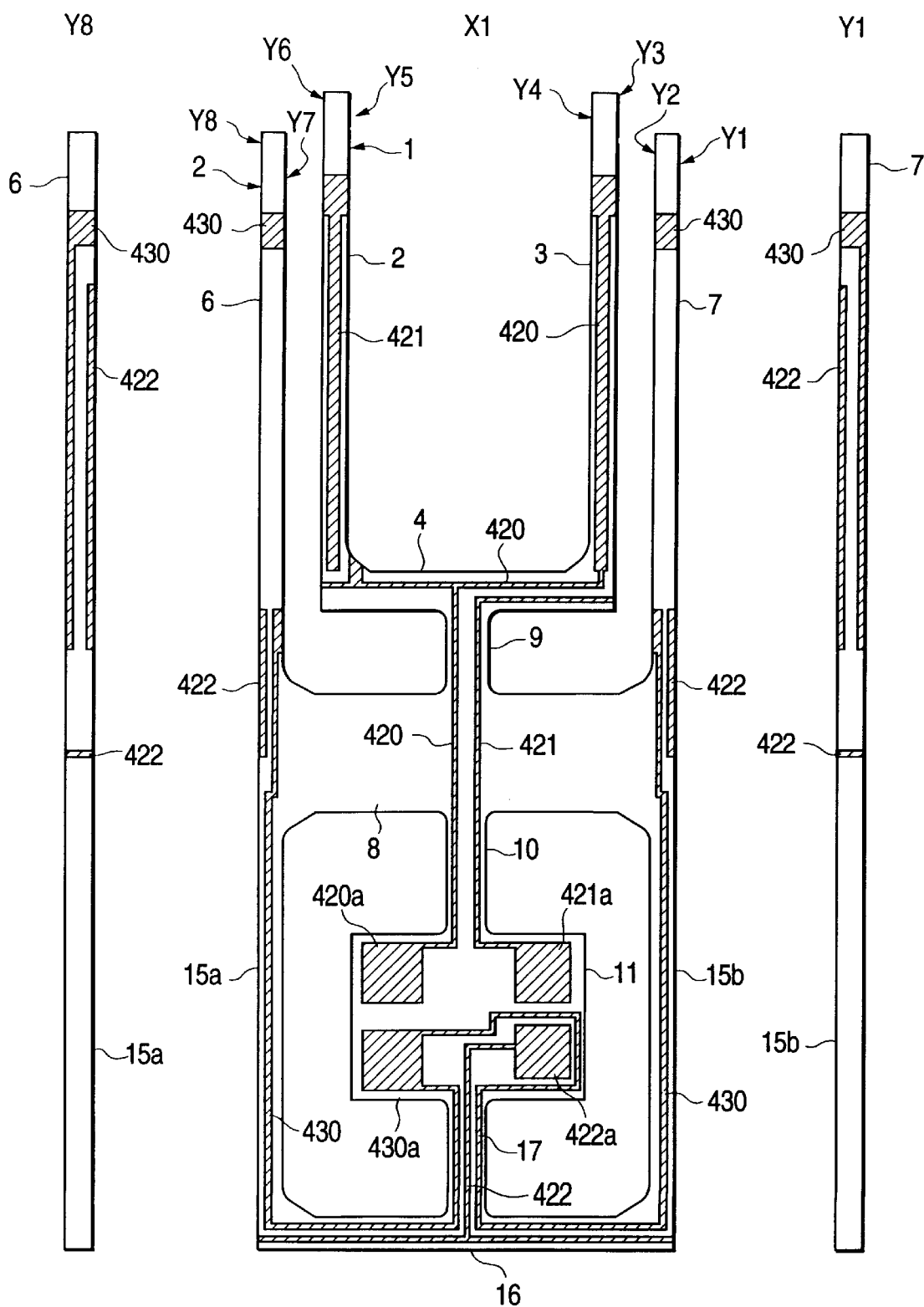
FIGS. 24(b) and 24(c) are side views which show electrodes formed on side surfaces of tines of a measuring oscillator of the oscillating member of FIG. 23.

A drive electrode 420 is formed on the surfaces X1, X2, Y3, and Y4 of the tine 3 and the surfaces Y5 and Y6 of the tine 2, extends, as shown in FIG. 24(a), over the first torsion beam 9, the second interconnecting member 8, and the second torsion beam 10, and leads to a pad electrode 420a formed on the connecting block 11. A monitor electrode 421 is formed on the surfaces X1, X2, Y5, and Y6 of the tine 2 and the surfaces Y3 and Y4 of the tine 3, extends, as shown in FIG. 24(a), over the vertical strip member 15b, and leads to a pad electrode 421a formed on the connecting block 11.

Figure 26:
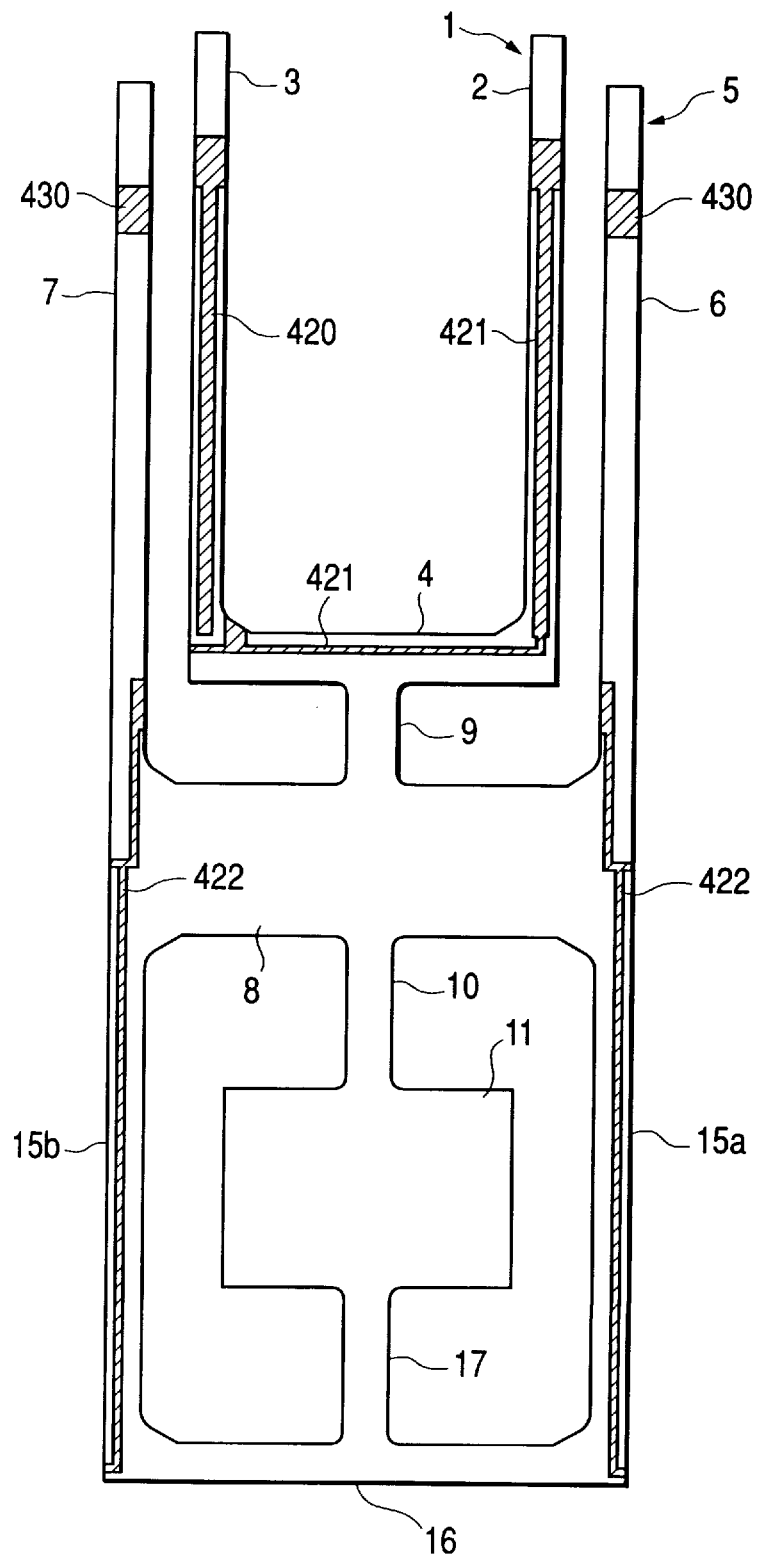
FIG. 26 is a back view which shows electrodes formed on a back surface of the oscillating member of FIG. 23.

A pickup electrode 422 is formed over the surfaces X1, X2, Y1, Y2, Y7, and Y8 of the measuring electrode 5, extends, as shown in FIG. 26, over the vertical strip members 15a and 15b, the horizontal strip member 16, and the third torsion beam 17, and leads, as shown in FIG. 24(a), to a pad electrode 422a formed on the connecting block 11.

A pair of shield (GND) electrodes 430 are formed on the surfaces X1, X2, Y1, Y2, Y7, and Y8, extend, as shown in FIG. 24(a), over the vertical strip members 15a and 15b, the horizontal strip member 16, and the third torsion beam 17, and lead to a pad electrode 430a formed on the connecting block 11. The shield electrodes 430 may be used as pickup electrodes or auxiliary drive electrodes.

The pickup electrode 422, as described above, extends from the tines 6 and 7 of the measuring oscillator 5 to the connecting block 11 through the vertical and horizontal strip members 15a, 15b, and 16, thus resulting in an increased interval between the pickup electrode 422 and the drive electrode 420, which serves to reduce electric noise contained in an output of the pickup electrode 422.

The drive oscillator 1 and the measuring oscillator 5 may alternatively be reversed. Specifically, the inner tines 2 and 3 and the outer tines 6 and 7 may be used as a measuring oscillator and a drive oscillator, respectively.

Figure 27A:
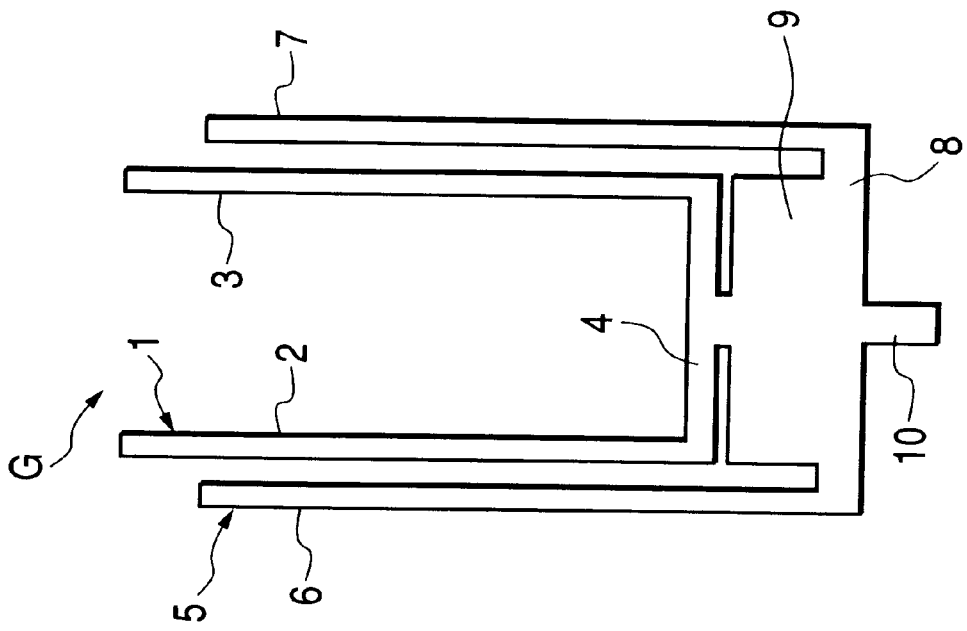
FIGS. 27(a) and 27(b) are plan views which show modifications of an oscillating member.
Figure 27B:
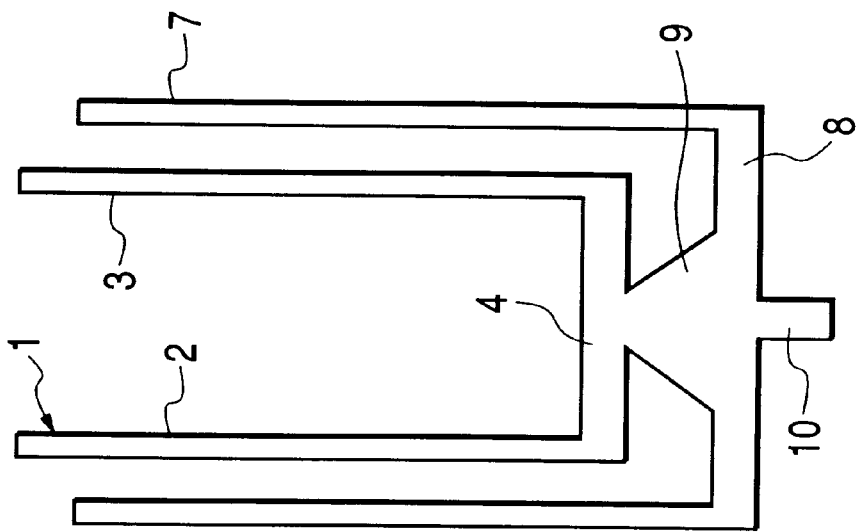

In the above embodiments, the first torsion beam 9 and the second torsion beam 10 (50, 51, or 90) have the width smaller than the overall width of the drive oscillator 1 in the y-axis direction, but only an end portion of the first torsion beam 9 leading to the first interconnecting member 4 may have that smaller width or alternatively only an end portion of the second torsion beam 10 (50, 51, or 90) leading to the second interconnecting block 8 or the connecting block 11 (or 51a) may have the smaller width. Examples of the former are illustrated in FIGS. 27(a) and 27(b).

Figure 28:
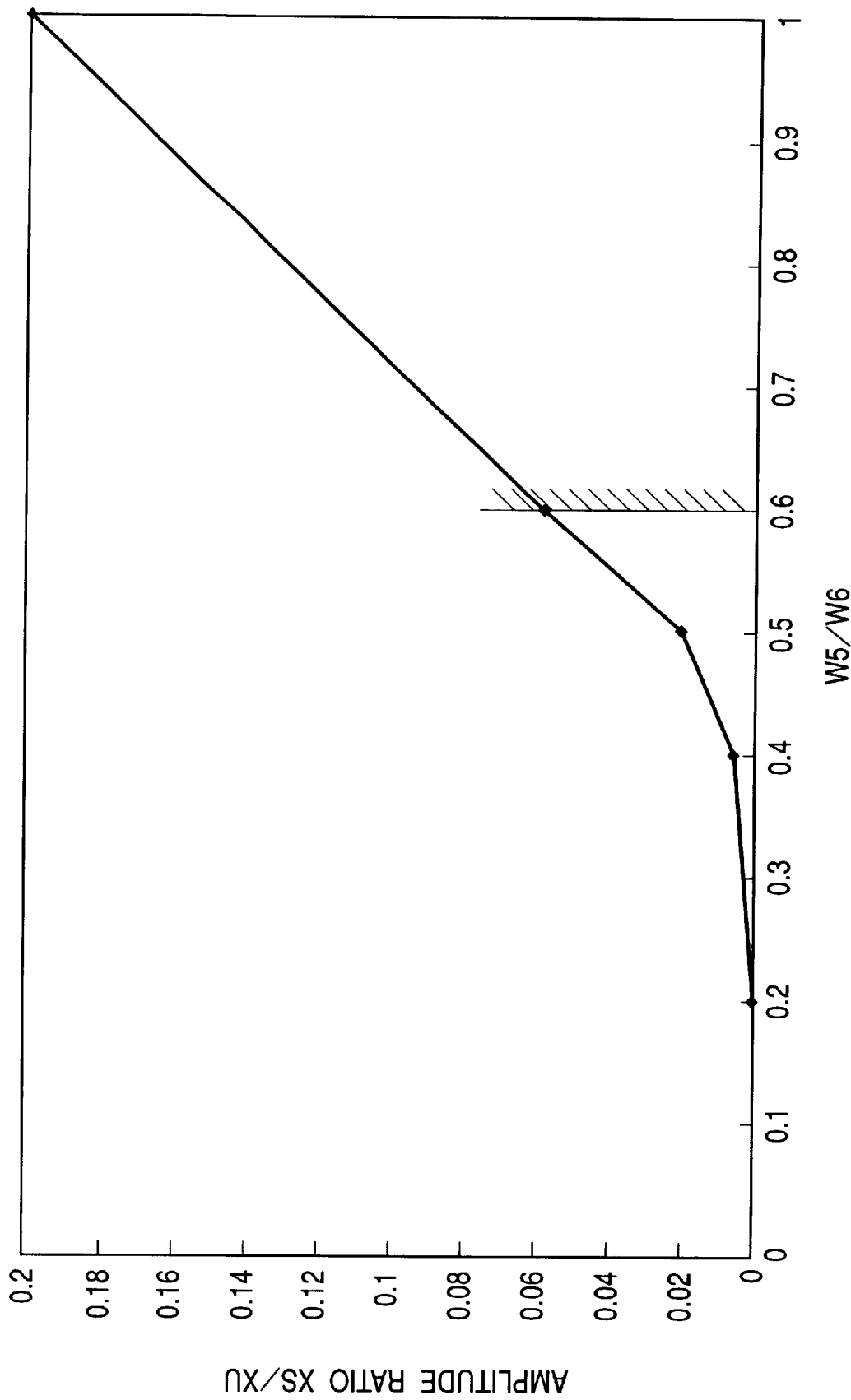
FIG. 28 is a graph which shows text results in terms of the relation between the ratio XS/XU of amplitude XS of oscillation of a measuring to amplitude XU of oscillation of a drive oscillator and the ratio W5/W6 of width W5 of a first torsion beam 9 to width W6 of a first interconnecting member 4.

Further, it is advisable that the width W5, as shown in FIG. 2, of each of the first and second torsion beams 9 and 10 be less than or equal to 3/5 of the width W6 of the first interconnecting member 4. This is based on results of tests in which the ratio XS/XU of amplitude XS of oscillation of the tines 6 and 7 of the measuring oscillator 5 to amplitude XU of oscillation of the tines 2 and 3 of the drive oscillator 1 were measured for different values of ratio W5/W6 of the width W5 of the first torsion beam 9 to the width W6 of the first interconnecting member 4. The test results are represented in a graph of FIG. 28. It will be evident from the graph that when the width W5 is less than or equal to 3/5 (i.e., 0.6) of the width W6, a desired value of the amplitude ratio XS/XU is obtained. The same is true for the width W5 of the second torsion beam 10 and for the case where the inner tines 2 and 3 are used as the measuring oscillator, and the outer tines 6 and 7 are used as the drive oscillator.

Further, it is advisable that the width L5 of the second interconnecting member 8 in the z-axis direction is greater than the width L1 of the first interconnecting member 4. This causes the amplitude ratio XU/XS or XS/XU to be decreased, thus resulting in improvement of the sensitivity of the angular rate sensor.

The drive and measuring oscillators 1 and 5 are flush with each other on the surfaces X1 and X2, but they may alternatively be offset from each other in the x-direction.

The drive electrode 20 and the monitor electrode 21 in the second, third, and fifth embodiments may be reversed.

The oscillators 1 and 5 and the torsion beams 9, 10, 50, 51, and 90 may each be formed with a single separate member as in the fifth embodiment of FIG. 19.

If the tines 2 and 3 of the drive oscillator 1 and the tines 6 and 7 of the measuring oscillator 5 need not be vibrated symmetrically, the torsion beams 9, 10, 50, 51, and 90 may be off-centered, or shifted from the z-axis (i.e., the longitudinal center line of the oscillators 1 and 5.

Figure 29:
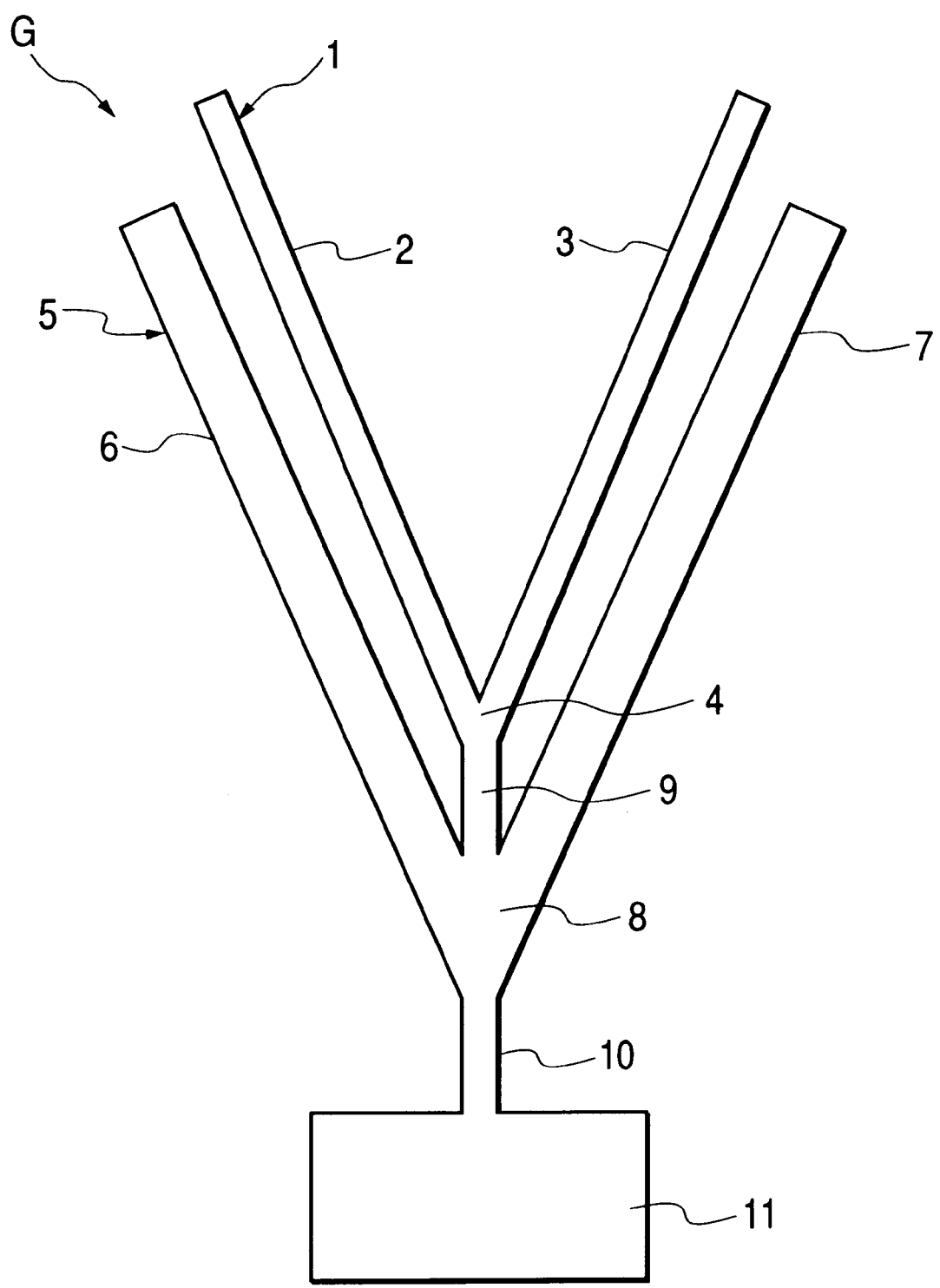
FIG. 29 is a plane view which shows a modification of the shape of an oscillating member.

The oscillators 1 and 5 are not limited to U-shape, but may be of V-shape, as shown in FIG. 29.

Figure 30:
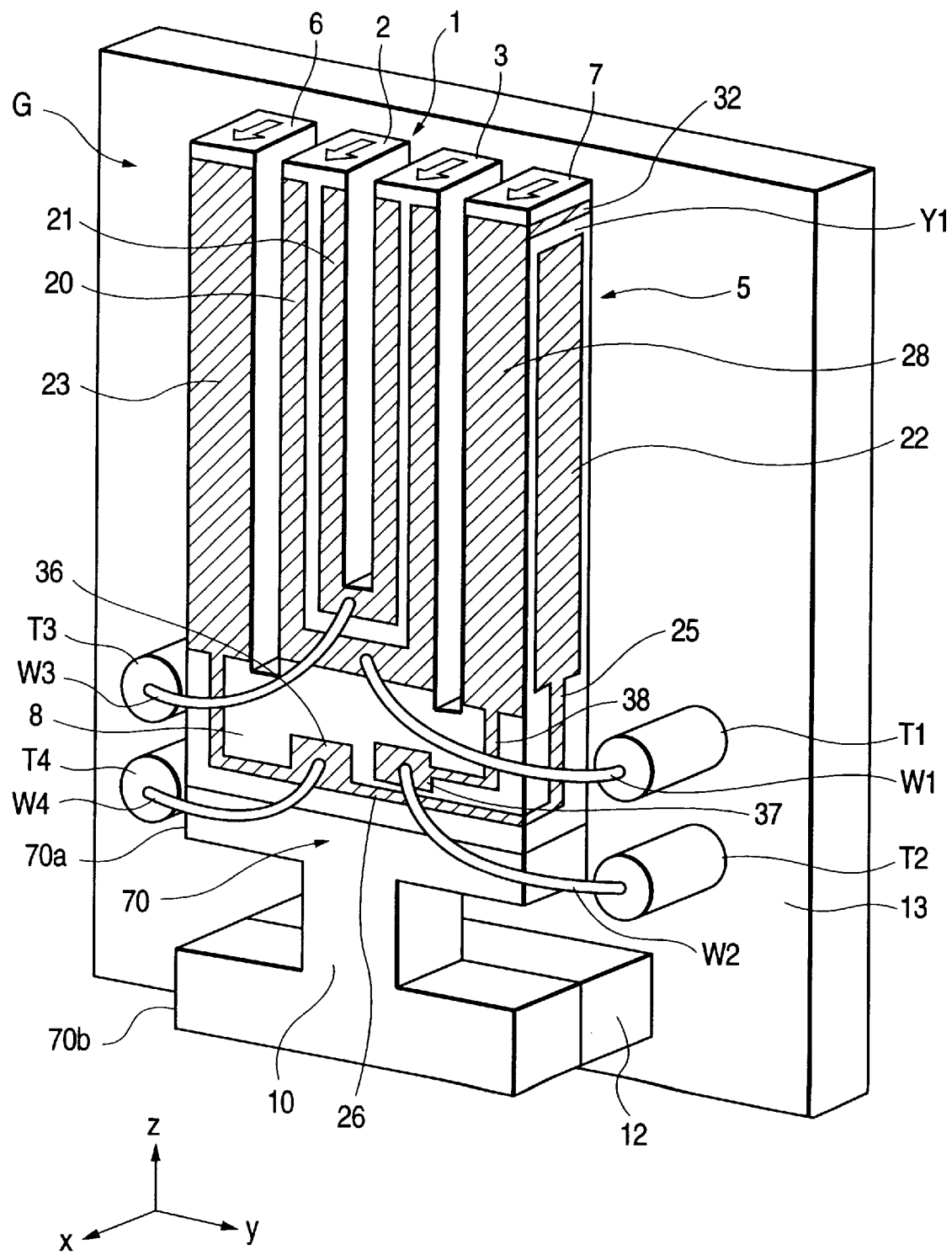
FIG. 30 is a perspective view which shows an angular rate sensor according to the seventh embodiment of the invention.

FIG. 30 shows an angular rate sensor according to the seventh embodiment of the invention which is a modification of the second embodiment, as shown in FIG. 12, and different therefrom in that the tines 2 and 3 of the drive oscillator 1 extend directly from the interconnecting member 8.

The tines 2 and 3 are shorter than the tines 6 and 7, but upper ends of the tines 2, 3, 6, and 7 are flush with each other. The oscillating member G is polarized in a direction, as indicated by white arrows in the drawing.

The oscillating member G is supported on the base 13 through the H-shaped supporter 70 and the spacer 12. The supporter 70 consists of the torsion beam 10 and the upper and lower connecting blocks 70*a* and 70*b*. The upper connecting block 70*a* is glued to the interconnecting member 8. The lower connecting block 70*b* is welded to the base 13 through the spacer 12. The torsion beam 10 (i.e., the supporter 70) may be formed with metal for enhancing the mechanical strength or impact resistance.

Figure 31:
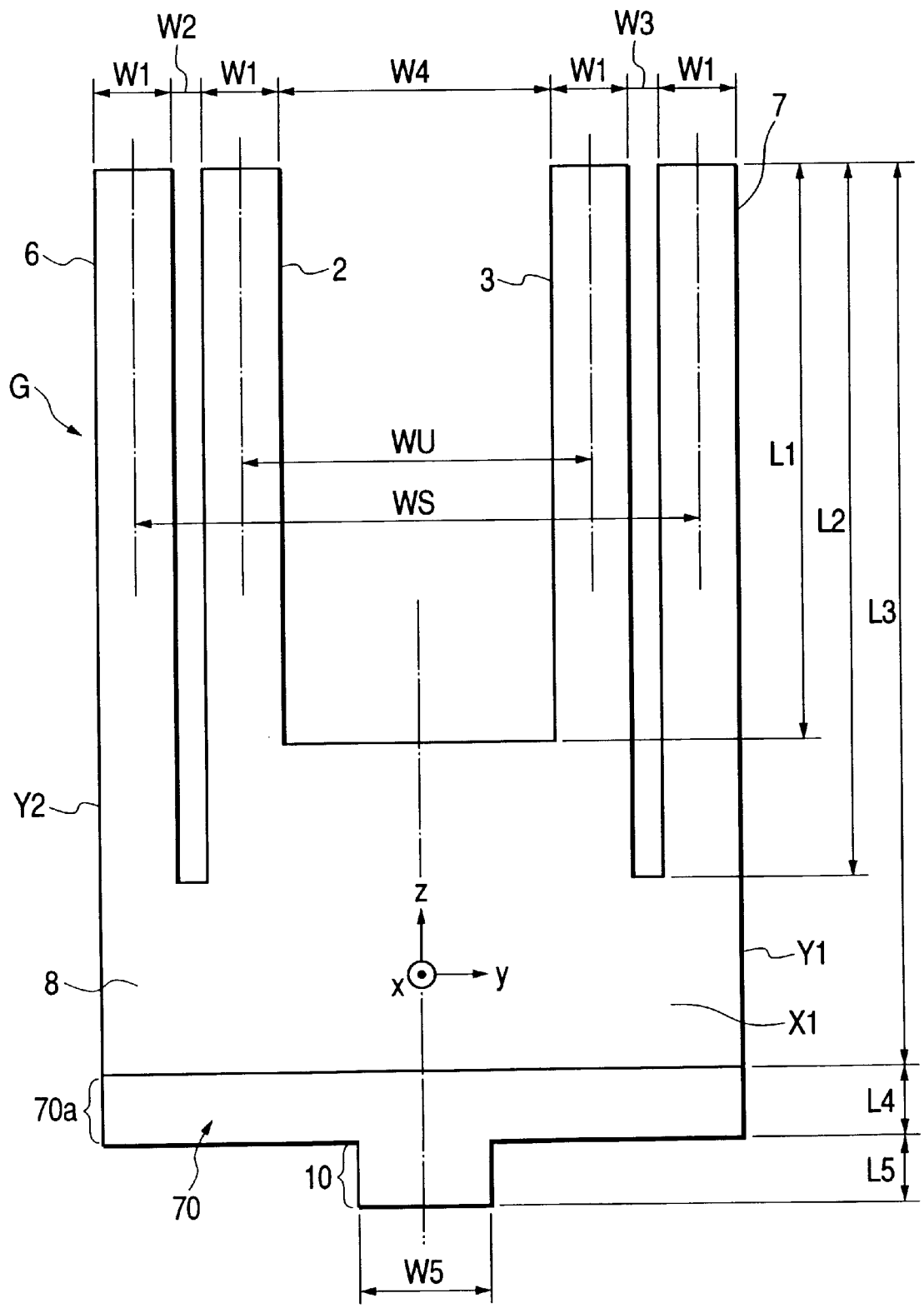
FIG. 31 is a plan view of an oscillating member of the seventh embodiment for explaining measurements thereof.

FIG. 31 shows one example of measurements of the oscillating member G of the seventh embodiment.

The length L1 of each of the tines 2 and 3 is 9 mm. The length L2 of the tines 6 and 7 is 11 mm. The distance L3 that is the sum of lengths of the tines 6 and 7 and the width of the interconnecting member 8 is 14 mm. The width L4 of the upper connecting block 70*a* is 1 mm. The length W5 of the torsion beam 10 is 1 mm.

The width W1 of each of the tines 2,3,6, and 7 is 1.2 mm. The intervals between the tines 6 and 2 and between the tines 3 and 7 (i.e., widths W2 and W3 of slits) are each 0.4 mm. The interval W4 between the tines 2 and 3 is 4.0 mm. The overall width of the oscillating member G is, thus, 9.6 mm. The width W5 of the torsion beam 10 is 2.0 mm. The ratio WS/WU of the interval WU between longitudinal center lines of the tines 2 and 3 to the interval WU between longitudinal center lines of the tines 6 and 7 is approximately 1.6, thereby causing, as described above, the amplitude ratio XU/XS to be less than or equal to 10. This results in improvement of transmission of vibratory energy of the drive oscillator 1 to the measuring oscillator 5, thus achieving a higher S/N ratio.

The thickness of the oscillating member G and the supporter 70 is 1.5 mm.

Figure 32:
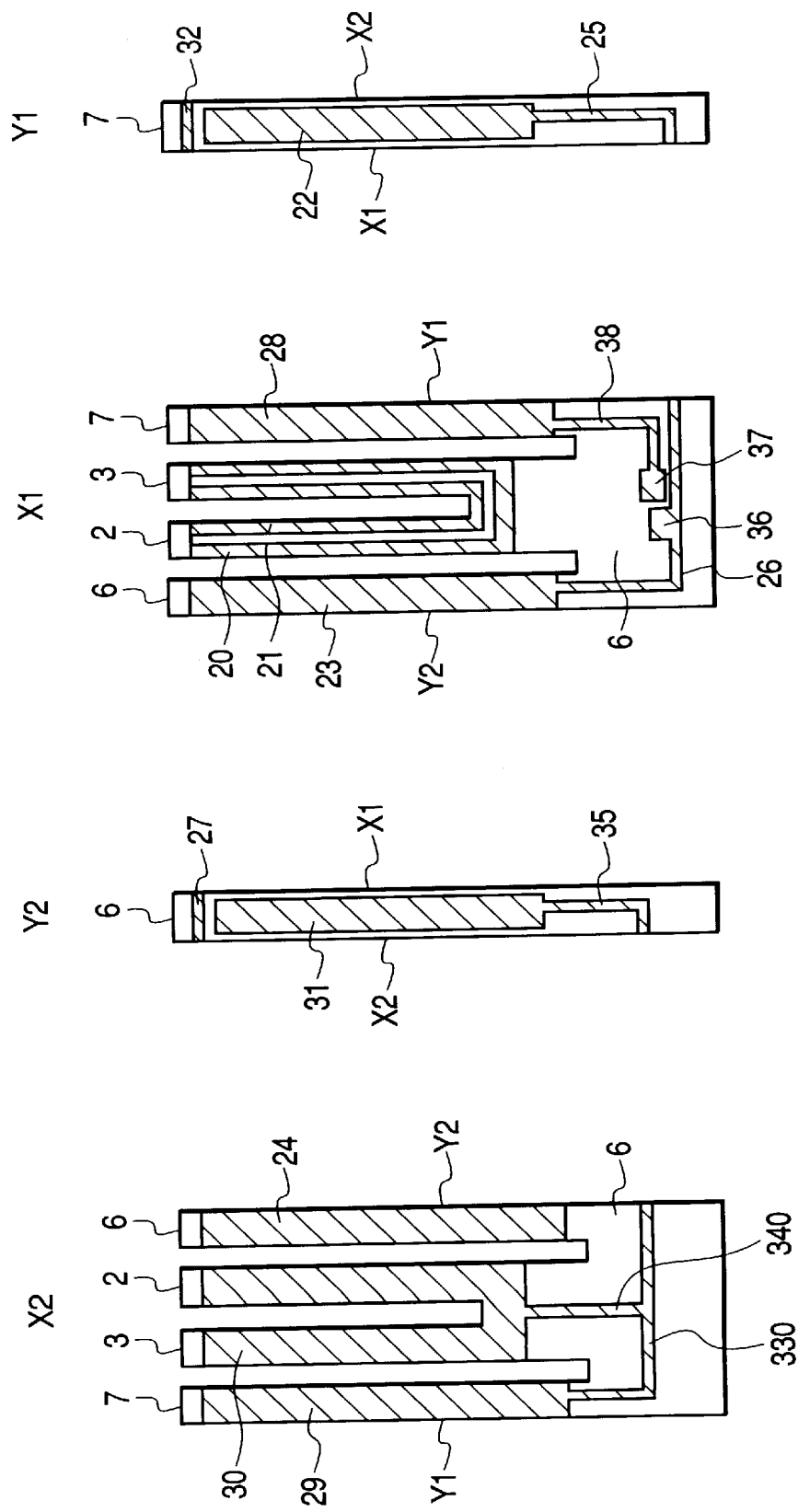
FIG. 32(a) is a front view which shows electrodes formed on a front surface of an oscillating member of the seventh embodiment.
FIG. 32(b) is a back view which shows an electrode formed on a back surface of an oscillating member of the seventh embodiment.
FIGS. 32(c) and 32(d) are side views which show electrodes formed on side surfaces of outer tines of an oscillating member of the seventh embodiment.

FIGS. 32(*a*) to 32(*d*) show electrodes disposed on the oscillating member G.

The common electrode 30 is formed only the surface X2 of the tine 7. The common electrode 29 is formed over the surfaces X2 of the tines 2 and 3. The common electrode 30 connects electrically with the common electrode 29 through leads 330 and 340. The arrangements of other electrodes and structure of a control circuit are essentially identical with those shown in FIGS. 14(*a*), 14(*c*), 14(*d*), and 15, and explanation thereof in detail will be omitted here.

Figure 33:
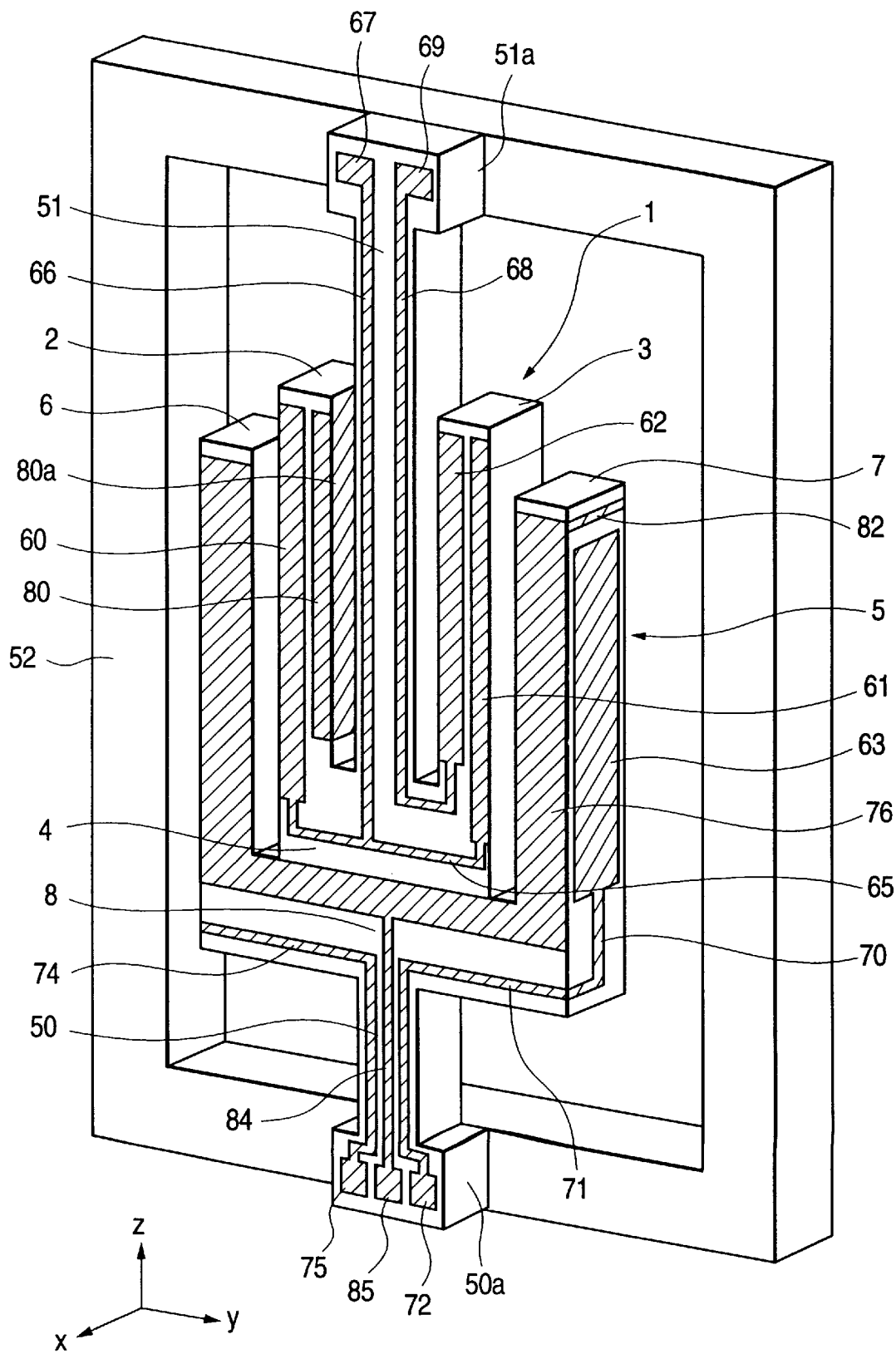
FIG. 33 is a perspective view which shows an angular rate sensor according to the eighth embodiment of the invention.

FIG. 33 shows an angular rate sensor according to the eighth embodiment of the invention which is a modification of the fourth embodiment, as shown in FIG. 16, and different therefrom in that the first interconnecting member 4 is machined integrally or connected directly with the second interconnecting member 8 without the torsion beam 9.

Figures 34A, 34B, 34C, 34D:
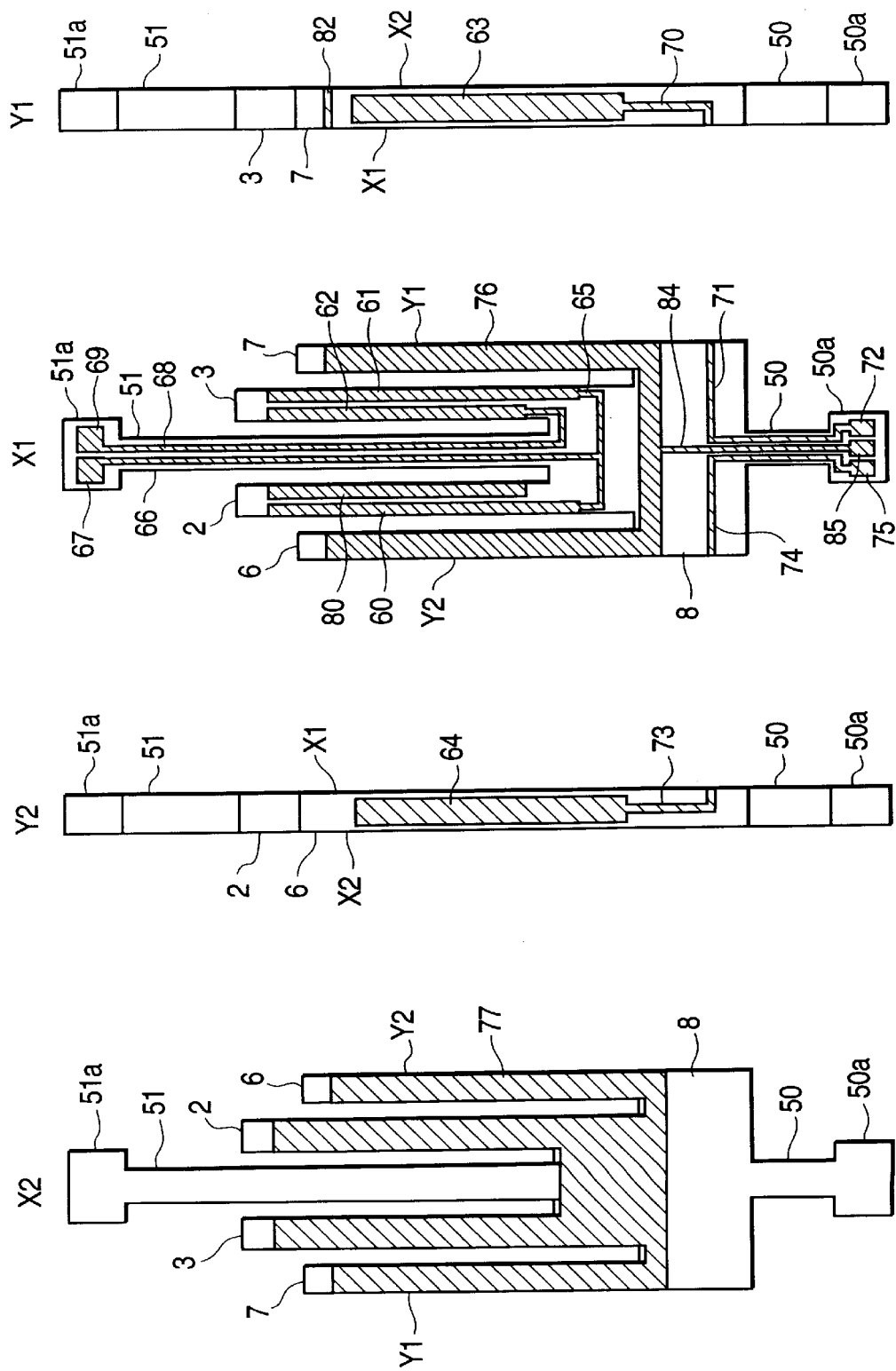

The common electrode 77 is formed over the surfaces X2 of the tines 2, 3, 6, and 7 and connects with the common electrode 76, as shown in FIG. 34(*a*), through the lead 82, as shown in FIG. 34(*c*). The arrangements of other electrodes and structure of a control circuit are essentially identical with those shown in FIGS. 17(*a*), 17(*c*), 17(*d*), and 18, and explanation thereof in detail will be omitted here.

Figure 35:
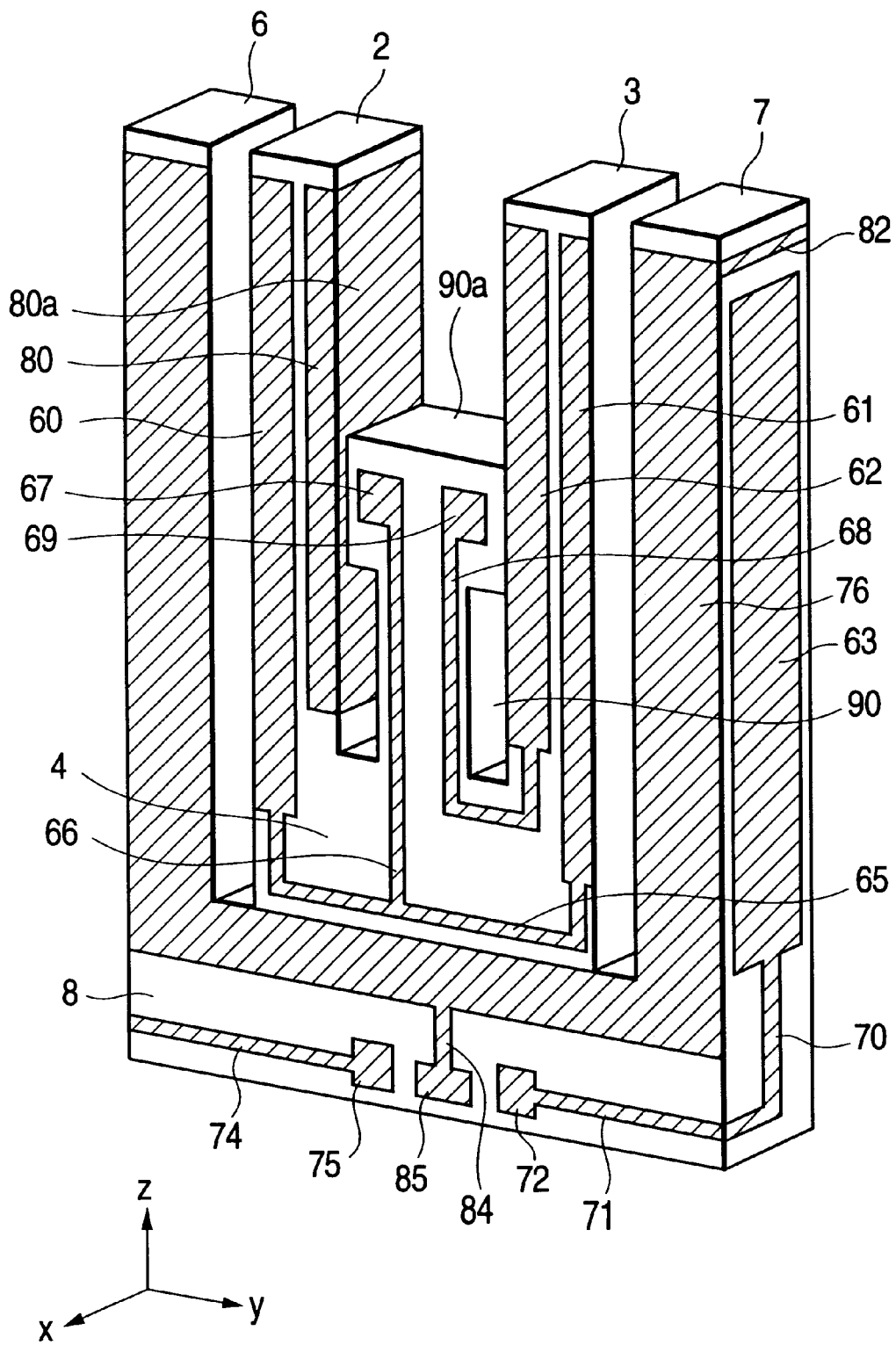
FIG. 35 is a perspective view which shows an angular rate sensor according to the ninth embodiment of the invention.

FIG. 35 shows an angular rate sensor according to the ninth embodiment of the invention which is a modification of the sixth embodiment, as shown in FIG. 22, and different therefrom in that the first interconnecting member 4 is machined integrally or connected directly with the second interconnecting member 8 without the torsion beam 9.

The electrode arrangements are substantially identical with those of the eighth embodiment, as shown in FIGS. 33 to 34(*d*) except that the pad electrodes 72, 75, and 85 and the leads 71 and 74 are formed on the second interconnecting member 8.

Other arrangements are identical with those of the sixth embodiment, and explanation thereof in detail will be omitted here.

Figure 36:
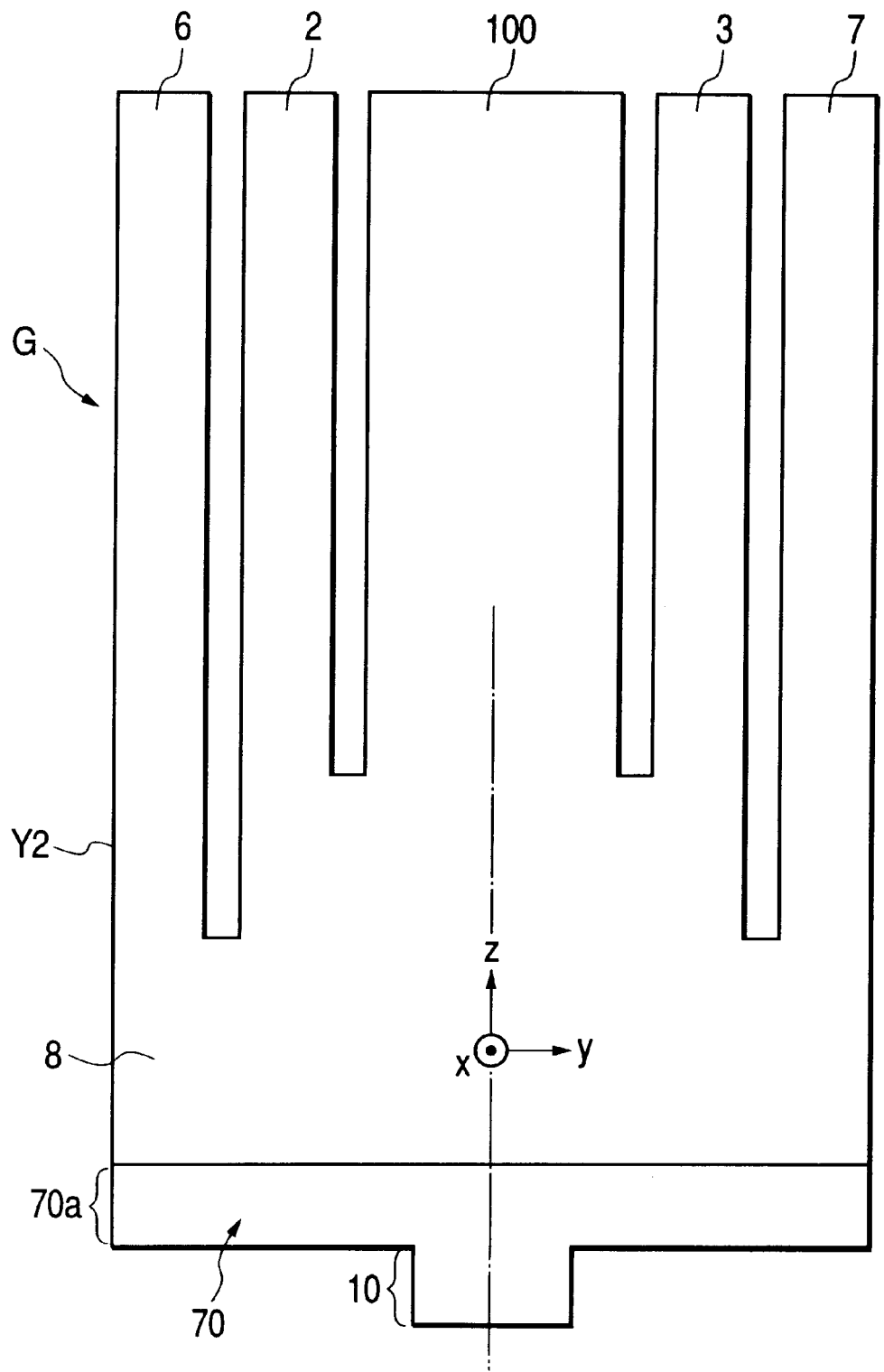
FIG. 36 is a plan view which shows a modification of an oscillating member.

FIG. 36 shows a modification of the oscillating member G which has a non-oscillatory bar 100 formed integrally between the tines 2 and 3. This structure provides for ease of machining of the oscillating member G.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An angular rate sensor for measuring an angular rate of angular motion applied around a z-axis of a three-dimensional cartesian coordinate system defined by x, y, and z axes comprising:

a first tuning fork including a first and a second tine which extend in a z-axis direction substantially parallel to the z axis and which connect at ends thereof with each other through a first interconnecting member, said first tuning fork serving as one of a drive oscillator and a measuring oscillator;

a second tuning fork including a third and a fourth tine which extend in the z-axis direction partially surrounding said first and second tines, and which connect at ends thereof with each other through a second interconnecting member, said second tuning fork serving as the other of the drive oscillator and the measuring oscillator;

a torsion beam connecting at one end with the first interconnecting member and at the other end with the second interconnecting member, said torsion beam having an end portion connected to the first interconnecting member, the end portion having a width smaller than an overall width of said first tuning fork in a y-axis direction substantially parallel to the y axis;

drive means for driving said first tuning fork to oscillate the first and second tines in phase opposition in the y-axis direction; and angular rate detecting means for detecting oscillations of the third and fourth tines of said second tuning fork in phase opposition in an x-axis direction substantially parallel to the x axis, resulting from the angular motion applied to the angular rate sensor during oscillation of the first and second tines in the y-axis direction, to detect the angular rate of said angular motion.

2. An angular rate sensor as set forth in claim 1, further comprising a second torsion beam having a length in the z-axis direction, connecting at one end with one of said first and second interconnecting members and the other end with a base to support said first and second tuning forks so as to allow said first and second tuning forks to oscillate in the y and x-axis directions, said second torsion beam having an end portion connected to the one of the first and second interconnecting members which has a width smaller than the overall width of said first tuning fork in the y-axis direction.

3. An angular rate sensor as set forth in claim 2, wherein the first and second tines of said first tuning fork are disposed symmetrically with respect to the z axis, and the third and fourth tines of said second tuning fork are disposed symmetrically with respect to the z axis, and wherein said torsion beam and said second torsion beam are oriented substantially in alignment with the z axis.

4. An angular rate sensor as set forth in claim 1, wherein an interval ratio WS/WU of an interval WS between the first and second tines of said first tuning fork to an interval WU between the third and fourth tines of said second tuning fork is less than or equal to 2.5.

5. An angular rate sensor as set forth in claim 1, wherein a ratio WU/HU of an interval WU between the first and second tines of said first tuning fork to a width HU of each of the first and second tines is within a range of 2.5 to 100.

6. An angular rate sensor as set forth in claim 1, wherein a resonant frequency of the first and second tines for oscillation in the y-axis direction is different from that of the third and fourth tines for oscillation in the y-axis direction.

7. An angular rate sensor as set forth in claim 1, wherein a resonant frequency ratio fd/fs of a resonant frequency fd of the first and second tines for oscillation in the y-axis direction resulting from excitation of the first and second tines by said drive means to a resonant frequency fs of the third and fourth tines for oscillation in the x-axis direction resulting from the applied angular motion is within one of ranges of $0.8 \leq fd/fs \leq 0.99$ and $1.01 \leq fd/fs \leq 1.2$.

8. An angular rate sensor as set forth in claim 1, wherein said first and second tuning forks and the torsion beam are made of a single piece of piezoelectric material.

9. An angular rate sensor as set forth in claim 1, wherein said torsion beam is made of a single piece of material and glued to the first and second interconnecting members.

10. An angular rate sensor as set forth in claim 2, wherein said second torsion beam is connected with the second interconnecting member and extends in a direction opposite to the third and fourth tines.

11. An angular rate sensor as set forth in claim 2, wherein said second torsion beam is connected with the first interconnecting member and extends in the same direction as the first and second tines.

12. An angular rate sensor as set forth in claim 2, further comprising a third torsion beam extending from the first interconnecting member in the same direction as the first and second tines, and wherein said second torsion beam extends from the second interconnecting member in a direction opposite the third and fourth tines.

13. An angular rate sensor as set forth in claim 1, further comprising a second and a third torsion beam and a support frame, said support frame including at least two side bar members extending from the second interconnecting member in a direction opposite the third and fourth tines and a connecting bar member connecting the side bar members, said second torsion beam extending in the z-axis direction from the second interconnecting member between the side bar members of said frame, said third torsion beam extending in the z-axis direction from the connecting bar member of the frame between the side bar members to support said first and second tuning forks on a base together with the second torsion beam.

14. An angular rate sensor as set forth in claim 13, wherein said torsion beam, the second torsion beam, and the third torsion beam extend in alignment with each other.

15. An angular rate sensor as set forth in claim 13, wherein geometries of said first and second tuning forks and said torsion beam and said second and third torsion beams are so determined that an amplitude ratio XU/XS of amplitude XU of oscillations of the first and second tines in the x-axis direction to amplitude XS of oscillations of the third and fourth tines in the x-axis direction resulting from the applied angular motion is less than or equal to 10.

16. An angular rate sensor as set forth in claim 13, wherein two of the first, second, third, and fourth tines on one side of the z axis vibrate in a first direction substantially parallel to the x axis and the other tines on the other side of the z axis vibrate in a second direction opposite the first direction, and wherein geometries of said first and second tuning forks and said torsion beams are so determined that an amplitude ratio XS/XU of amplitude XS of oscillations of the third and fourth tines in the x-axis direction to amplitude XU of oscillations of the first and second tines in the x-axis direction resulting from the applied angular motion is less than or equal to 10.

17. An angular rate sensor as set forth in claim 13, wherein an interval ratio WS/WU of an interval WS between the first and second tines of said first tuning fork to an interval WU between the third and fourth tines of said second tuning fork is less than or equal to 2.5.

18. An angular rate sensor as set forth in claim 13, wherein a ratio WU/HU of an interval WU between the first and second tines of said first tuning fork to a width HU of each of the first and second tines is within a range of 2.5 to 100.

19. An angular rate sensor as set forth in claim 13, wherein a resonant frequency of the first and second tines for oscillation in the y-axis direction is different from that of the third and fourth tines for oscillation in the y-axis direction.

20. An angular rate sensor as set forth in claim 13, wherein a resonant frequency ratio fd/fs of a resonant frequency fd of the first and second tines for oscillation in the y-axis direction resulting from excitation of the first and second tines by said drive means to a resonant frequency fs of the third and fourth tines for oscillation in the x-axis direction resulting from the applied angular motion is within one of ranges of $0.8 \leq fd/fs \leq 0.99$ and $1.01 \leq fd/fs \leq 1.2$.

21. An angular rate sensor as set forth in claim 13, wherein said second interconnecting member has a width smaller in the z-axis direction than that of said first interconnecting member.

22. An angular rate sensor as set forth in claim 13, wherein a width of each of the first and second tines and a width of each of the third and fourth tines in the y-axis direction are less than or equal to 0.6 of a length of the first interconnecting member in the y-axis direction.

23. An angular rate sensor as set forth in claim 13, further comprising monitor means for monitoring oscillation of said first tuning fork to provide a signal indicative thereof, and wherein said drive means excites the first and second tines to undergo self-excited oscillation in the y-axis direction based on the signal from said monitor means.

24. An angular rate sensor for measuring an angular rate of angular motion applied around a z-axis of a three-dimensional cartesian coordinate system defined by x, y, and z axes comprising:

an oscillating member including a first tuning fork, a second tuning fork, and a connecting member, said first turning fork including a first and a second tine which extend in a z-axis direction substantially parallel to the z axis, said first tuning fork serving as one of a drive oscillator and a measuring oscillator, said second tuning fork including a third and a fourth tine which extend in the z-axis direction partially surrounding the first and second tines of said first tuning fork, said second tuning fork serving as the other of the drive oscillator and the measuring oscillator, said connecting member connecting ends of the first, second, third and fourth tines;

drive means for driving said first tuning fork to oscillate the first and second tines in phase opposition in a y-axis direction substantially parallel to the y axis; and angular rate detecting means for detecting oscillations of the third and fourth tines of said second tuning fork in phase opposition in an x-axis direction substantially parallel to the x axis, resulting from the angular motion applied to the angular rate sensor during oscillation of the first and second tines in the y-axis direction, to detect the angular rate of said angular motion, wherein adjacent two of the first, second, third, and fourth tines vibrate in opposite directions substantially parallel to the x axis when the angular motion is applied, and wherein a geometry of said oscillating member is so determined that an amplitude ratio XU/XS of amplitude XU of oscillations of the first and second tines in the x-axis direction to amplitude XS of oscillations of the third and fourth tines in the x-axis direction resulting from the applied angular motion is less than or equal to 10.

25. An angular rate sensor as set forth in claim 24, further comprising a torsion beam extending in the z-axis direction, connecting at an end portion with the connecting member of said oscillating member to support said oscillating member on a base, and wherein the end portion of said torsion beam has a width smaller than an overall width of said first tuning fork in the y-axis direction.

26. An angular rate sensor as set forth in claim 24, wherein an interval ratio WS/WU of an interval WS between the first and second tines of said first tuning fork to an interval WU between the third and fourth tines of said second tuning fork is less than or equal to 2.5.

27. An angular rate sensor as set forth in claim 24, wherein a ratio WU/HU of an interval WU between the first and second tines of said first tuning fork to a width HU of each of the first and second tines is within a range of 2.5 to 100.

28. An angular rate sensor as set forth in claim 25, wherein said oscillating member and said torsion beam are formed with a single piece of piezoelectric material.

29. An angular rate sensor as set forth in claim 25, wherein said torsion beam is made independently from said oscillating member and glued to the connecting member.

30. An angular rate sensor as set forth in claim 25, wherein said torsion beam extends from the connecting member of said oscillating member in a direction opposite the first and second tuning forks.

31. An angular rate sensor as set forth in claim 30, further comprising a second torsion beam extending from the connecting member in the same direction as the first and second tuning forks.

32. An angular rate sensor as set forth in claim 24, wherein a resonant frequency of the first and second tines for oscillation in the y-axis direction is different from that of the third and fourth tines for oscillation in the y-axis direction.

33. An angular rate sensor as set forth in claim 24, wherein a resonant frequency ratio fd/fs of a resonant frequency fd of the first and second tines for oscillation in the y-axis direction resulting from excitation of the first and second tines by said drive means to a resonant frequency fs of the third and fourth tines for oscillation in the x-axis direction resulting from the applied angular motion is within one of ranges of $0.8 \leq fd/fs \leq 0.99$ and $1.01 \leq fd/fs \leq 1.2$.

34. An angular rate sensor as set forth in claim 24, further comprising monitor means for monitoring oscillation of said first tuning fork to provide a signal indicative thereof, and wherein said drive means excites the first and second tines to undergo self-excited oscillate in the y-axis direction based on the signal from said monitor means.

35. An angular rate sensor for measuring an angular rate of angular motion applied around a z-axis of a three-dimensional cartesian coordinate system defined by x, y, and z axes comprising:

an oscillating member including a first tuning fork, a second tuning fork, and a connecting member, said first turning fork including a first and a second tine which extend in a z-axis direction substantially parallel to the z axis, said first tuning fork serving as one of a drive oscillator and a measuring oscillator, said second tuning fork including a third and a fourth tine which extend in the z-axis direction outside the first and second tines of said first tuning fork, said second tuning fork serving as the other of the drive oscillator and the measuring oscillator, said connecting member connecting ends of the first, second, third and fourth tines;

drive means for driving said first tuning fork to oscillate the first and second tines in phase opposition in a y-axis direction substantially parallel to the y axis; and angular rate detecting means for detecting oscillations of the third and fourth tines of said second tuning fork in phase opposition in an x-axis direction substantially parallel to the x axis, resulting from the angular motion applied to the angular rate sensor during oscillation of the first and second tines in the y-axis direction, to detect the angular rate of said angular motion, wherein the first and second tines of said first tuning fork are disposed symmetrically with respect to the z axis, and the third and fourth tines of said second tuning fork are disposed symmetrically with respect to the z axis, two of the first, second, third, and fourth tines on one side of the z axis vibrating in a first direction substantially parallel to the x axis and the other tines on the other side of the z axis vibrate in a second direction opposite the first direction, and wherein a geometry of said oscillating member is so determined that an amplitude ratio XS/XU of amplitude XS of oscillations of the third and fourth in the x-axis direction to amplitude XU of oscillations of the first and second tines in the x-axis direction resulting from the applied angular motion is less than or equal to 10.

36. An angular rate sensor as set forth in claim 35, further comprising a torsion beam extending in the z-axis direction, connecting at an end portion thereof with the connecting member of said oscillating member to support said oscillating member on a base, and wherein the end portion of said torsion beam has a width smaller than an overall width of said first tuning fork in the y-axis direction.

37. An angular rate sensor as set forth in claim 35, wherein an interval ratio WS/WU of an interval WS between the first and second tines of said first tuning fork to an interval WU between the third and fourth tines of said second tuning fork is less than or equal to 2.5.

38. An angular rate sensor as set forth in claim 35, wherein a ratio WU/HU of an interval WU between the first and second tines of said first tuning fork to a width HU of each of the first and second tines is within a range of 2.5 to 100.

39. An angular rate sensor as set forth in claim 35, wherein a resonant frequency of the first and second tines for oscillation in the y-axis direction is different from that of the third and fourth tines for oscillation in the y-axis direction.

40. An angular rate sensor as set forth in claim 35, wherein a resonant frequency ratio fd/fs of a resonant frequency fd of the first and second tines for oscillation in the y-axis direction resulting from excitation of the first and second tines by said drive means to a resonant frequency fs of the third and fourth tines for oscillation in the x-axis direction resulting from the applied angular motion is within one of ranges of $0.8 \leq fd/fs \leq 0.99$ and $1.01 \leq fd/fs \leq 1.2$.

41. An angular rate sensor as set forth in claim 35, further comprising monitor means for monitoring oscillation of said first tuning fork to provide a signal indicative thereof, and wherein said drive means excites the first and second tines to undergo self-excited oscillate in the y-axis direction based on the signal from said monitor means.

42. An angular rate sensor as set forth in claim 36, wherein said oscillating member and said torsion beam are formed with a single piece of piezoelectric material.

43. An angular rate sensor as set forth in claim 36, wherein said torsion beam is made independently from said oscillating member and glued to the connecting member.

44. An angular rate sensor as set forth in claim 36, wherein said torsion beam extends from the connecting member of said oscillating member in a direction opposite the first and second tuning forks.

45. An angular rate sensor as set forth in claim 42, further comprising a second torsion beam extending from the connecting member in the same direction as the first and second tuning forks.

46. An angular rate sensor for measuring an angular rate of angular motion applied around a z-axis of a three-dimensional Cartesian coordinate system defined by x, y, and z axes comprising: a first tuning fork including a first and a second tine which extend in a z-axis direction substantially parallel to the z axis and which connect at ends thereof with each other through a first interconnecting member, said first tuning fork serving as one of a drive oscillator and a measuring oscillator;

a second tuning fork including a third and a fourth tine which extend in the z-axis direction partially surrounding said first and second tines, and which connect at ends thereof with each other through a second interconnecting member, said second tuning fork serving as the other of the drive oscillator and the measuring oscillator;

a torsion beam connecting at one end with the first interconnecting member and at the other end with the second interconnecting member, said torsion beam having an end portion connected to the first interconnecting member, the end portion having a width smaller than an overall width of said first tuning fork in a y-axis direction substantially parallel to the y axis;

drive means for driving said first tuning fork to oscillate the first and second tines in phase opposition in the x-axis direction; and angular rate detecting means for detecting oscillations of the third and fourth tines of said second tuning fork in phase opposition in an x-axis direction substantially parallel to the x axis, resulting from the angular motion applied to the angular rate sensor during oscillation of the first and second tines in the x-axis direction, to detect the angular rate of said angular motion.

47. An angular rate sensor as set forth in claim 46, wherein adjacent two of the first, second, third, and fourth tines vibrate in opposite directions substantially parallel to the x-axis direction when the angular motion is applied, and wherein geometries of said first and second tuning forks and said torsion beam is so determined that an amplitude ratio XU/XS of amplitude XU of oscillations of the first and second tines in the x-axis direction to amplitude XS of oscillations of the third and fourth tines in the x-axis direction resulting from the applied angular motion is less than or equal to 10.

48. An angular rate sensor as set forth in claim 46, wherein two of the first, second, third, and fourth tines are disposed on one side of the z axis and vibrate in a first direction substantially parallel to the x axis while the other tines on the other side of the z axis vibrate in a second direction opposite the first direction, and wherein geometries of said first and second tuning forks and said torsion beams are so determined that an amplitude ratio XS/XU of amplitude XS of oscillations of the third and fourth in the x-axis direction to amplitude XU of oscillations of the first and second tines in the x-axis direction resulting from the applied angular motion is less than or equal to 10.

* * * * *